(12) United States Patent
Zhang

(10) Patent No.: US 12,126,214 B2
(45) Date of Patent: Oct. 22, 2024

(54) UNINTERRUPTIBLE POWER SYSTEM AND DRIVING METHOD FOR UNINTERRUPTIBLE POWER SYSTEM

(71) Applicant: Huawei Digital Power Technologies Co., Ltd., Guangdong (CN)

(72) Inventor: Chuntao Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 17/931,536

(22) Filed: Sep. 12, 2022

(65) Prior Publication Data

US 2023/0006466 A1   Jan. 5, 2023

Related U.S. Application Data

(63) Continuation of application No. PCT/CN2020/090696, filed on May 15, 2020.

(51) Int. Cl.
*H02J 9/06* (2006.01)
(52) U.S. Cl.
CPC ........... *H02J 9/062* (2013.01); *H02J 2207/20* (2020.01)
(58) Field of Classification Search
CPC ..... H02J 9/062; H02J 2207/20; H02J 2310/16
See application file for complete search history.

(56) References Cited

U.S. PATENT DOCUMENTS

| 6,295,215 | B1 | 9/2001 | Des Faria et al. | |
| 2012/0181871 | A1* | 7/2012 | Johansen | H02J 9/062 307/66 |
| 2015/0270744 | A1 | 9/2015 | Lacarnoy | |

FOREIGN PATENT DOCUMENTS

| CN | 101291073 A | 10/2008 |
| CN | 105634109 A | 6/2016 |
| CN | 106464001 A | 2/2017 |
| CN | 107404148 A | 11/2017 |
| CN | 107528381 A | 12/2017 |
| CN | 206759151 U | 12/2017 |
| CN | 107819327 A | 3/2018 |
| JP | 2004236460 A | 8/2004 |
| JP | 2005354781 A | 12/2005 |
| JP | 2006006051 A | 1/2006 |
| JP | 2007157630 A | 6/2007 |
| JP | 2008092734 A | 4/2008 |
| KR | 20140075472 A | 6/2014 |

\* cited by examiner

*Primary Examiner* — Lincoln D Donovan
*Assistant Examiner* — Alex W Lam
(74) *Attorney, Agent, or Firm* — Gregg Jansen

(57) ABSTRACT

This application provides an uninterruptible power system and a driving method for an uninterruptible power system, and relates to the field of power conversion technologies, to resolve output interruption of the uninterruptible power system. The uninterruptible power system includes a first power input end, a second power input end, a load end, and a bypass, where the bypass includes a first bidirectional switch, and the first bidirectional switch is connected to the first power input end and the load end, and is configured to control connection or disconnection between the first power input end and the load end; and at least one main circuit, where each main circuit includes a bus and an inverter output unit. An input end of the bus is connected to the second power input end, and an output end of the bus is connected to the inverter output unit.

16 Claims, 40 Drawing Sheets

US 12,126,214 B2

UNINTERRUPTIBLE POWER SYSTEM AND DRIVING METHOD FOR UNINTERRUPTIBLE POWER SYSTEM

CROSS-REFERENCE TO RELATED APPLICATIONS

This application is a continuation of International Application No. PCT/CN2020/090696, filed on May 15, 2020, the disclosure of which is hereby incorporated by reference in its entirety.

TECHNICAL FIELD

This application relates to the field of power conversion technologies, and in particular, to an uninterruptible power system and a driving method for an uninterruptible power system.

BACKGROUND

Generally, an uninterruptible power system (UPS) is an automatic system for supplying power without interruption when power interruption or failure occurs. The UPS is a component configured to supply power to an electronic device such as a computer, and such an electronic device requires continuous and uninterrupted power supply. Even when a voltage or a frequency of the power changes, or when the power is instantaneously cut off, the UPS can stably supply power. This reduces a possibility that data in the electronic device is damaged or lost, and avoids a shutdown or failure of the electronic device.

Generally, the UPS includes a bypass and a main circuit. An ideal UPS ensures uninterrupted output of power through collaboration of the bypass and the main circuit. Power supply characteristics of the main circuit are a stable signal, but low efficiency and a high loss. Power supply characteristics of the bypass are high efficiency, but relatively poor signal stability compared with the main circuit. Depending on different requirements, the UPS generally includes two power supply modes. In one power supply mode, the main circuit preferentially supplies power, and the bypass serves as a backup power supply circuit. In the other mode, the bypass preferentially supplies power, and the main circuit serves as a backup power supply circuit.

In the power supply mode in which the bypass preferentially supplies power and the main circuit serves as a backup power supply circuit, the main circuit starts to work when power supply of the bypass is abnormal. In a conventional technology, a commonly used solution for power supply switching between the bypass and the main circuit is interrupted switching. After power supply of the bypass becomes abnormal, in a process of switching from the bypass to the main circuit, neither the bypass nor the main circuit supplies power, and output interruption occurs for a short time. In this way, there is short-time output interruption in a UPS output process. Consequently, a load connected to the UPS likely has a power outage, and a user requirement cannot be met.

SUMMARY

This application provides an uninterruptible power system and a driving method for an uninterruptible power system, to resolve output interruption of the uninterruptible power system.

To achieve the foregoing objective, this application uses the following technical solutions:

According to a first aspect of this application, an uninterruptible power system is provided, and includes a first power input end, a second power input end, a load end, and a bypass, where the bypass includes a first bidirectional switch, and the first bidirectional switch is connected to the first power input end and the load end, and is configured to control connection or disconnection between the first power input end and the load end; and at least one main circuit, where each main circuit includes a bus and an inverter output unit. An input end of the bus is connected to the second power input end, and an output end of the bus is connected to the inverter output unit. The inverter output unit is further connected to the load end, and the inverter output unit is configured to control whether to perform DC-AC conversion on a current inputted from the output end of the bus, and transmit a current to the load end. A voltage value of the current outputted by the inverter output unit is different from a theoretical voltage value of a current outputted by the first power input end.

In the uninterruptible power system provided in an embodiment of this application, the inverter output unit controls a current in the main circuit, so that when a voltage of a current in the bypass is normal, the current in the main circuit is controlled to be interrupted. When the voltage of the current in the bypass is abnormal, the main circuit is controlled to be connected, to output a current to the load end, thereby completing power supply switching from the bypass to the main circuit. In addition, for example, when a voltage value of a current transmitted from the first power input end to the load end abruptly drops and exceeds a lower threshold, switching from power supply of the bypass to power supply of the main circuit is performed. A first specified voltage value (for example, 210 VAC) of the current outputted by the inverter output unit is less than the theoretical voltage value (for example, 220 VAC) of the current outputted by the first power input end. Therefore, when the voltage value of the current of the first power input end abruptly drops, causing an actual voltage value of the current received by the load end to be less than the first specified voltage value of the current outputted by the inverter output unit, instantaneous switching to the main circuit is continuously performed to supply power to the load end. In other words, when a voltage value of a current supplied by the bypass to the load end is less than a voltage value of a current supplied by the main circuit M to the load end, automatic switching to the main circuit is performed to supply a current to the load end. This implements seamless switching from power supply of the bypass to power supply of the main circuit, and ensures uninterrupted output of the uninterruptible power system. In addition, when the power supply of the bypass is abnormal, the UPS provided in this example instantaneously switches to the power supply of the main circuit. When the bypass supplies power, no signal in the main circuit flows to the load end. Therefore, there is no case in which the main circuit and the bypass are simultaneously conducted to form a cross current, thereby avoiding affecting system reliability of the UPS due to the cross current formed by the two circuits that are simultaneously conducted.

Optionally, the inverter output unit includes an inverter and a first controller. The inverter is connected to the output end of the bus, the load end, and the first controller, and the inverter is turned on under control of the first controller, and is configured to perform DC-AC conversion on the current inputted from the output end of the bus, and then transmit the current to the load end.

The inverter output unit is disposed in a structure including the inverter and the first controller, so that physical components included in the inverter output unit can be reduced, an integration degree of the inverter output unit can be improved, and a volume of the UPS can be reduced.

Optionally, there are two or more main circuits. A plurality of first controllers in the two or more main circuits are integrated in a same control unit. Distribution of the plurality of first controllers may be simplified, to simplify a layout of the UPS.

Optionally, the inverter output unit includes an inverter and a second bidirectional switch. The inverter is connected to the output end of the bus and the second bidirectional switch, and is configured to perform DC-AC conversion on the current inputted from the output end of the bus, and then transmit the current to the second bidirectional switch. The second bidirectional switch is further connected to the load end, and is configured to control whether to transmit, to the load end, the current outputted by the inverter.

The inverter output unit is disposed in a structure including the inverter and the second bidirectional switch. When a signal inputted by the first power input end is normal, the second bidirectional switch is turned off due to a reverse voltage. When a signal inputted by the first power input end is abnormal, the second bidirectional switch is directly and naturally turned on, to automatically switch to the power supply of the main circuit without a determining process or a separate control component. This improves intelligence of the UPS.

Optionally, there are two or more main circuits. In the two or more main circuits, a voltage value of a current outputted by an inverter output unit in at least one main circuit is greater than the theoretical voltage value of the current outputted by the first power input end; and a voltage value of a current outputted by an inverter output unit in at least one main circuit is less than the theoretical voltage value of the current outputted by the first power input end.

In this way, when a supply voltage of the bypass abruptly drops and exceeds a lower threshold, switching to power supply of one main circuit can be performed. When the supply voltage of the bypass abruptly increases and exceeds an upper threshold, switching to power supply of another main circuit can be performed. Therefore, both ultra-low voltage protection and ultra-high voltage protection can be performed, to prevent a very low or very high voltage value of a current outputted by the UPS from damaging a load connected to the UPS.

Optionally, the first bidirectional switch includes a first silicon controlled rectifier and a second silicon controlled rectifier. An anode of the first silicon controlled rectifier is connected to the first power input end, and a cathode of the first silicon controlled rectifier is connected to the load end. An anode of the second silicon controlled rectifier is connected to the load end, and a cathode of the second silicon controlled rectifier is connected to the first power input end. A structure is simple, a technology is mature, and costs are low.

Optionally, the second bidirectional switch includes a third silicon controlled rectifier and a fourth silicon controlled rectifier. An anode of the third silicon controlled rectifier is connected to the inverter, and a cathode of the third silicon controlled rectifier is connected to the load end. An anode of the fourth silicon controlled rectifier is connected to the load end, and a cathode of the fourth silicon controlled rectifier is connected to the inverter. A structure is simple, a technology is mature, and costs are low.

Optionally, the main circuit further includes a rectifier and a battery unit. The rectifier is connected to the second power input end and the input end of the bus, and is configured to perform AC-DC conversion on a current inputted from the second power input end, and then transmit a current to the input end of the bus. The battery unit is connected to the input end of the bus, and is configured to receive and store a current from the input end of the bus, and is further configured to output a current stored in the battery unit to the input end of the bus.

When currents inputted by the first power input end and the second power input end are both abnormal, the battery unit can still discharge to ensure stable output of the UPS.

According to a second aspect, a driving method for an uninterruptible power system is provided. The uninterruptible power system includes a first power input end, a second power input end, a load end, and a bypass, where the bypass includes a first bidirectional switch, and the first bidirectional switch is connected to the first power input end and the load end; and a first main circuit, where the first main circuit includes a bus and an inverter output unit. An input end of the bus is connected to the second power input end, an output end of the bus is connected to the inverter output unit, and the inverter output unit is further connected to the load end. The driving method for an uninterruptible power system includes: in a first state, turning on the first bidirectional switch in the bypass to transmit a current of the first power input end to the load end by using the first bidirectional switch; and in a second state, controlling, by the first bidirectional switch, the first power input end to be disconnected from the load end; and performing, by the inverter output unit in the first main circuit, DC-AC conversion on a current inputted from the output end of the bus, and transmitting a current whose voltage value is a first voltage value to the load end, where the first voltage value of the current outputted by the inverter output unit in the first main circuit is different from a theoretical voltage value of a current outputted by the first power input end.

In the driving method for a UPS provided in an embodiment of this application, the inverter output unit controls a current in the main circuit, so that when a voltage of a current in the bypass is normal, the current in the main circuit is controlled to be interrupted. When the voltage of the current in the bypass is abnormal, the main circuit is controlled to be connected, to output a current to the load end, thereby completing power supply switching from the bypass to the main circuit. In addition, for example, when a voltage value of a current transmitted from the first power input end to the load end abruptly drops and exceeds a lower threshold, switching from power supply of the bypass to power supply of the main circuit is performed. A first specified voltage value (for example, 210 VAC) of the current outputted by the inverter output unit is less than the theoretical voltage value (for example, 220 VAC) of the current outputted by the first power input end. Therefore, when the voltage value of the current of the first power input end abruptly drops, causing an actual voltage value of the current received by the load end to be less than the first specified voltage value of the current outputted by the inverter output unit, instantaneous switching to the main circuit is continuously performed to supply power to the load end. In other words, when a voltage value of a current supplied by the bypass to the load end is less than a voltage value of a current supplied by the main circuit to the load end, automatic switching to the main circuit is performed to supply a current to the load end. This implements seamless switching from power supply of the bypass to power supply of the main circuit, and ensures uninterrupted output of the UPS.

Optionally, the inverter output unit in the first main circuit includes an inverter and a first controller, and the inverter is connected to the output end of the bus, the load end, and the first controller. The driving method for an uninterruptible power system further includes: the first voltage value of the current outputted by the inverter in the first main circuit is less than the theoretical voltage value of the current outputted by the first power input end to the load end; detecting, by the first controller in the first main circuit in real time, an actual voltage value of a current outputted by the load end, and determining whether the actual voltage value is greater than the first voltage value; if the actual voltage value is greater than the first voltage value, entering the first state, where the first controller in the first main circuit controls the inverter to be turned off; and if the actual voltage value is less than the first voltage value, entering the second state. The performing, by the inverter output unit in the first main circuit, DC-AC conversion on a current inputted from the output end of the bus, and transmitting a current whose voltage value is a first voltage value to the load end includes: controlling, by the first controller in the first main circuit, the inverter to be turned on, and performing, by the inverter, DC-AC conversion on the current inputted from the output end of the bus in the first main circuit, and transmitting the current whose voltage value is the first voltage value to the load end.

In this example, whether the power supply of the bypass is normal is determined by collecting an instantaneous value of the actual voltage value of the current outputted by the load end. Compared with a manner in the related art in which whether the power supply of the bypass is normal is determined by collecting an interval value that is of the actual voltage value of the current outputted by the load end and that is in at least half a cycle of an alternating current signal, the method provided in this example is faster to determine whether the power supply of the bypass is normal, which can be almost instantaneously completed with no detection time, and switching from the power supply of the bypass to power supply of the first main circuit is uninterrupted.

Further, when the voltage value of the current transmitted from the first power input end to the load end abruptly drops, the bypass still continuously supplies power to the load end, until the voltage value of the current transmitted from the first power input end to the load end falls below the first voltage value of the current outputted by the inverter. Determining that the bypass is abnormal is instantaneously completed, and controlling, by the first controller, the inverter to output the current whose voltage value is the first voltage value is also instantaneously completed. Therefore, instantaneous switching to the first main circuit can be continuously performed to supply power to the load end. Therefore, when a supply voltage of the bypass is very low, no power supply interruption occurs during switching from the power supply of the bypass to the power supply of the first main circuit, thereby ensuring uninterrupted output of the UPS.

Optionally, the inverter output unit in the first main circuit includes an inverter and a first controller, and the inverter is connected to the output end of the bus, the load end, and the first controller. The driving method for an uninterruptible power system further includes: the first voltage value of the current outputted by the inverter in the first main circuit is greater than the theoretical voltage value of the current outputted by the first power input end to the load end; detecting, by the first controller in the first main circuit in real time, an actual voltage value of a current outputted by the load end, and determining whether the actual voltage value is less than the first voltage value; if the actual voltage value is less than the first voltage value, entering the first state, where the first controller in the first main circuit controls the inverter to be turned off; and if the actual voltage value is greater than the first voltage value, entering the second state. The performing, by the inverter output unit in the first main circuit, DC-AC conversion on a current inputted from the output end of the bus, and transmitting a current whose voltage value is a first voltage value to the load end includes: controlling, by the first controller in the first main circuit, the inverter to be turned on, and performing, by the inverter, DC-AC conversion on the current inputted from the output end of the bus in the first main circuit, and transmitting the current whose voltage value is the first voltage value to the load end.

In this example, whether the power supply of the bypass is normal is determined by collecting an instantaneous value of the actual voltage value of the current outputted by the load end. Compared with a manner in the related art in which whether the power supply of the bypass is normal is determined by collecting an interval value that is of the actual voltage value of the current outputted by the load end and that is in at least half a cycle of an AC current, the method provided in this example is faster to determine whether the power supply of the bypass is normal, which can be almost instantaneously completed with no detection time. Therefore, in this example, when the power supply of the bypass exceeds an upper threshold, instantaneous switching from the power supply of the bypass to the power supply of the first main circuit can be performed, without continuously outputting a high-voltage signal for a period of time before switching to the power supply of the first main circuit, thereby reducing a time in which the UPS continuously outputs an abnormal current. This improves stability of a current outputted by the UPS.

Further, when the voltage value of the current transmitted from the first power input end to the load end abruptly increases and exceeds an upper threshold, the bypass still continuously supplies power to the load end, until the voltage value of the current transmitted from the first power input end to the load end increases to be greater than the first voltage value of the current outputted by the inverter. Determining that the bypass is abnormal is instantaneously completed, and controlling, by the first controller, the inverter to output the current whose voltage value is the first voltage value is also instantaneously completed. Therefore, instantaneous switching to the first main circuit can be continuously performed to supply power to the load end.

Optionally, the uninterruptible power system further includes a second main circuit, and the second main circuit includes an inverter output unit and a bus. The inverter output unit includes an inverter and a first controller, and the inverter is connected to an output end of the bus, the load end, and the first controller. The driving method for an uninterruptible power system further includes: a second voltage value of a current outputted by the inverter in the second main circuit is greater than the theoretical voltage value of the current outputted by the first power input end to the load end; detecting, by the first controller in the second main circuit in real time, an actual voltage value of a current outputted by the load end, and determining whether the actual voltage value is less than the second voltage value; if the actual voltage value is less than the second voltage value, entering the first state, where the first controller in the second main circuit controls the inverter to be turned off; and if the actual voltage value is greater than the second voltage value, entering a third state. In the third state, the first bidirectional switch controls the first power input end to be disconnected from the load end; the first controller in the first main circuit controls the inverter to be turned off, to control the output end of the bus to be disconnected from the load end; and the first controller in the second main circuit controls the inverter to be turned on, and the inverter performs DC-AC conversion on a current inputted from the output end of the bus in the second main circuit, and transmits a current whose voltage value is the second voltage value to the load end.

The UPS provided in this example can implement both ultra-low voltage protection and ultra-high voltage protection for an output current, to reduce a possibility that a load connected to the UPS is damaged by a low voltage or a high voltage. In addition, in this example, whether the power supply of the bypass is normal is determined by collecting an instantaneous value of the actual voltage value of the current outputted by the load end. A conclusion can be drawn instantaneously, and continuous switching to the first main circuit or the second main circuit that is to supply power to the load end can be performed. Therefore, when a supply voltage of the bypass is very low, instantaneous switching from the power supply of the bypass to the power supply of the first main circuit is performed; or when a supply voltage of the bypass is very high, instantaneous switching from the power supply of the bypass to power supply of the second main circuit is performed. This can ensure uninterrupted output of the UPS, and shorten a time in which the UPS outputs an abnormal current.

Optionally, the inverter output unit in the first main circuit includes an inverter and a second bidirectional switch, the inverter is connected to the output end of the bus and the second bidirectional switch, and the second bidirectional switch is further connected to the load end. The driving method for an uninterruptible power system further includes: controlling, by the second bidirectional switch in the first main circuit, to enter the first state or the second state, based on whether a first voltage value of a current outputted by the inverter in the first main circuit is less than an actual voltage value of a current outputted by the load end. The turning on the first bidirectional switch in the bypass to transmit a current of the first power input end to the load end by using the first bidirectional switch includes: turning on the first bidirectional switch in a first direction to transmit the current of the first power input end to the load end by using the first bidirectional switch; and performing, by the inverter in the first main circuit, DC-AC conversion on the current inputted from the output end of the bus, and transmitting the current whose voltage value is the first voltage value to the second bidirectional switch, where the second bidirectional switch in the first main circuit is turned off due to a reverse voltage in the first direction; and turning on the first bidirectional switch in a second direction to transmit the current of the first power input end to the load end by using the first bidirectional switch; and performing, by the inverter in the first main circuit, DC-AC conversion on the current inputted from the output end of the bus, and transmitting the current whose voltage value is the first voltage value to the second bidirectional switch, where the second bidirectional switch in the first main circuit is turned off due to a reverse voltage in the second direction. The performing, by the inverter output unit in the first main circuit, DC-AC conversion on a current inputted from the output end of the bus, and transmitting a current whose voltage value is a first voltage value to the load end includes: performing, by the inverter in the first main circuit, DC-AC conversion on the current inputted from the output end of the bus, and transmitting the current whose voltage value is the first voltage value to the second bidirectional switch; and turning on the second bidirectional switch to transmit the current whose voltage value is the first voltage value to the load end, where the first voltage value is less than the theoretical voltage value, and the first direction and the second direction are mutually a direction flowing to the load end and a direction departing from the load end.

In the UPS provided in this example, the bypass and the first main circuit simultaneously transmit currents to the load end. When a voltage value of a current transmitted by the bypass to the load end is greater than a voltage value of a current transmitted by the first main circuit to the load end, the first main circuit is cut off due to a reverse voltage, and the bypass transmits the current to the load end. When the voltage value of the current transmitted by the bypass to the load end is less than the voltage value of the current transmitted by the first main circuit to the load end, the first main circuit is naturally conducted, and in this case, the bypass is cut off due to a reverse voltage. In this way, when the voltage value of the current supplied by the bypass is very low, seamless switching from the bypass transmitting the current to the load end to the first main circuit transmitting the current to the load end is completed. Therefore, when a supply voltage of the bypass is very low, no power supply interruption occurs during switching from the power supply of the bypass to the power supply of the first main circuit, thereby ensuring uninterrupted output of the UPS.

In addition, although the bypass and the first main circuit simultaneously transmit the currents to the load end, there is a voltage difference between the currents transmitted by the bypass and the first main circuit. Therefore, a circuit with a low transmission voltage is automatically cut off due to a reverse voltage. There is no case in which the bypass and the first main circuit are simultaneously conducted to form a cross current, thereby avoiding affecting system reliability of the UPS due to the cross current formed by the two circuits that are simultaneously conducted.

Optionally, the inverter output unit in the first main circuit includes an inverter and a second bidirectional switch, the inverter is connected to the output end of the bus and the second bidirectional switch, and the second bidirectional switch is further connected to the load end. The driving method for an uninterruptible power system further includes: controlling, by the second bidirectional switch in the first main circuit, to enter the first state or the second state, based on whether a first voltage value of a current outputted by the inverter in the first main circuit is greater than an actual voltage value of a current outputted by the load end. The turning on the first bidirectional switch in the bypass to transmit a current of the first power input end to the load end by using the first bidirectional switch includes: turning on the first bidirectional switch in a first direction to transmit the current of the first power input end to the load end by using the first bidirectional switch; and performing, by the inverter in the first main circuit, DC-AC conversion on the current inputted from the output end of the bus, and transmitting the current whose voltage value is the first voltage value to the second bidirectional switch, where the second bidirectional switch in the first main circuit is turned off due to a reverse voltage in a second direction; and turning on the first bidirectional switch in the second direction to transmit the current of the first power input end to the load end by using the first bidirectional switch; and performing, by the inverter in the first main circuit, DC-AC conversion on the current inputted from the output end of the bus, and transmitting the current whose voltage value is the first voltage value to the second bidirectional switch, where the second bidirectional switch in the first main circuit is turned off due to a reverse voltage in the first direction. The performing, by the inverter output unit in the first main circuit, DC-AC conversion on a current inputted from the output end of the bus, and transmitting a current whose voltage value is a first voltage value to the load end includes: performing, by the inverter in the first main circuit, DC-AC conversion on the current inputted from the output end of the bus, and transmitting the current whose voltage value is the first voltage value to the second bidirectional switch; and turning on the second bidirectional switch to transmit the current whose voltage value is the first voltage value to the load end, where the first voltage value is greater than the theoretical voltage value, and the first direction and the second direction are mutually a direction flowing to the load end and a direction departing from the load end.

In the UPS provided in this example, the bypass and the first main circuit simultaneously transmit currents to the load end. When a voltage value of a current transmitted by the bypass to the load end is less than a voltage value of a current transmitted by the first main circuit to the load end, the first main circuit is cut off due to a reverse voltage, and the bypass transmits the current to the load end. When the voltage value of the current transmitted by the bypass to the load end is greater than the voltage value of the current transmitted by the first main circuit to the load end, the first main circuit is naturally conducted, and in this case, the bypass is cut off due to a reverse voltage. In this way, when the voltage value of the current supplied by the bypass is very high, seamless switching from the bypass transmitting the current to the load end to the first main circuit transmitting the current to the load end is completed. Therefore, in this example, when the power supply of the bypass exceeds an upper threshold, instantaneous switching from the power supply of the bypass to the power supply of the first main circuit can be performed, without continuously outputting a high-voltage signal for a period of time before switching to the power supply of the first main circuit, thereby shortening a time in which the UPS continuously outputs an abnormal current. This improves stability of a current outputted by the UPS.

In addition, although the bypass and the first main circuit simultaneously transmit the currents to the load end, there is a voltage difference between the currents transmitted by the bypass and the first main circuit. Therefore, a circuit with a low transmission voltage is automatically cut off due to a reverse voltage. There is no case in which the bypass and the first main circuit are simultaneously conducted to form a cross current, thereby avoiding affecting system reliability of the UPS due to the cross current formed by the two circuits that are simultaneously conducted.

Optionally, the uninterruptible power system further includes a second main circuit, and the second main circuit includes an inverter output unit and a bus. The inverter output unit includes an inverter and a second bidirectional switch. The inverter is connected to an output end of the bus and the second bidirectional switch, and the second bidirectional switch is further connected to the load end. The driving method for an uninterruptible power system further includes: controlling, by the second bidirectional switch in the second main circuit, to enter the first state or a third state, based on whether a second voltage value of a current outputted by the inverter in the second main circuit is greater than the actual voltage value of the current outputted by the load end. In the third state, the first bidirectional switch controls the first power input end to be disconnected from the load end; the inverter in the first main circuit performs DC-AC conversion on the current inputted from the output end of the bus, and transmits the current whose voltage value is the first voltage value to the second bidirectional switch; the second bidirectional switch in the first main circuit is turned off due to a reverse voltage; and the second bidirectional switch in the second main circuit is turned on, and the inverter in the second main circuit performs DC-AC conversion on the current inputted from the output end of the bus, and transmits a current whose voltage value is the second voltage value to the load end by using the second bidirectional switch. The driving method for an uninterruptible power system further includes: in the first state, when the first bidirectional switch is turned on in the first direction, performing, by the inverter in the second main circuit, DC-AC conversion on the current inputted from the output end of the bus, and transmitting the current whose voltage value is the second voltage value to the second bidirectional switch, where the second bidirectional switch in the second main circuit is turned off due to a reverse voltage in the second direction; and when the first bidirectional switch is driven in the second direction, performing, by the inverter in the second main circuit, DC-AC conversion on the current inputted from the output end of the bus, and transmitting the current whose voltage value is the second voltage value to the second bidirectional switch, where the second bidirectional switch in the second main circuit is turned off due to a reverse voltage in the first direction. The second voltage value is greater than the theoretical voltage value.

In the UPS provided in this example, the bypass, the first main circuit, and the second main circuit simultaneously transmit currents with different voltage values to the load end. When a voltage value of a current supplied by the bypass is very low, seamless switching from the bypass transmitting the current to the load end to the first main circuit transmitting a current to the load end can be completed. When the voltage value of the current supplied by the bypass is very high, seamless switching from the bypass transmitting the current to the load end to the second main circuit transmitting a current to the load end is completed. Therefore, when a supply voltage of the bypass is very low, instantaneous switching from the power supply of the bypass to the power supply of the first main circuit is performed. When the supply voltage of the bypass is very high, instantaneous switching from the power supply of the bypass to the power supply of the second main circuit is performed. This can ensure uninterrupted output of the UPS, and shorten a time in which the UPS outputs an abnormal current.

In addition, although the bypass, the first main circuit, and the second main circuit simultaneously transmit the currents to the load end, there is a voltage difference between the currents transmitted by the bypass, the first main circuit, and the second main circuit. Therefore, a circuit with a low transmission voltage is automatically cut off due to a reverse voltage. There is no case in which the bypass, the first main circuit, and the second main circuit are simultaneously conducted to form a cross current, thereby avoiding affecting system reliability of the UPS due to a cross current formed by two circuits that are simultaneously conducted.

According to a third aspect, a power management chip is provided, and is configured to perform the driving method for an uninterruptible power system according to any one of the second aspect.

Beneficial effects of the power management chip provided in the third aspect of this application are the same as beneficial effects of the driving method for an uninterruptible power system, and details are not described herein.

BRIEF DESCRIPTION OF DRAWINGS

FIG. 9a and FIG. 9b are diagrams of driving processes of the uninterruptible power system shown in FIG. 7a;

FIG. 9d and FIG. 9e are diagrams of driving processes of the uninterruptible power system shown in FIG. 7a;

DESCRIPTION OF EMBODIMENTS

The following describes the technical solutions in the embodiments of this application with reference to the accompanying drawings in the embodiments of this application. Apparently, the described embodiments are merely a part rather than all of the embodiments of this application.

The following terms "first", "second" and so on are merely intended for a purpose of description, and shall not be understood as an indication or implication of relative importance or implicit indication of the number of indicated technical features. Therefore, a feature limited by "first" or "second" may explicitly or implicitly include one or more features.

In addition, in this application, location terms such as "up", "down", "left", and "right" are defined relative to locations of components in the accompanying drawings, and it should be understood that these location terms are relative concepts. The location terms are used for relative description and clarification, and may vary accordingly with a change in the locations at which the components are placed in the accompanying drawings.

In this application, unless otherwise expressly specified and limited, "connection" should be understood in a broad sense. For example, "connection" may be a direct connection, or an indirect connection using an intermediate medium.

Figure 1:
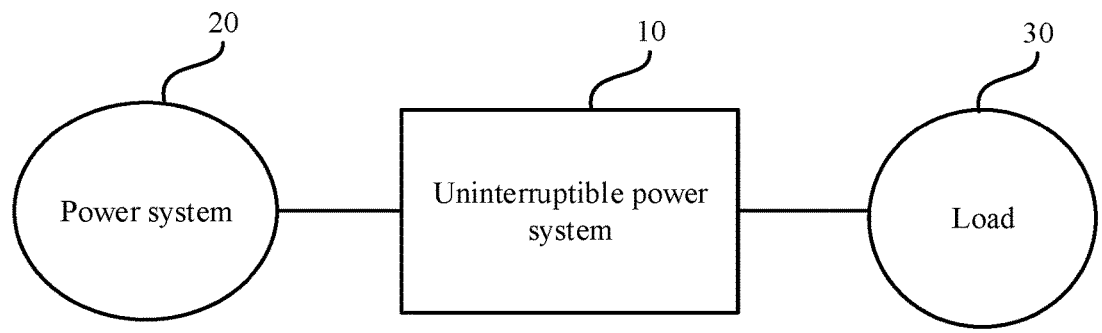
FIG. 1 is a diagram of an application scenario of an uninterruptible power system according to an embodiment of this application.

An uninterruptible power system (UPS) is a component for supplying power to a load requiring continuous power supply, for example, a computer. FIG. 1 shows a diagram of a UPS and a peripheral structure of the UPS.

A UPS 10 includes an input end and an output end. The input end of the UPS 10 is connected to a power system 20, and the output end of the UPS 10 is connected to a load 30, to implement uninterrupted power supply to the load 30.

The power system 20 may be, for example, a power plant, a substation, a mains transmission line, or the like. When the power system 20 is in a normal state, a part of power supplied by the power system 20 is transmitted to the load 30 by using the UPS 10, and a part of the power supplied by the power system 20 is stored in the UPS 10. When the power system 20 is in an abnormal state, the power system 20 cannot transmit power to the load 30, and in this case, power stored in the UPS 10 is transmitted to the load 30.

The load 30 consumes the power supplied by the power system 20. The load 30 may be, for example, electric equipment in a factory. The load 30 may alternatively be a communications device such as a server, a processor, or a memory in a data center.

The UPS 10 is an automatic system configured to immediately supply power without interruption when the power supplied by the power system 20 is interrupted or fails. If a voltage or a frequency of the power supplied by the power system 20 changes, or supply of the power from the power system 20 is instantaneously interrupted or changed, the UPS 10 stably supplies power. This reduces a possibility that data of the load 30 is damaged, lost, or deleted, and reduces a possibility that a control device shuts down or fails.

Figure 2:
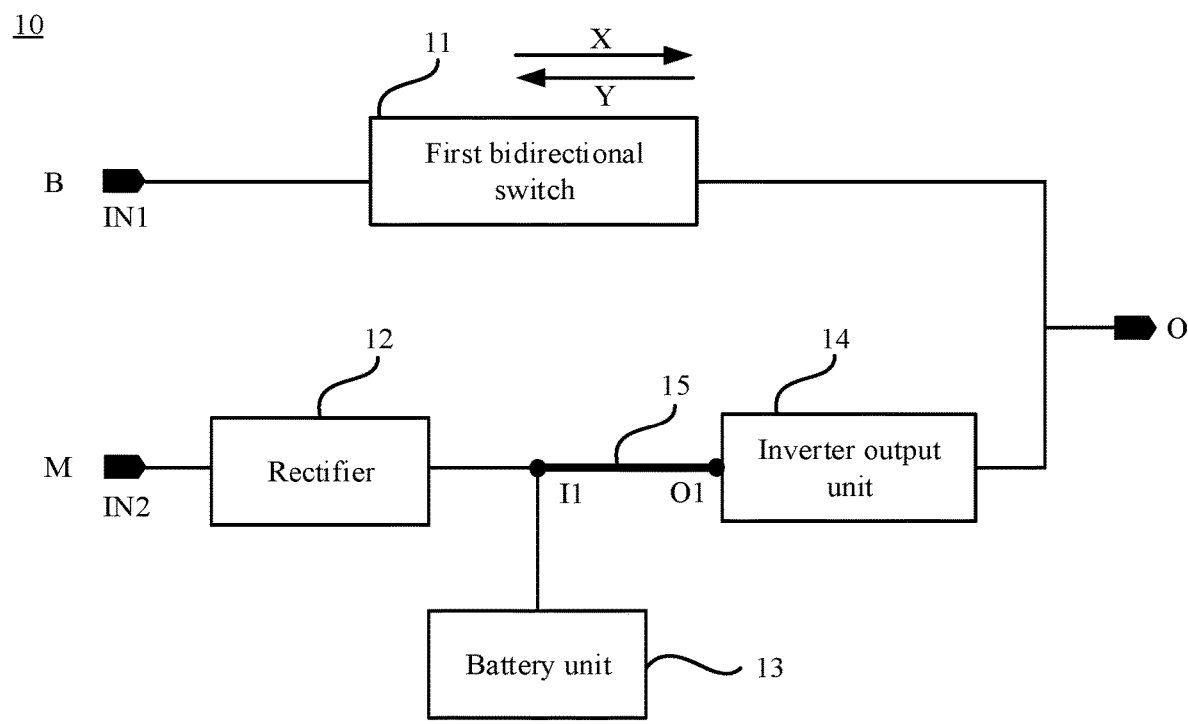
FIG. 2 is a diagram of an uninterruptible power system according to an embodiment of this application.

As shown in FIG. 2, an embodiment of this application provides a UPS 10, including a first power input end IN1, a second power input end IN2, a load end O, a bypass B, and at least one main circuit M.

The bypass B includes a first bidirectional switch 11.

The first bidirectional switch 11 is connected to the first power input end IN1 and the load end O, and is configured to control connection or disconnection between the first power input end IN1 and the load end O.

In an alternating current inputted by the first power input end IN1, a positive half-cycle current may pass through the first bidirectional switch 11, and a negative half-cycle current may also pass through the first bidirectional switch 11. The first bidirectional switch 11 may be, for example, a static transfer switch (STS).

In addition, the UPS 10 may further include, for example, a control unit, and the control unit is connected to the first bidirectional switch 11. The control unit may control the first bidirectional switch 11 to be turned on in a positive half cycle, to be turned on in a negative half cycle, or to be turned off.

Each main circuit M includes a rectifier 12, a battery unit 13, an inverter output unit 14, and a bus 15.

The rectifier 12 is also referred to as an alternating current (AC)/direct current (DC) converter. The rectifier 12 is connected to the second power input end IN2 and an input end I1 of the bus 15, and is configured to perform alternating current-direct current (AC-DC) conversion on a current inputted from the second power input end IN2, and then transmit a current to the input end I1 of the bus 15.

The first power input end IN1 and the second power input end IN2 may be connected to a same power system 20. For example, both the first power input end IN1 and the second power input end IN2 are connected to the mains. The first power input end IN1 and the second power input end IN2 may alternatively be connected to different power systems 20.

The battery unit 13 is connected to the input end I1 of the bus 15, and is configured to receive and store a current from the input end I1 of the bus 15, and is further configured to output a current stored in the battery unit 13 to the input end I1 of the bus 15.

The battery unit 13 may include, for example, an energy storage battery such as a lithium iron phosphate (LiFePO4, LPF) battery or a valve regulated lead acid (VRLA) battery.

When the bypass B supplies power to the load end O, the battery unit 13 is configured to receive and store the current inputted from the input end I1 of the bus 15.

When the bypass B is abnormal, and the main circuit M supplies power to the load end O, if the first power input end IN1 and the second power input end IN2 are connected to a same power system 20, power supply of the first power input end IN1 is abnormal. In other words, power supply of the power system 20 connected to the first power input end IN1 is abnormal. Therefore, power supply of the second power input end IN2 is also abnormal. In this case, the battery unit 13 outputs the current stored in the battery unit 13 to the input end I1 of the bus 15, to supply power to the load end O.

When the bypass B is abnormal, and the main circuit M supplies power to the load end O, if the first power input end IN1 and the second power input end IN2 are connected to different power systems 20, the second power input end IN2 outputs a current to the input end I1 of the bus 15, to supply power to the load end O. After the current of the second power input end IN2 becomes abnormal, the battery unit 13 outputs the current stored in the battery unit 13 to the input end I1 of the bus 15, to supply power to the load end O.

The input end I1 of the bus 15 is connected to the second power input end IN2 by using the rectifier 12, and the output end O1 of the bus 15 is connected to the inverter output unit 14, to transmit currents transmitted by the rectifier 12 and the battery unit 13 to the inverter output unit 14.

The inverter output unit 14 is further connected to the load end O, and is configured to control whether to perform direct current-alternating current (DC-AC) conversion on a current inputted from the output end O1 of the bus 15, and transmit a current to the load end O.

Herein, the inverter output unit 14 not only has a function of an inverter (or referred to as a DC/AC converter), that is, performing direct current-alternating current (DC-AC) conversion on the current inputted from the output end O1 of the bus 15, but also has a function of controlling connection or disconnection between the output end O1 of the bus 15 and the load end O.

In a first state, the mains is normal, the first power input end IN1 receives power from the mains, the first bidirectional switch 11 is turned on, and a current received by the first power input end IN1 is transmitted to the load end O by using the first bidirectional switch 11.

The mains transmits an alternating current. Therefore, when the first power input end IN1 transmits a positive half-cycle current, the first bidirectional switch 11 is turned on in a first direction X, and a current received by the first power input end IN1 is transmitted to the load end O by using the first bidirectional switch 11. When the first power input end IN1 transmits a negative half-cycle current, the first bidirectional switch 11 is turned on in a second direction Y, and a current received by the first power input end IN1 is transmitted to the load end O by using the first bidirectional switch 11. Herein, the first direction X and the second direction Y are mutually a direction flowing to the load end O and a direction departing from the load end O. This embodiment of this application illustrates an example in which the first direction X is the direction flowing to the load end O, and the second direction Y is the direction departing from the load end O.

At the same time, the second power input end IN2 receives power from the mains. The rectifier 12 performs alternating current-direct current (AC-DC) conversion on a current received by the second power input end IN2, and then transmits a current to the input end I1 of the bus 15. The battery unit 13 receives and stores a current from the input end I1 of the bus 15. The inverter output unit 14 receives a current from the input end I1 of the bus 15, but does not transmit the received current to the load end O.

Therefore, in the first state, a current received by a load 30 connected to the load end O is a current transmitted by the bypass B.

In a second state, when the mains fails, that is, a voltage value of the current received by the first power input end IN1 abruptly drops or increases, and exceeds a lower threshold or an upper threshold (the lower threshold and the upper threshold may be set as required), At a moment when the mains fails, the first bidirectional switch 11 is turned off, and the first power input end IN1 is disconnected from the load end O.

At the same time, the inverter output unit 14 performs DC-AC conversion on the current received from the input end I1 of the bus 15, and then transmits a current to the load end O.

Therefore, in the second state, the current received by the load 30 connected to the load end O is a current transmitted by the main circuit M.

It should be noted that, to ensure instantaneous switching between the first state and the second state in a power supply process of the UPS 10, a voltage value of a current outputted by the inverter output unit 14 in the main circuit M is different from a theoretical voltage value of a current outputted by the first power input end IN1.

The voltage value of the current outputted by the inverter output unit 14 may be greater than the theoretical voltage value of the current outputted by the first power input end IN1, and the voltage value of the current outputted by the inverter output unit 14 may alternatively be less than the theoretical voltage value of the current outputted by the first power input end IN1.

When the UPS 10 has an ultra-low voltage protection function, that is, when a voltage value of a current supplied by the bypass B is very low, power supply of the bypass B is determined to be abnormal, and switching to power supply of the main circuit M is performed, the voltage value of the current outputted by the inverter output unit 14 is less than the theoretical voltage value of the current outputted by the first power input end IN1. The voltage value of the current outputted by the inverter output unit 14 in the main circuit M is a lower threshold of a current outputted by the UPS 10. When a voltage value of the current outputted by the first power input end IN1 changes and abruptly drops to the voltage value of the current outputted by the inverter output unit 14, instantaneous switching to power supply of the main circuit M is performed, and a range of a voltage value of the current outputted by the UPS 10 is between the voltage value of the current outputted by the inverter output unit 14 and the theoretical voltage value of the current outputted by the first power input end IN1.

When the UPS 10 has an ultra-high voltage protection function, that is, when the voltage value of the current supplied by the bypass B is very high, the power supply of the bypass B is determined to be abnormal, and switching to the power supply of the main circuit M is performed, the voltage value of the current outputted by the inverter output unit 14 is greater than the theoretical voltage value of the current outputted by the first power input end IN1. The voltage value of the current outputted by the inverter output unit 14 in the main circuit M is an upper threshold of the current outputted by the UPS 10. When the voltage value of the current outputted by the first power input end IN1 changes and abruptly increases to the voltage value of the current outputted by the inverter output unit 14, instantaneous switching to the power supply of the main circuit M is performed, and the range of the voltage value of the current outputted by the UPS 10 is between the theoretical voltage value of the current outputted by the first power input end IN1 and the voltage value of the current outputted by the inverter output unit 14.

Based on this, it can be understood that, when the UPS 10 includes one main circuit M, the UPS 10 may have the ultra-low voltage protection function, or the UPS 10 may have the ultra-high voltage protection function. When the UPS 10 includes a plurality of main circuits M, the UPS 10 may have both the ultra-low voltage protection function and the ultra-high voltage protection function.

Based on the foregoing, in an embodiment, when a voltage value of a current transmitted from the first power input end IN1 to the load end O abruptly drops and exceeds the lower threshold (that is, the voltage value of the current outputted by the inverter output unit 14), switching from the power supply of the bypass B to the power supply of the main circuit M is performed. In this case, the voltage value of the current outputted by the inverter output unit 14 is less than the theoretical voltage value of the current outputted by the first power input end IN1.

Figure 3A:
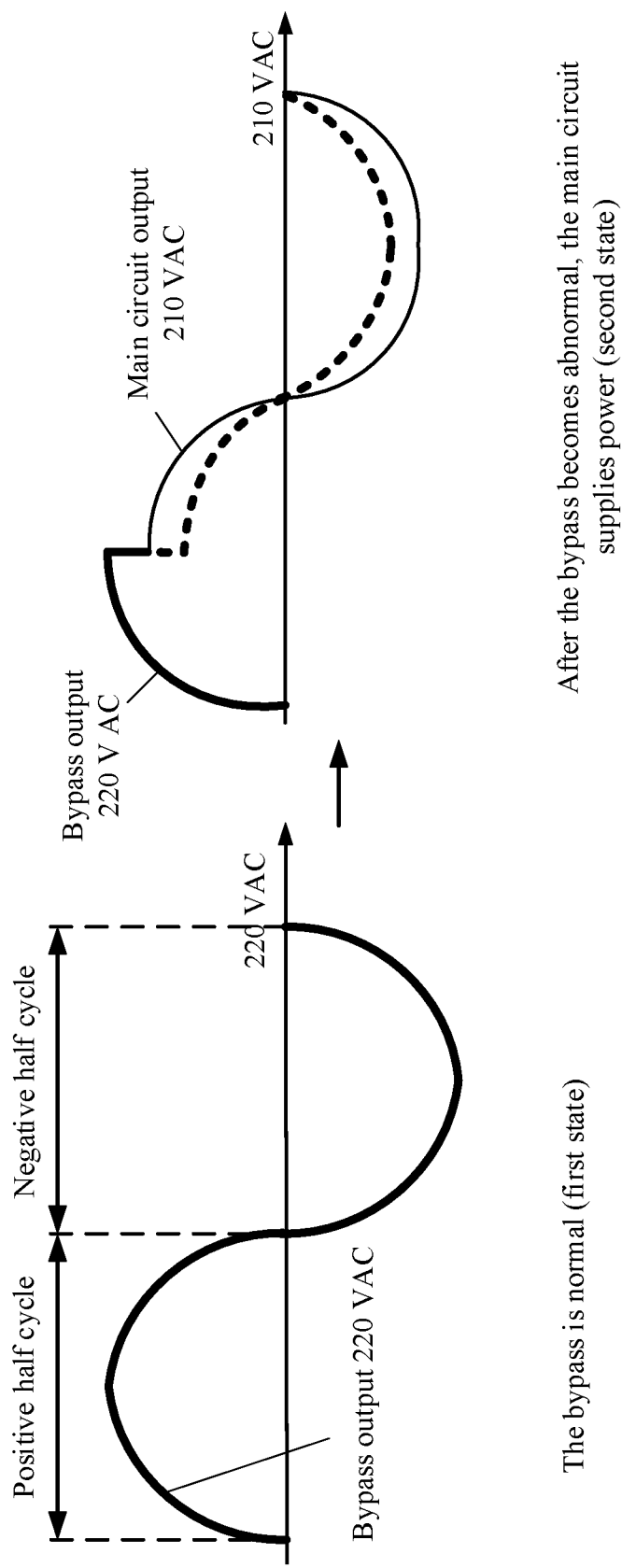
FIG. 3a is a diagram of an output signal of an uninterruptible power system according to an embodiment of this application.

As shown in FIG. 3a, for example, the voltage value of the current outputted by the inverter output unit 14 is 210 VAC (a thin line), and the theoretical voltage value of the current outputted by the first power input end IN1 is 220 VAC (a thick line). When the voltage value of the current outputted by the first power input end IN1 is normal, the bypass B supplies power. In this case, no current in the main circuit M is outputted to the load end O (as shown in a left figure in FIG. 3a). When the voltage value of the current outputted by the first power input end IN1 abruptly drops below the lower threshold, that is, a voltage value of a current transmitted to the load end O is lower than the lower threshold and continuously drops to 210 VAC, in this case, the UPS directly switches to the second state, and the main circuit M replaces the bypass B to transmit a current to the load end O (as shown in a right figure in FIG. 3a). In FIG. 3a, a solid curve represents a current received by the load end O, and a dashed line represents a current not received by the load end O.

In another embodiment, when a voltage value of a current transmitted from the first power input end IN1 to the load end O abruptly increases and exceeds the upper threshold (that is, the voltage value of the current outputted by the inverter output unit 14), switching from the power supply of the bypass B to the power supply of the main circuit M is performed. In this case, the voltage value of the current outputted by the inverter output unit 14 is greater than the theoretical voltage value of the current outputted by the first power input end IN1.

Figure 3B:
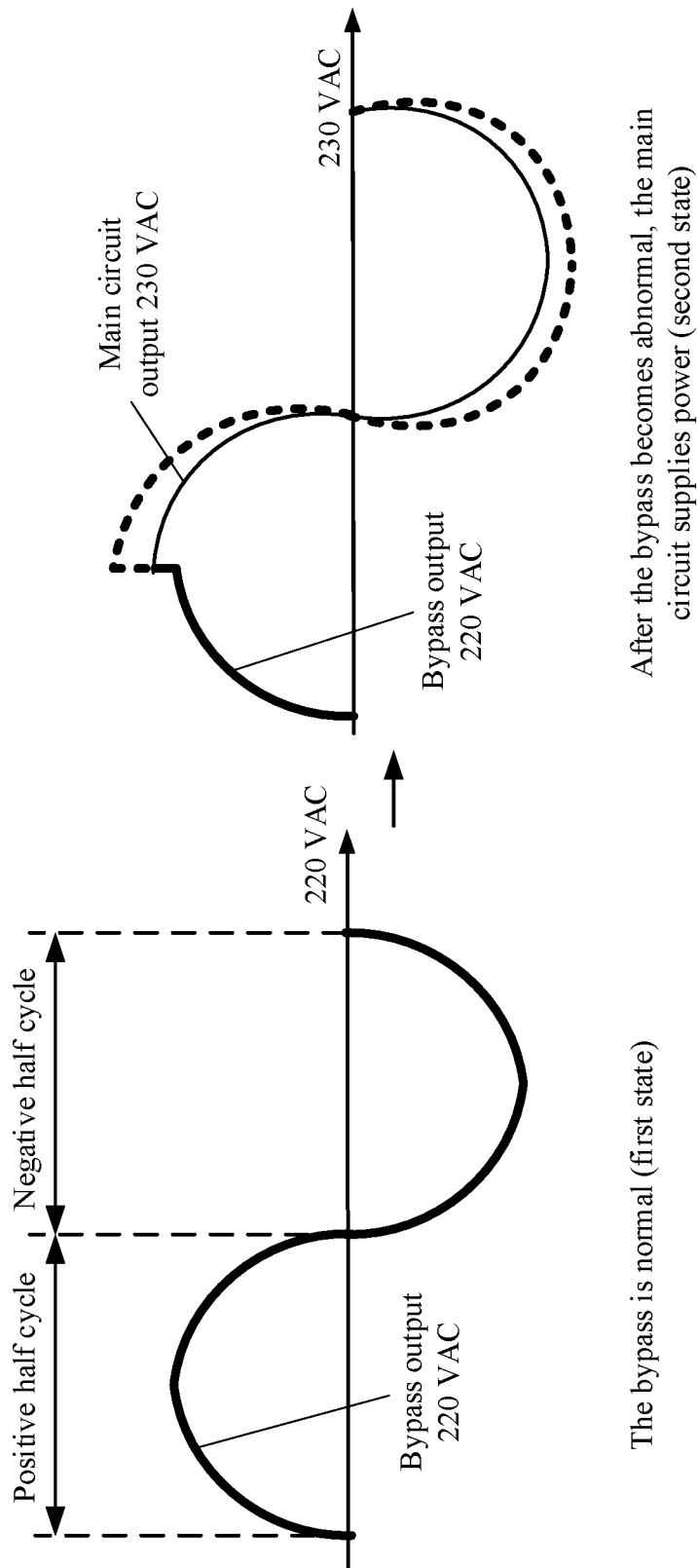
FIG. 3b is a diagram of another output signal of an uninterruptible power system according to an embodiment of this application.

As shown in FIG. 3b, for example, the voltage value of the current outputted by the inverter output unit 14 is 230 VAC (a thin line), and the theoretical voltage value of the current outputted by the first power input end IN1 is 220 VAC (a thick line). When the voltage value of the current outputted by the first power input end IN1 is normal, the bypass B supplies power. In this case, no current in the main circuit M is outputted to the load end O (as shown in a left figure in FIG. 3b). When the voltage value of the current outputted by the first power input end IN1 abruptly increases and exceeds the upper threshold, that is, a voltage value of a current transmitted to the load end O abruptly increases and continuously increases to 230 VAC, switching to the second state is directly performed, and the main circuit M replaces the bypass B to transmit a current to the load end O (as shown in a right figure in FIG. 3b). In FIG. 3b, a solid curve represents a current received by the load end O, and a dashed line represents a current not received by the load end O.

Based on the foregoing, it can be learned that a voltage value of a current outputted by the main circuit M to the load end O is different from a voltage value of a current outputted by the bypass B to the load end O. In this embodiment of this application, a value of a difference between the voltage value of the current outputted by the main circuit M to the load end O and the voltage value of the current outputted by the bypass path B to the load end O is not limited. The foregoing is merely an example for description.

In the UPS 10 provided in this embodiment of this application, the inverter output unit 14 controls a current in the main circuit M, so that when a voltage of a current in the bypass B is normal, the current in the main circuit M is controlled to be interrupted. When the voltage of the current in the bypass B is abnormal, the main circuit M is controlled to be connected, to output a current to the load end O, thereby completing power supply switching from the bypass B to the main circuit M.

In addition, for example, when a voltage value of a current transmitted from the first power input end IN1 to the load end O abruptly drops and exceeds the lower threshold, switching from the power supply of the bypass B to the power supply of the main circuit M is performed. As shown in FIG. 3a, a voltage value (for example, 210 VAC) of the current outputted by the inverter output unit 14 is less than the theoretical voltage value (for example, 220 VAC) of the current outputted by the first power input end IN1. Therefore, when the voltage value of the current of the first power input end IN1 abruptly drops, causing an actual voltage value of the current received by the load end O to be less than the voltage value of the current outputted by the inverter output unit 14, instantaneous switching to the main circuit M is continuously performed to supply power to the load end O (as shown in the right figure in FIG. 3a). In other words, when a voltage value of a current supplied by the bypass B to the load end O is less than a voltage value of a current supplied by the main circuit M to the load end O, automatic switching to the main circuit M is performed to supply a current to the load end O. This implements seamless switching from the power supply of the bypass B to the power supply of the main circuit M, and ensures uninterrupted output of the UPS 10.

The UPS 10 provided in this embodiment of this application is described below by using several examples.

Example 1

In example 1, the UPS 10 includes a bypass B and a first main circuit M1, and a voltage value of a current supplied by the first main circuit M1 to the load end O is different from a voltage value of a current supplied by the bypass B to the load end O.

Figure 4:
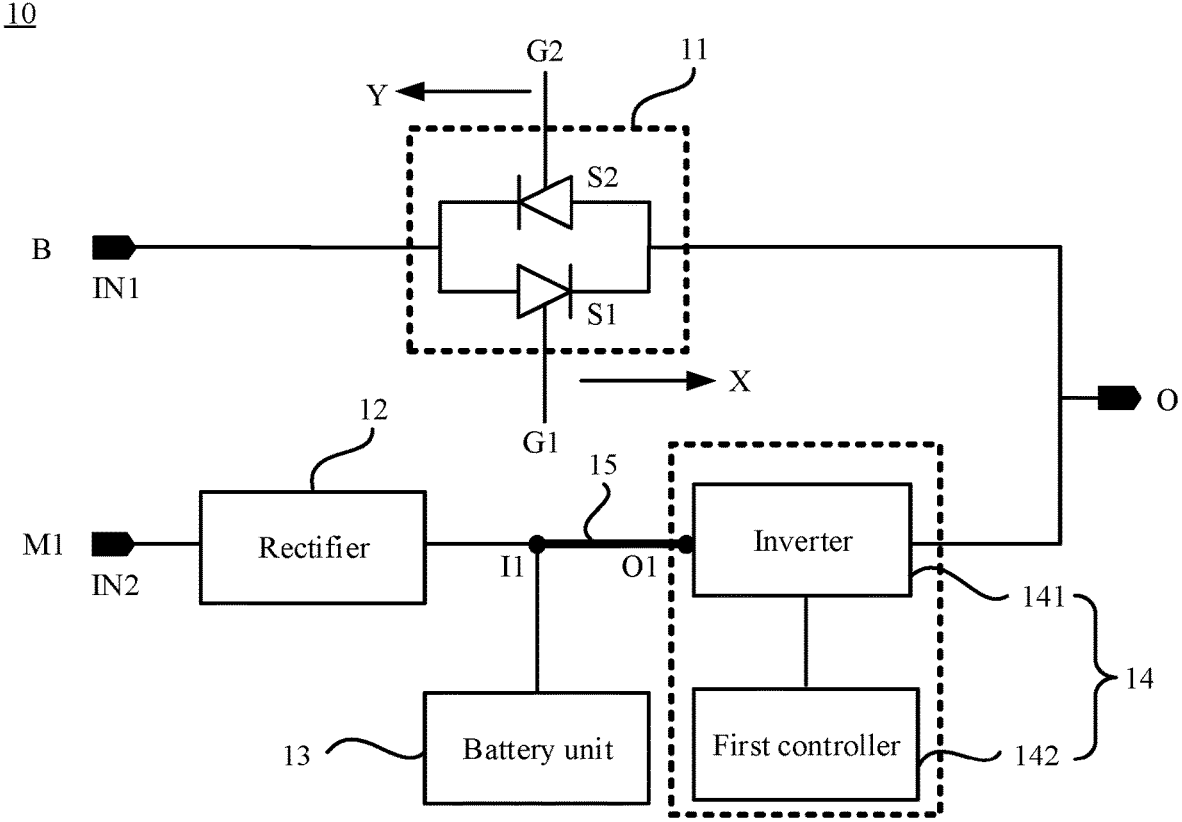
FIG. 4 is a diagram of another uninterruptible power system according to an embodiment of this application.

As shown in FIG. 4, the UPS 10 includes a first power input end IN1, a second power input end IN2, and a load end O.

The UPS 10 further includes the bypass B, and the bypass B includes a first bidirectional switch 11.

The first bidirectional switch 11 is connected to the first power input end IN1 and the load end O of the UPS 10, and is configured to control connection or disconnection between the first power input end IN1 and the load end O.

In some embodiments, as shown in FIG. 4, the first bidirectional switch 11 includes a first silicon controlled rectifier (SCR) S1 and a second silicon controlled rectifier S2.

An anode of the first silicon controlled rectifier S1 is connected to the first power input end IN1, and a cathode of the first silicon controlled rectifier S1 is connected to the load end O. When a gate G1 of the first silicon controlled rectifier S1 receives a turn-on signal, the first silicon controlled rectifier S1 is driven, and the first bidirectional switch 11 is turned on in a first direction X, to transmit a positive half-cycle signal of an alternating current signal.

An anode of the second silicon controlled rectifier S2 is connected to the load end O, and a cathode of the second silicon controlled rectifier S2 is connected to the first power input end IN1. When a gate G2 of the second silicon controlled rectifier S2 receives a turn-on signal, the second silicon controlled rectifier S2 is driven, and the first bidirectional switch 11 is turned on in a second direction Y, to transmit a negative half-cycle signal of the alternating current signal.

The gate G1 of the first silicon controlled rectifier S1 and the gate G2 of the second silicon controlled rectifier S2 may be connected to, for example, a control unit of the UPS 10, and the control unit controls whether to drive the first silicon controlled rectifier S1 and the second silicon controlled rectifier S2.

When the first silicon controlled rectifier S1 is driven, the second silicon controlled rectifier S2 is not driven, and the first bidirectional switch 11 is turned on in the first direction X, to transmit a current of the first power input end IN1 to the load end O. Similarly, when the second silicon controlled rectifier S2 is driven, the first silicon controlled rectifier S1 is not driven, and the first bidirectional switch 11 is turned on in the second direction Y, to transmit the current of the first power input end IN1 to the load end O. When power supply of the bypass B is abnormal, the first bidirectional switch 11 is turned off due to a reverse voltage, and the first power input end IN1 is disconnected from the load end O.

The UPS 10 further includes the first main circuit M1, and the first main circuit M1 includes a rectifier 12, a battery unit 13, an inverter output unit 14, and a bus 15.

The rectifier 12 is connected to the second power input end IN2 and an input end I1 of the bus 15, and is configured to perform AC-DC conversion on a current inputted from the second power input end IN2, and then transmit a current to the input end I1 of the bus 15.

The first power input end IN1 and the second power input end IN2 may be connected to a same power system 20. For example, both the first power input end IN1 and the second power input end IN2 are connected to the mains. The first power input end IN1 and the second power input end IN2 may alternatively be connected to different power systems 20. This example is described by using an example in which the first power input end IN1 and the second power input end IN2 are connected to the same power system 20 that is the mains.

The battery unit 13 is connected to the input end I1 of the bus 15, and is configured to receive and store a current from the input end I1 of the bus 15, and is further configured to output a current stored in the battery unit 13 to the input end I1 of the bus 15.

The battery unit 13 may include, for example, an energy storage battery such as a lithium iron (LiFePO4, LPF) battery or a valve regulated lead acid (VRLA) battery.

When the bypass B is abnormal, and the main circuit M supplies power to the load end O, if the first power input end IN1 and the second power input end IN2 are connected to a same power system 20, power supply of the first power input end IN1 is abnormal. In other words, power supply of the power system 20 connected to the first power input end IN1 is abnormal. Therefore, power supply of the second power input end IN2 is also abnormal. In this case, the battery unit 13 outputs the current stored in the battery unit 13 to the input end I1 of the bus 15, to supply power to the load end O.

When the bypass B is abnormal, and the main circuit M supplies power to the load end O, if the first power input end IN1 and the second power input end IN2 are connected to different power systems 20, the second power input end IN2 first outputs a current to the input end I1 of the bus 15, to supply power to the load end O. After the current of the second power input end IN2 becomes abnormal, the battery unit 13 outputs the current stored in the battery unit 13 to the input end I1 of the bus 15, to supply power to the load end O.

The inverter output unit 14 includes an inverter 141 and a first controller 142. The inverter (or referred to as a DC/AC converter) 141 is connected to an output end O1 of the bus 15, the load end O, and the first controller 142, and the inverter 141 is turned on under control of the first controller 142, and is configured to perform direct current-alternating current (DC-AC) conversion on a current inputted from the output end O1 of the bus 15, and then transmit a current to the load end O.

In other words, the first controller 142 is configured to control whether to turn on the inverter 141 (or understood as whether the inverter 141 outputs a current). When the inverter 141 is turned on, the first main circuit M1 is conducted, and the second power input end IN2 is connected to the load end O. When the inverter 141 is turned off, the first main circuit M1 is cut off, and the second power input end IN2 is disconnected from the load end O.

For example, the first controller 142 may be integrated in the control unit of the UPS 10, or integrated in the inverter 141.

Based on the UPS 10 shown in FIG. 4, in an embodiment, the voltage value of the current transmitted by the bypass B to the load end O abruptly drops and exceeds a lower threshold (a first voltage value of the current outputted by the inverter 141 in the first main circuit M1), the bypass B is cut off, and the first main circuit M1 supplies power.

Figure 5A:
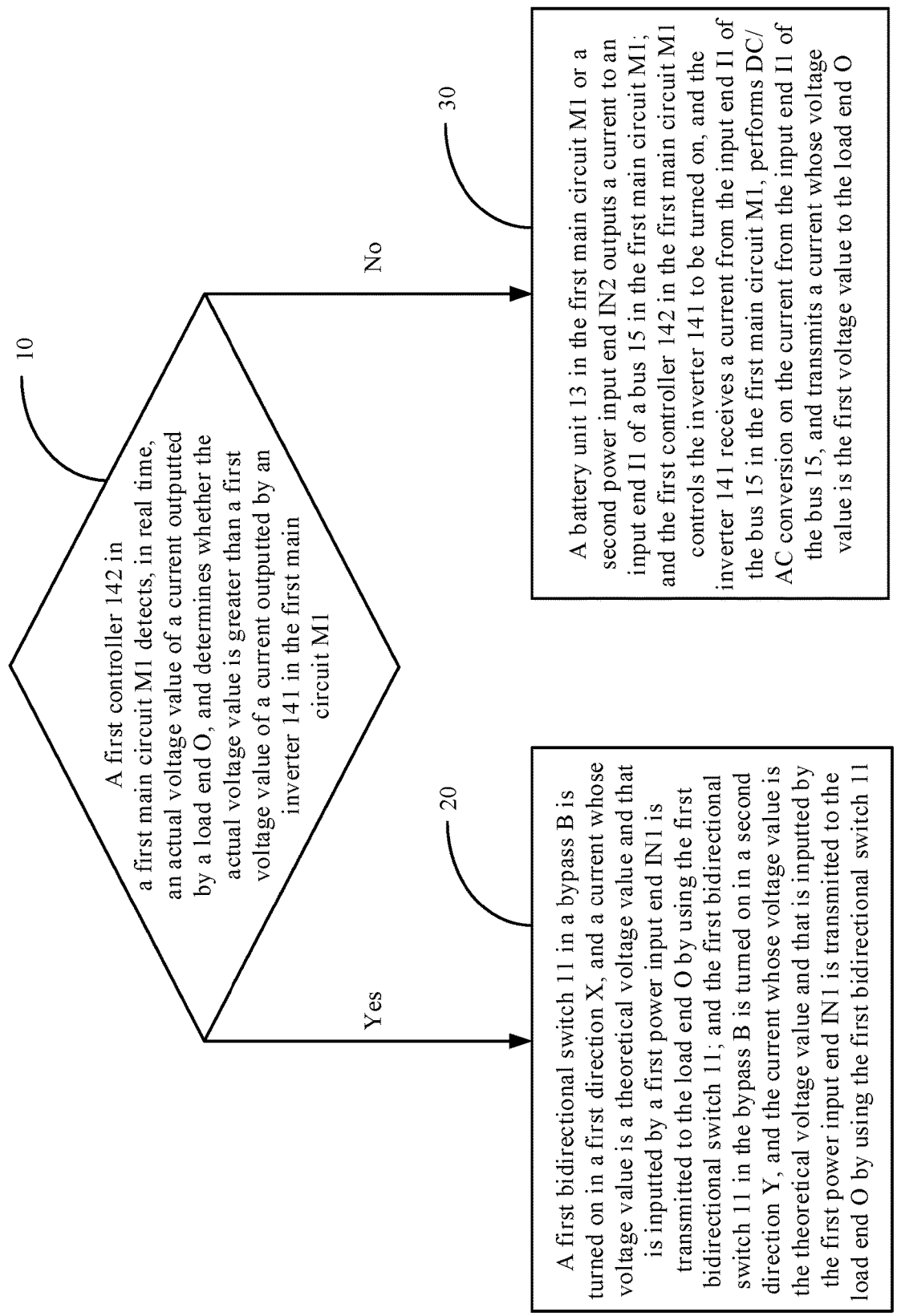
FIG. 5a is a diagram of a driving method for the uninterruptible power system shown in FIG. 4 according to an embodiment of this application.

As shown in FIG. 5a, a driving method for the UPS 10 includes the following steps:

S10. The first controller 142 in the first main circuit M1 detects, in real time, an actual voltage value of a current outputted by the load end O, and determines whether the actual voltage value is greater than the first voltage value of the current outputted by the inverter 141 in the first main circuit M1.

If the actual voltage value of the current outputted by the load end O is greater than the first voltage value of the current outputted by the inverter 141 in the first main circuit M1, a first state is entered.

If the actual voltage value of the current outputted by the load end O is less than the first voltage value of the current outputted by the inverter 141 in the first main circuit M1, a second state is entered.

Figure 5B:
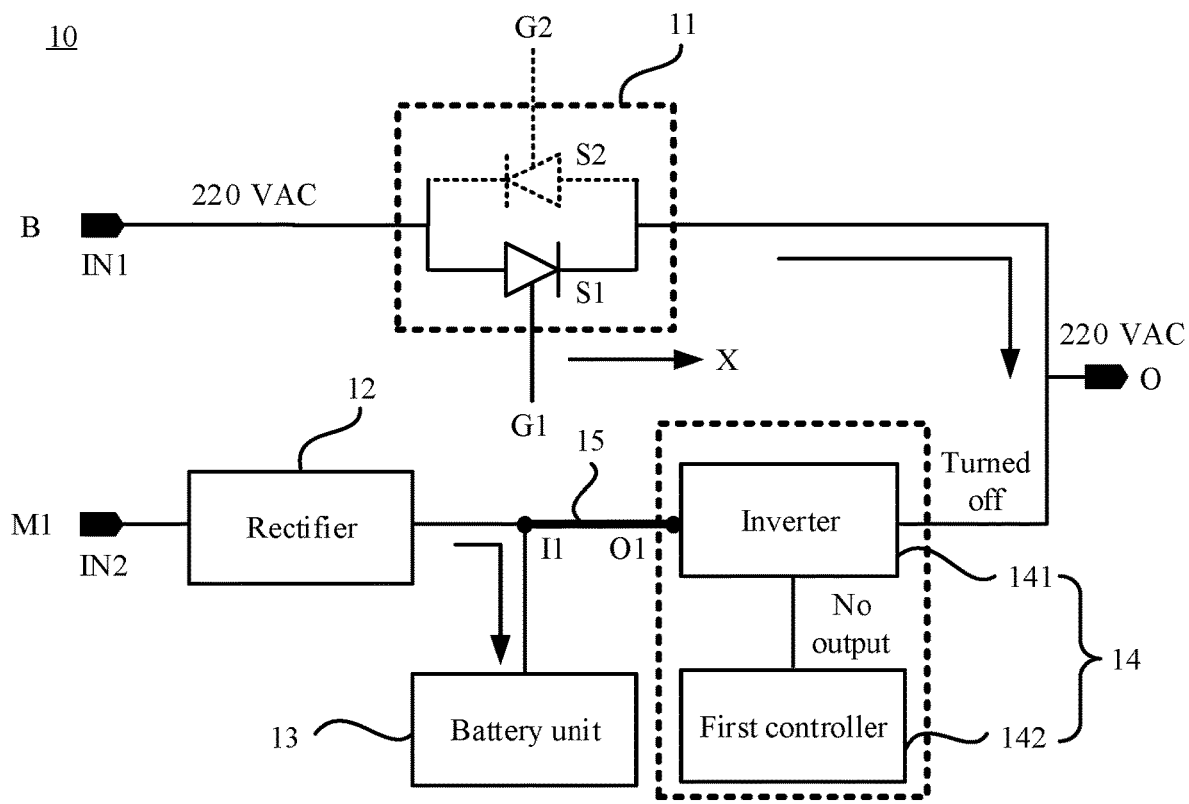
FIG. 5b and FIG. 5c are diagrams of driving processes of the uninterruptible power system shown in FIG. 4.

S20. In the first state:

As shown in FIG. 5b, the first bidirectional switch 11 in the bypass B is turned on in the first direction X, and a current whose voltage value is a theoretical voltage value and that is inputted by the first power input end IN1 is transmitted to the load end O by using the first bidirectional switch 11.

For example, the first silicon controlled rectifier S1 in the first bidirectional switch 11 is driven, the second silicon controlled rectifier S2 is not driven, and the first bidirectional switch 11 is turned on in the first direction X.

At the same time, the rectifier 12 in the first main circuit M1 performs AC-DC conversion on a current inputted from the second power input end IN2 in the first main circuit M1, and then transmits a current to the input end I1 of the bus 15 in the first main circuit M1. The battery unit 13 in the first main circuit M1 receives and stores a current from the input end I1 of the bus 15. The first controller 142 in the first main circuit M1 controls the inverter 141 in the first main circuit M1 to be turned off, and the current of the input end I1 of the bus 15 is not transmitted to the load end O.

In this case, a positive half-cycle equivalent logic diagram of the UPS 10 is shown in FIG. 5b.

Figure 5C:
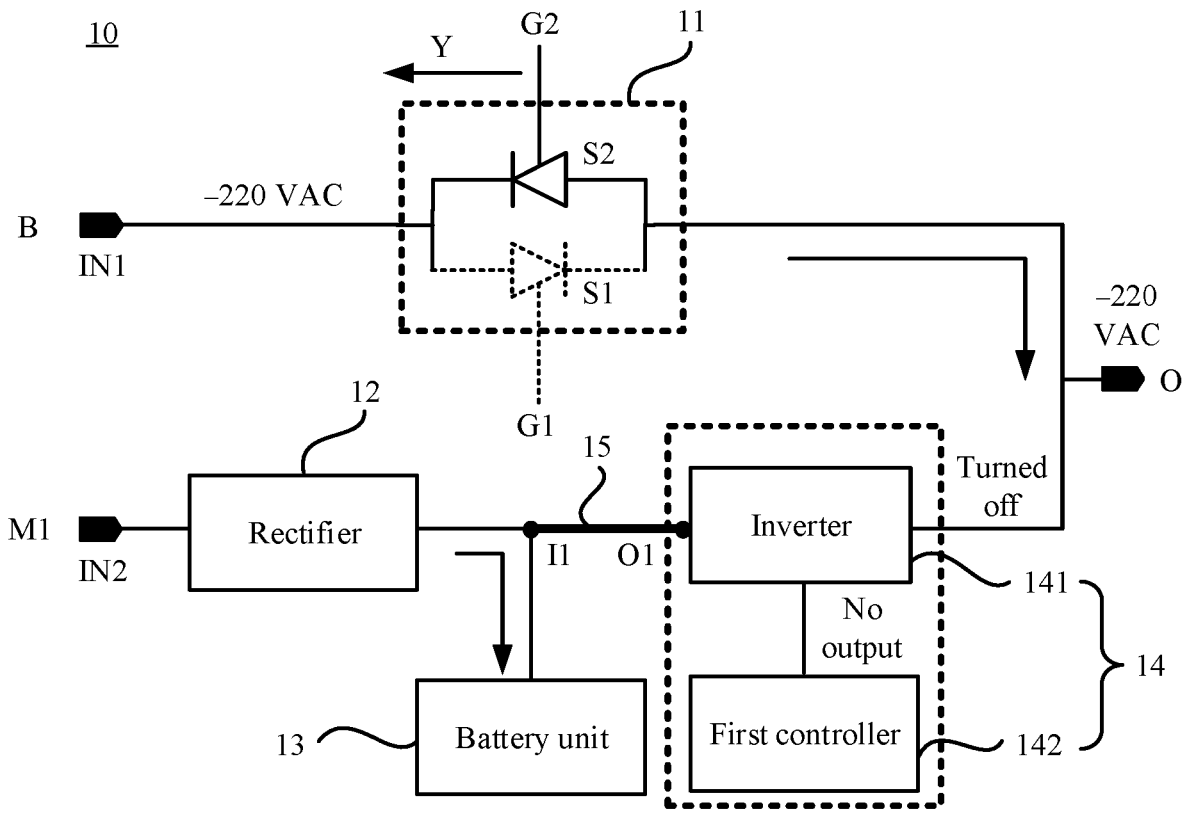

As shown in FIG. 5c, the first bidirectional switch 11 in the bypass B is turned on in the second direction Y, and the current whose voltage value is the theoretical voltage value and that is inputted by the first power input end IN1 is transmitted to the load end O by using the first bidirectional switch 11.

For example, the second silicon controlled rectifier S2 in the first bidirectional switch 11 is driven, the first silicon controlled rectifier S1 is not driven, and the first bidirectional switch 11 is turned on in the second direction Y.

At the same time, the rectifier 12 in the first main circuit M1 performs AC-DC conversion on a current inputted from the second power input end IN2 in the first main circuit M1, and then transmits a current to the input end I1 of the bus 15 in the first main circuit M1. The battery unit 13 in the first main circuit M1 receives and stores a current from the input end I1 of the bus 15. The first controller 142 in the first main circuit M1 controls the inverter 141 in the first main circuit M1 to be turned off, and the current of the input end I1 of the bus 15 is not transmitted to the load end O.

In this case, a negative half-cycle equivalent logic diagram of the UPS 10 is shown in FIG. 5c.

Therefore, as shown in the left figure in FIG. 3a, in the first state, the bypass B transmits a current to the load end O, and the first main circuit M1 does not transmit a current to the load end O.

Figure 5D:
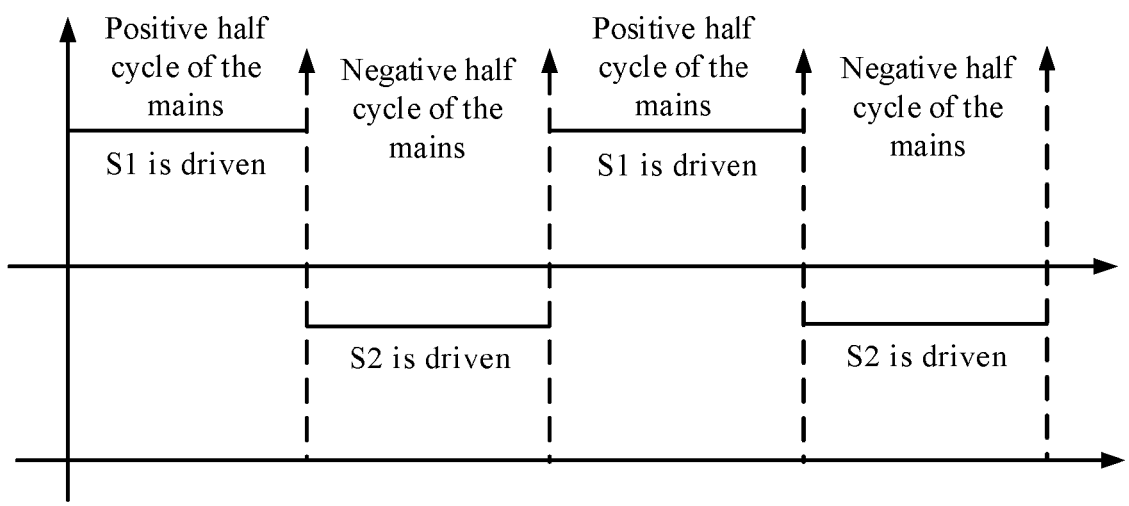
FIG. 5d is a diagram of a driving process of a first bidirectional switch according to an embodiment of this application.

The foregoing completes current transmission of one cycle of an alternating current. As shown in FIG. 5d, driving of a positive half cycle and driving of a negative half cycle are repeated, and the foregoing process is repeated so that the bypass B continuously supplies power to the load end O.

Based on the UPS 10 shown in FIG. 4, the bypass B does not include a component configured to change a voltage value on the bypass B. Therefore, the theoretical voltage value of the current inputted by the first power input end IN1 is equal to the actual voltage value of the current outputted by the load end O when the bypass B supplies power. For example, the theoretical voltage value of the current inputted by the first power input end IN1 is 220 VAC, and the actual voltage value of the current outputted by the load end O is also 220 VAC.

Figure 5E:
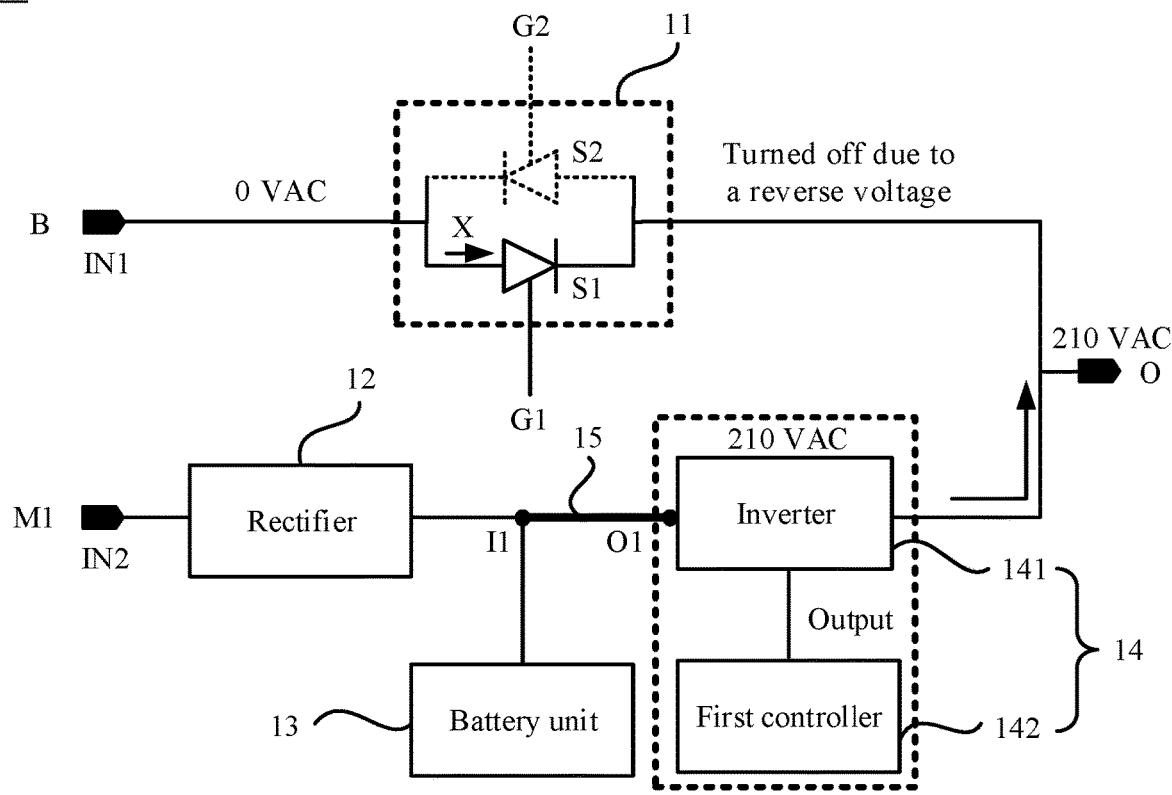
FIG. 5e is a diagram of a driving process of the uninterruptible power system shown in FIG. 4.

S30. In the second state:

As shown in FIG. 5e, the first bidirectional switch 11 in the bypass B controls the first power input end IN1 to be disconnected from the load end O.

In other words, the first bidirectional switch 11 in the bypass B is turned off, and the current of the first power input end IN1 cannot be transmitted to the load end O.

For a manner in which the first bidirectional switch 11 is turned off, positive half-cycle driving is used as an example. As shown in FIG. 5e, the first silicon controlled rectifier S1 in the first bidirectional switch 11 is controlled to be driven, and the second silicon controlled rectifier S2 is not driven. However, a voltage (for example, 210 VAC) of the cathode of the first silicon controlled rectifier S1 is greater than a voltage (for example, 0 VAC) of the anode of the first silicon controlled rectifier S1, the first silicon controlled rectifier S1 is turned off due to a reverse voltage, and the first bidirectional switch 11 is turned off.

As shown in FIG. 5e, the battery unit 13 in the first main circuit M1 or the second power input end IN2 outputs a current to the input end I1 of the bus 15 in the first main circuit M1. The first controller 142 in the first main circuit M1 controls the inverter 141 to be turned on, and the inverter 141 receives a current from the input end I1 of the bus 15 in the first main circuit M1, performs DC-AC conversion on the current from the input end I1 of the bus 15, and transmits a current whose voltage value is the first voltage value to the load end O.

In this case, a positive half-cycle equivalent logic diagram of the UPS 10 is shown in FIG. 5e, and a difference between a negative half-cycle equivalent logic diagram and the positive half-cycle equivalent logic diagram lies in that the first silicon controlled rectifier S1 in the first bidirectional switch 11 is not driven, and the second silicon controlled rectifier S2 is driven.

The first voltage value of the current outputted by the inverter 141 is a fixed value, and the first voltage value is less than the theoretical voltage value of the current inputted by the first power input end IN1. Therefore, when power supply of the bypass B is normal, a detected actual voltage value of the current outputted by the load end O should be greater than the first voltage value. When it is detected that the actual voltage value of the current outputted by the load end O is less than the first voltage value, the power supply of the bypass B is determined to be abnormal, the second state is entered, and the first main circuit M1 starts to supply power.

Therefore, as shown in the right figure in FIG. 3a, after the first state ends and the second state is entered, the first main circuit M1 transmits a current to the load end O, and the bypass B does not transmit a current to the load end O. For example, the first voltage value of the current outputted by the inverter 141 is 210 VAC. In this case, the voltage value of the current outputted by the load end O is also 210 VAC.

The first voltage value of the current outputted by the inverter 141 is a fixed value, and a value may be properly set as required, as long as the first voltage value of the current outputted by the inverter 141 is less than the theoretical voltage value of the current outputted by the first power input end IN1. For example, a value of the first voltage value of the current outputted by the inverter 141 may be controlled by using the control unit in the UPS 10.

In the UPS 10 provided in this example, the first controller 142 collects, in real time, the actual voltage value of the current outputted by the load end O, and compares the collected actual voltage value (an instantaneous value) of the current outputted by the load end O with the first voltage value (a fixed value) of the current outputted by the inverter 141. When the actual voltage value is greater than the first voltage value, output of the bypass B is determined to be normal, and the bypass B supplies power to the load end O. In this case, the first controller 142 controls the inverter 141 not to output a current. When the actual voltage value is less than the first voltage value, the output of the bypass B is determined to be abnormal, and the first main circuit M1 supplies power to the load end O. In this case, the first controller 142 controls the inverter 141 to output a current whose voltage value is the first voltage value. In this way, when the voltage value of the current supplied by the bypass B is very low, switching from the power supply of the bypass B to power supply of the first main circuit M1 is completed.

In addition, in this example, whether the power supply of the bypass B is normal is determined by collecting an instantaneous value of the actual voltage value of the current outputted by the load end O. Compared with a manner in the related art in which whether the power supply of the bypass B is normal is determined by collecting an interval value that is of the actual voltage value of the current outputted by the load end O and that is in at least half a cycle of an alternating current signal, the method provided in this example is faster to determine whether the power supply of the bypass B is normal, which can be almost instantaneously completed with no detection time.

Further, in the related art, because it takes a relatively long time to determine whether the power supply of the bypass B is abnormal, power supply of the UPS 10 is interrupted, and the power supply is restored only after the first main circuit M1 supplies power. However, in the UPS 10 provided in this example, as shown in FIG. 3a, when the voltage value of the current transmitted from the first power input end IN1 to the load end O abruptly drops, the bypass B still continuously supplies power to the load end O, until the voltage value of the current transmitted from the first power input end IN1 to the load end O falls below the first voltage value of the current outputted by the inverter 141. Determining that the bypass B is abnormal is instantaneously completed, and controlling, by the first controller 142, the inverter 141 to output the current whose voltage value is the first voltage value is also instantaneously completed. Therefore, instantaneous switching to the first main circuit M1 can be continuously performed to supply power to the load end O. Therefore, when a supply voltage of the bypass B is very low, no power supply interruption occurs during switching from the power supply of the bypass B to the power supply of the first main circuit M1. This ensures uninterrupted output of the UPS 10.

In addition, when the power supply of the bypass B is abnormal, the UPS 10 provided in this example instantaneously switches to the power supply of the first main circuit M1. When the bypass B supplies power, no signal flows in the first main circuit M1. Therefore, there is no case in which the first main circuit M1 and the bypass B are simultaneously conducted to form a cross current, thereby avoiding affecting system reliability of the UPS 10 due to the cross current formed by the two circuits that are simultaneously conducted.

Based on the UPS 10 shown in FIG. 4, in another embodiment, the voltage value of the current transmitted by the bypass B to the load end O abruptly increases and exceeds an upper threshold (the first voltage value of the current outputted by the inverter 141 in the first main circuit M1), the bypass B is cut off, and the first main circuit M1 supplies power.

Figure 6A:
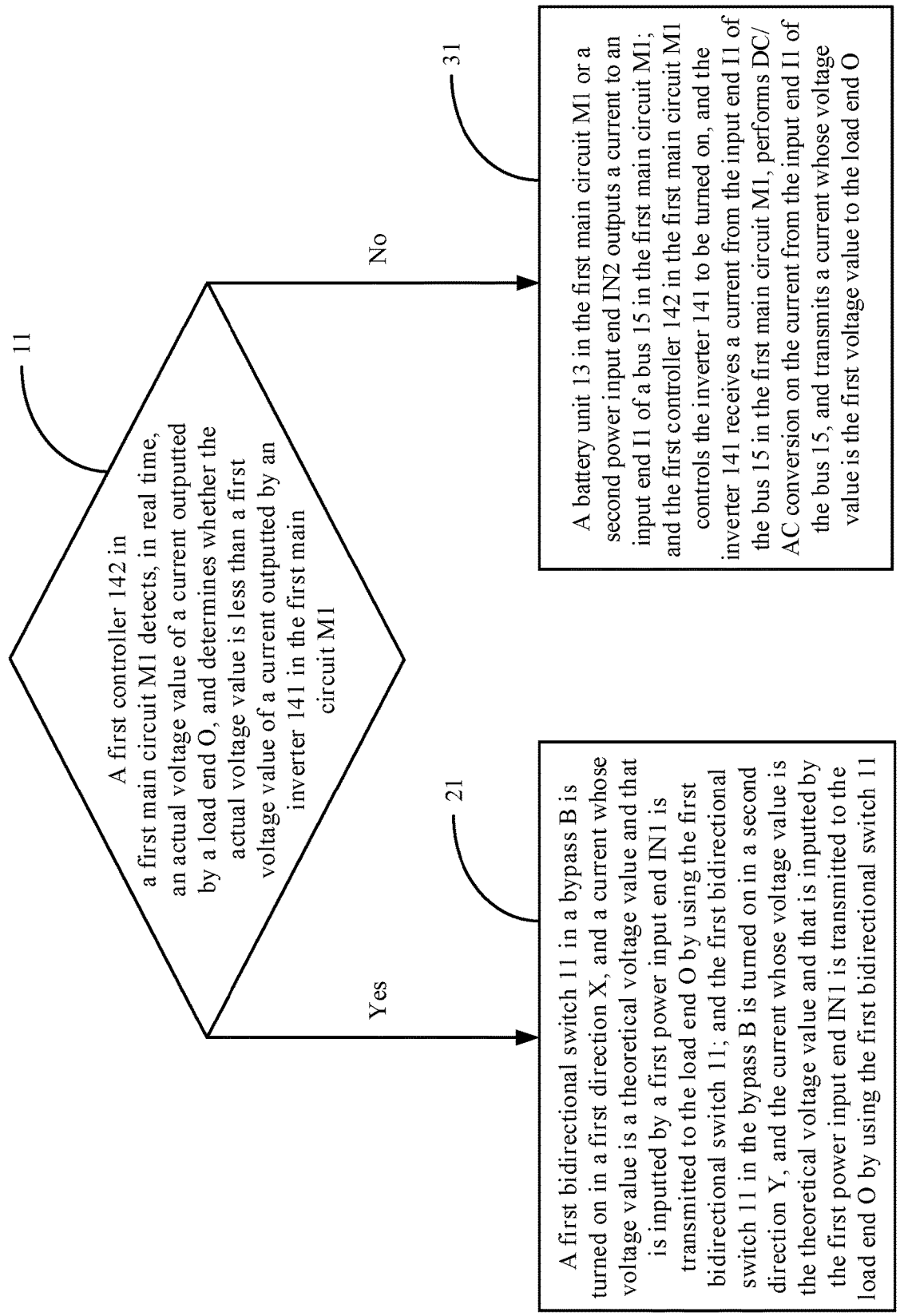
FIG. 6a is a diagram of another driving method for the uninterruptible power system shown in FIG. 4 according to an embodiment of this application.

As shown in FIG. 6a, a driving method for the UPS 10 includes the following steps:

S11. The first controller 142 in the first main circuit M1 detects, in real time, an actual voltage value of a current outputted by the load end O, and determines whether the actual voltage value is less than the first voltage value of the current outputted by the inverter 141 in the first main circuit M1.

If the actual voltage value of the current outputted by the load end O is less than the first voltage value of the current outputted by the inverter 141, a first state is entered.

If the actual voltage value of the current outputted by the load end O is greater than the first voltage value of the current outputted by the inverter 141, a second state is entered.

S21. In the first state:

As shown in FIG. 5b, the first bidirectional switch 11 in the bypass B is turned on in the first direction X, and a current whose voltage value is a theoretical voltage value and that is inputted by the first power input end IN1 is transmitted to the load end O by using the first bidirectional switch 11.

At the same time, the rectifier 12 in the first main circuit M1 performs AC-DC conversion on a current inputted from the second power input end IN2 in the first main circuit M1, and then transmits a current to the input end I1 of the bus 15 in the first main circuit M1. The battery unit 13 in the first main circuit M1 receives and stores a current from the input end I1 of the bus 15. The first controller 142 in the first main circuit M1 controls the inverter 141 in the first main circuit M1 to be turned off, and the current of the input end I1 of the bus 15 is not transmitted to the load end O.

In this case, a positive half-cycle equivalent logic diagram of the UPS 10 is shown in FIG. 5*b*.

As shown in FIG. 5*c*, the first bidirectional switch 11 in the bypass B is turned on in the second direction Y, and the current whose voltage value is the theoretical voltage value and that is inputted by the first power input end IN1 is transmitted to the load end O by using the first bidirectional switch 11.

At the same time, the rectifier 12 in the first main circuit M1 performs AC-DC conversion on a current inputted from the second power input end IN2 in the first main circuit M1, and then transmits a current to the input end I1 of the bus 15 in the first main circuit M1. The battery unit 13 in the first main circuit M1 receives and stores a current from the input end I1 of the bus 15. The first controller 142 in the first main circuit M1 controls the inverter 141 in the first main circuit M1 to be turned off, and the current of the input end I1 of the bus 15 is not transmitted to the load end O.

In this case, a negative half-cycle equivalent logic diagram of the UPS 10 is shown in FIG. 5*c*.

Therefore, as shown in the left figure in FIG. 3*b*, in the first state, the bypass B transmits a current to the load end O, and the first main circuit M1 does not transmit a current to the load end O.

The foregoing completes signal transmission of one cycle of an alternating current. As shown in FIG. 5*d*, driving of a positive half cycle and driving of a negative half cycle are repeated, and the foregoing process is repeated so that the bypass B continuously supplies power to the load end O.

It should be noted that the theoretical voltage value of the current inputted by the first power input end IN1 may be equal to or not equal to an actual voltage value of a current theoretically outputted by the load end O when the bypass B normally supplies power, depending on a structure of the bypass B in the UPS 10.

Based on the UPS 10 shown in FIG. 4, the bypass B does not include a component configured to change a voltage value on the bypass B. Therefore, the theoretical voltage value of the current inputted by the first power input end IN1 is equal to the actual voltage value of the current outputted by the load end O when the bypass B supplies power. For example, the theoretical voltage value of the current inputted by the first power input end IN1 is 220 VAC, and the actual voltage value of the current outputted by the load end O is also 220 VAC.

Figure 6B:
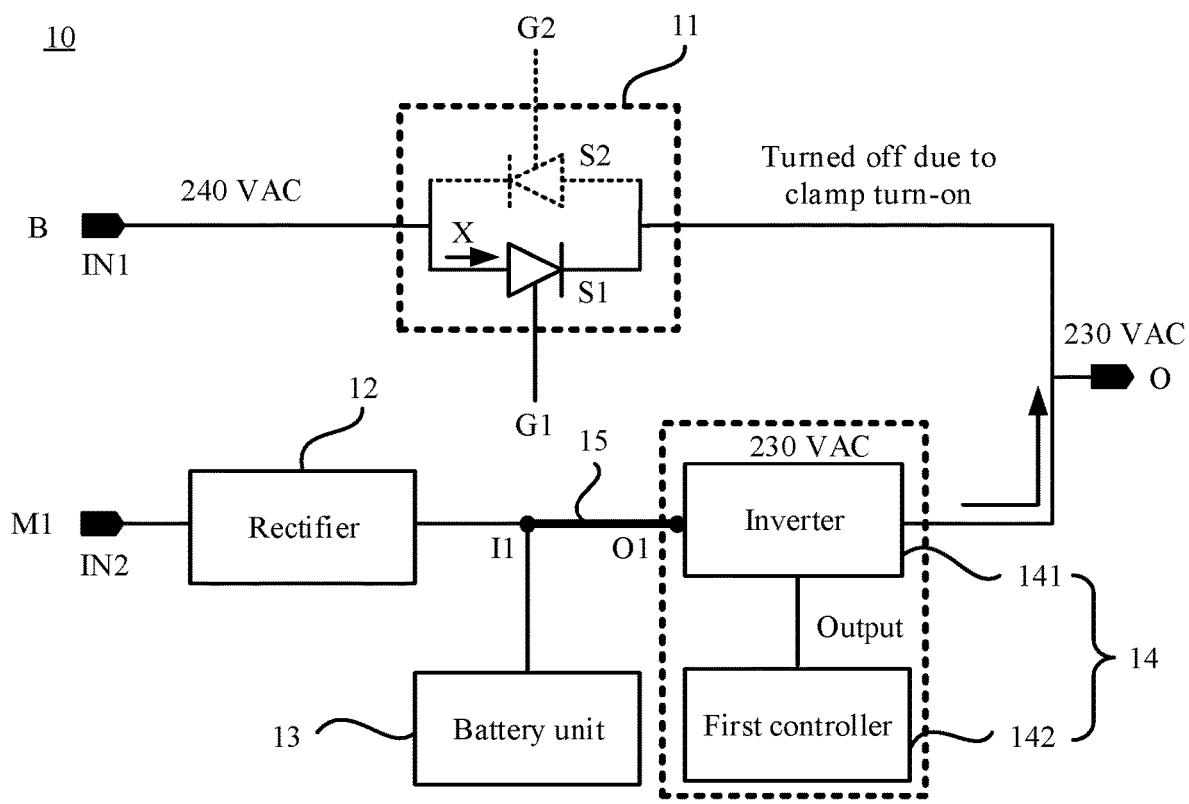
FIG. 6b is a diagram of a driving process of the uninterruptible power system shown in FIG. 4.

S31. In the second state:

As shown in FIG. 6*b*, the first bidirectional switch 11 in the bypass B controls the first power input end IN1 to be disconnected from the load end O.

In other words, the first bidirectional switch 11 in the bypass B is turned off, and the current of the first power input end IN1 cannot be transmitted to the load end O.

For a manner in which the first bidirectional switch 11 is turned off, positive half-cycle driving of the first bidirectional switch 11 is used as an example. As shown in FIG. 6*b*, the first silicon controlled rectifier S1 in the first bidirectional switch 11 is driven, and the second silicon controlled rectifier S2 is not driven. A clamp of the first silicon controlled rectifier S1 is turned on (this may be implemented by setting power of the inverter 141 to be greater than power of the first power input end IN1), and the first bidirectional switch 11 is turned off.

The battery unit 13 in the first main circuit M1 or the second power input end IN2 outputs a current to the input end I1 of the bus 15 in the first main circuit M1. The first controller 142 in the first main circuit M1 controls the inverter 141 to be turned on, and the inverter 141 receives a current from the input end I1 of the bus 15 in the first main circuit M1, performs DC-AC conversion on the current from the input end I1 of the bus 15, and transmits a current whose voltage value is the first voltage value to the load end O.

In this case, a positive half-cycle equivalent logic diagram of the UPS 10 is shown in FIG. 6*b*, and a difference between a negative half-cycle equivalent logic diagram and the positive half-cycle equivalent logic diagram lies in that the first silicon controlled rectifier S1 in the first bidirectional switch 11 is not driven, and the second silicon controlled rectifier S2 is driven.

The first voltage value of the current outputted by the inverter 141 is a fixed value, and the first voltage value is greater than the theoretical voltage value of the current inputted by the first power input end IN1. Therefore, when power supply of the bypass B is normal, a detected actual voltage value of the current outputted by the load end O should be less than the first voltage value. When it is detected that the actual voltage value of the current outputted by the load end O is greater than the first voltage value, the power supply of the bypass B is determined to be abnormal, the second state is entered, and the first main circuit M1 starts to supply power.

Therefore, as shown in the right figure in FIG. 3*b*, after the first state ends and the second state is entered, the first main circuit M1 transmits a current to the load end O, and the bypass B does not transmit a current to the load end O. For example, the first voltage value of the current outputted by the inverter 141 is 230 VAC. In this case, the voltage value of the current outputted by the load end O is also 230 VAC.

The first voltage value of the current outputted by the inverter 141 is a fixed value, and a value may be properly set as required, as long as the first voltage value of the current outputted by the inverter 141 is greater than the theoretical voltage value of the current outputted by the first power input end IN1.

In the UPS 10 provided in this example, the first controller 142 collects, in real time, the actual voltage value of the current outputted by the load end O, and compares the collected actual voltage value (an instantaneous value) of the current outputted by the load end O with the first voltage value (a fixed value) of the current outputted by the inverter 141. When the actual voltage value is less than the first voltage value, output of the bypass B is determined to be normal, and the bypass B supplies power to the load end O. In this case, the first controller 142 controls the inverter 141 not to output a current. When the actual voltage value is greater than the first voltage value, the output of the bypass B is determined to be abnormal, and the first main circuit M1 supplies power to the load end O. In this case, the first controller 142 controls the inverter 141 to output a current whose voltage value is the first voltage value. In this way, when the voltage value of the current supplied by the bypass B is very high, switching from the power supply of the bypass B to power supply of the first main circuit M1 is completed.

In addition, in this example, whether the power supply of the bypass B is normal is determined by collecting an instantaneous value of the actual voltage value of the current outputted by the load end O. Compared with a manner in the related art in which whether the power supply of the bypass B is normal is determined by collecting an interval value that is of the actual voltage value of the current outputted by the load end O and that is in at least half a cycle of an AC current, the method provided in this example is faster to determine whether the power supply of the bypass B is normal, which can be almost instantaneously completed with no detection time. Therefore, in this example, when the power supply of the bypass B exceeds an upper threshold, instantaneous switching from the power supply of the bypass B to the power supply of the first main circuit M1 can be performed, without continuously outputting a high-voltage signal for a period of time before switching to the power supply of the first main circuit M1, thereby reducing a time in which the UPS 10 continuously outputs an abnormal current. This improves stability of a current outputted by the UPS 10.

Further, as shown in FIG. 3b, when the voltage value of the current transmitted from the first power input end IN1 to the load end O abruptly increases and exceeds an upper threshold, the bypass B still continuously supplies power to the load end O, until the voltage value of the current transmitted from the first power input end IN1 to the load end O increases to be greater than the first voltage value of the current outputted by the inverter 141. Determining that the bypass B is abnormal is instantaneously completed, and controlling, by the first controller 142, the inverter 141 to output the current whose voltage value is the first voltage value is also instantaneously completed. Therefore, instantaneous switching to the first main circuit M1 can be continuously performed to supply power to the load end O.

In addition, when the power supply of the bypass B is abnormal, the UPS 10 provided in this example instantaneously switches to the power supply of the first main circuit M1. When the bypass B supplies power, no signal flows in the first main circuit M1. Therefore, there is no case in which the first main circuit M1 and the bypass B are simultaneously conducted to form a cross current, thereby avoiding affecting system reliability of the UPS 10 due to the cross current formed by the two circuits that are simultaneously conducted.

Example 2

The same as example 1, in example 2, the UPS 10 includes a bypass B and a first main circuit M1.

Different from example 1, in example 2, the UPS 10 further includes a second main circuit M2. A voltage value of a current supplied by the bypass B to a load end O is different from a voltage value of a current supplied by the second main circuit M2 to the load end O.

Figure 7A:
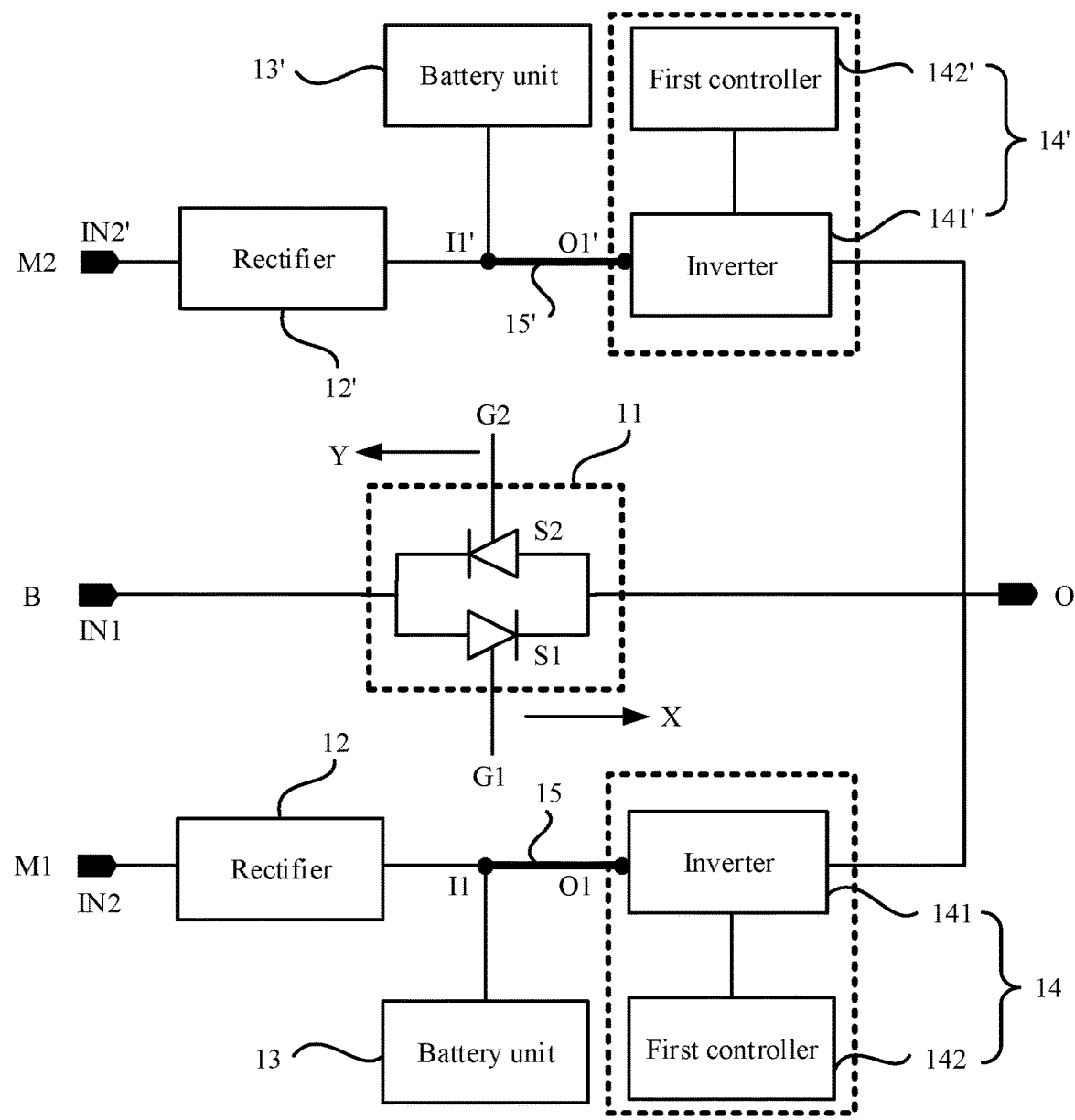
FIG. 7a and FIG. 7b are diagrams of another uninterruptible power system according to an embodiment of this application.

As shown in FIG. 7a, the UPS 10 includes:
the bypass B, where the bypass B includes a first bidirectional switch 11.

The first bidirectional switch 11 is connected to a first power input end IN1 and the load end O of the UPS 10, and is configured to control connection or disconnection between the first power input end IN1 and the load end O.

In some embodiments, as shown in FIG. 7a, the first bidirectional switch 11 includes a first silicon controlled rectifier S1 and a second silicon controlled rectifier S2.

An anode of the first silicon controlled rectifier S1 is connected to the first power input end IN1, and a cathode of the first silicon controlled rectifier S1 is connected to the load end O. When a gate G1 of the first silicon controlled rectifier S1 receives a turn-on signal, the first silicon controlled rectifier S1 is driven, and the first bidirectional switch 11 is turned on in a first direction X, to transmit a positive half-cycle signal of an alternating current signal.

An anode of the second silicon controlled rectifier S2 is connected to the load end O, and a cathode of the second silicon controlled rectifier S2 is connected to the first power input end IN1. When a gate G2 of the second silicon controlled rectifier S2 receives a turn-on signal, the second silicon controlled rectifier S2 is driven, and the first bidirectional switch 11 is turned on in a second direction Y, to transmit a negative half-cycle signal of the alternating current signal.

For the first main circuit M1, the first main circuit M1 includes a rectifier 12, a battery unit 13, an inverter output unit 14, and a bus 15.

The rectifier 12 in the first main circuit M1 is connected to a second power input end IN2 and an input end I1 of the bus 15, and is configured to perform AC-DC conversion on a current inputted from the second power input end IN2, and then transmit a current to the input end I1 of the bus 15.

The battery unit 13 in the first main circuit M1 is connected to the input end I1 of the bus 15, and is configured to receive and store a current from the input end I1 of the bus 15, and is further configured to output a current stored in the battery unit 13 to the input end I1 of the bus 15.

The inverter output unit 14 in the first main circuit M1 includes an inverter 141 and a first controller 142.

The inverter 141 is connected to an output end O1 of the bus 15, the load end O, and the first controller 142, and is configured to be turned on under control of the first controller 142, perform direct current-alternating current (DC-AC) conversion on a current inputted from the output end O1 of the bus 15, and then transmit a current to the load end O.

A structure of the second main circuit M2 is the same as a structure of the first main circuit M1. As shown in FIG. 7a, the second main circuit M2 includes a rectifier 12', a battery unit 13', an inverter output unit 14', and a bus 15'.

The rectifier 12' in the second main circuit M2 is connected to a second power input end IN2' and an input end I1' of the bus 15', and is configured to perform AC-DC conversion on a current inputted from the second power input end IN2', and then transmit a current to the input end I1' of the bus 15'.

The battery unit 13' in the second main circuit M2 is connected to the input end I1' of the bus 15', and is configured to receive and store a current from the input end I1' of the bus 15', and is further configured to output a current stored in the battery unit 13' to the input end I1' of the bus 15'.

The inverter output unit 14' in the second main circuit M2 includes an inverter 141' and a first controller 142'.

The inverter 141' is connected to an output end O1' of the bus 15', the load end O, and the first controller 142', and is configured to be turned on under control of the first controller 142', perform direct current-alternating current (DC-AC) conversion on a current inputted from the output end O1' of the bus 15', and then transmit a current to the load end O.

In this example, the first power input end IN1, the second power input end IN2 in the first main circuit M1, and the second power input end IN2' in the second main circuit M2 may be connected to a same power system 20. For example, the first power input end IN1, the second power input end IN2 in the first main circuit M1, and the second power input end IN2' in the second main circuit M2 are all connected to the mains. The first power input end IN1, the second power input end IN2 in the first main circuit M1, and the second power input end IN2' in the second main circuit M2 may alternatively be connected to different power systems 20.

To simplify a structure of the UPS 10, in an embodiment, the first controller 142 in the first main circuit M1 and the first controller 142' in the second main circuit M2 are integrated in a same control unit.

For example, the first controller 142 in the first main circuit M1 and the first controller 142' in the second main circuit M2 are integrated in a control unit of the UPS 10.

In other words, when the UPS 10 includes two or more main circuits, a plurality of first controllers in the two or more main circuits may be integrated in a same control unit.

Figure 7B:
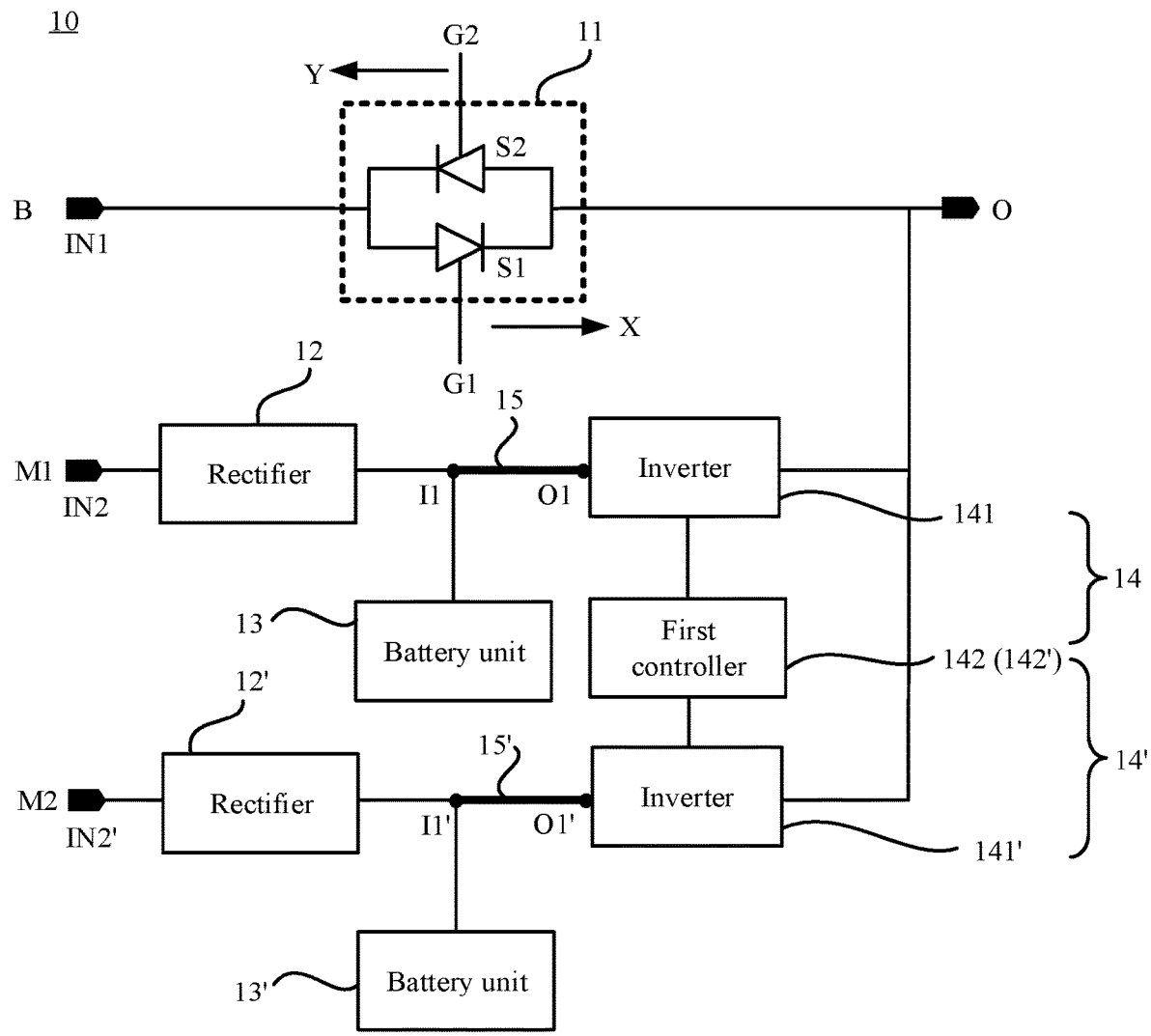

To simplify the structure of the UPS 10, in another embodiment, as shown in FIG. 7b, the first controller 142 in the first main circuit M1 and the first controller 142' in the second main circuit M2 are a same structure.

A major difference between the first main circuit M1 and the second main circuit M2 lies in that a first voltage value of a current outputted by the inverter 141 in the first main circuit M1 is different from a second voltage value of a current outputted by the inverter 141' in the second main circuit M2.

In an embodiment, the first voltage value (for example, 210 VAC) of the current outputted by the inverter 141 in the first main circuit M1 and the second voltage value (for example, 200 VAC) of the current outputted by the inverter 141' in the second main circuit M2 are different and are both less than a theoretical voltage value (for example, 220 VAC) of a current transmitted by the first power input end IN1.

In this way, when a supply voltage of the first main circuit M1 abruptly drops and exceeds a lower threshold, switching to power supply of the second main circuit M2 can be performed, to better ensure voltage stabilization.

In another embodiment, the first voltage value (for example, 230 VAC) of the current outputted by the inverter 141 in the first main circuit M1 and the second voltage value (for example, 240 VAC) of the current outputted by the inverter 141' in the second main circuit M2 are different and are both greater than the theoretical voltage value (for example, 220 VAC) of the current transmitted by the first power input end IN1.

In this way, when the supply voltage of the first main circuit M1 abruptly increases and exceeds an upper threshold, switching to the power supply of the second main circuit M2 can be performed, to better ensure voltage stabilization.

In another embodiment, the first voltage value (for example, 210 VAC) of the current outputted by the inverter 141 in the first main circuit M1 is less than the theoretical voltage value (for example, 220 VAC) of the current transmitted by the first power input end IN1. The second voltage value (for example, 230 VAC) of the current outputted by the inverter 141' in the second main circuit M2 is greater than the theoretical voltage value (for example, 220 VAC) of the current transmitted by the first power input end IN1.

In this way, when a supply voltage of the bypass B abruptly drops and exceeds a lower threshold (the first voltage value of the current outputted by the inverter 141 in the first main circuit M1), switching to power supply of the first main circuit M1 can be performed. When the supply voltage of the bypass B abruptly increases and exceeds an upper threshold (the second voltage value of the current outputted by the inverter 141' in the second main circuit M2), switching to the power supply of the second main circuit M2 can be performed. Therefore, both ultra-low voltage protection and ultra-high voltage protection can be performed, to prevent a very low or very high voltage value of a current outputted by the UPS 10 from damaging a load 30 connected to the UPS 10.

Figure 8:
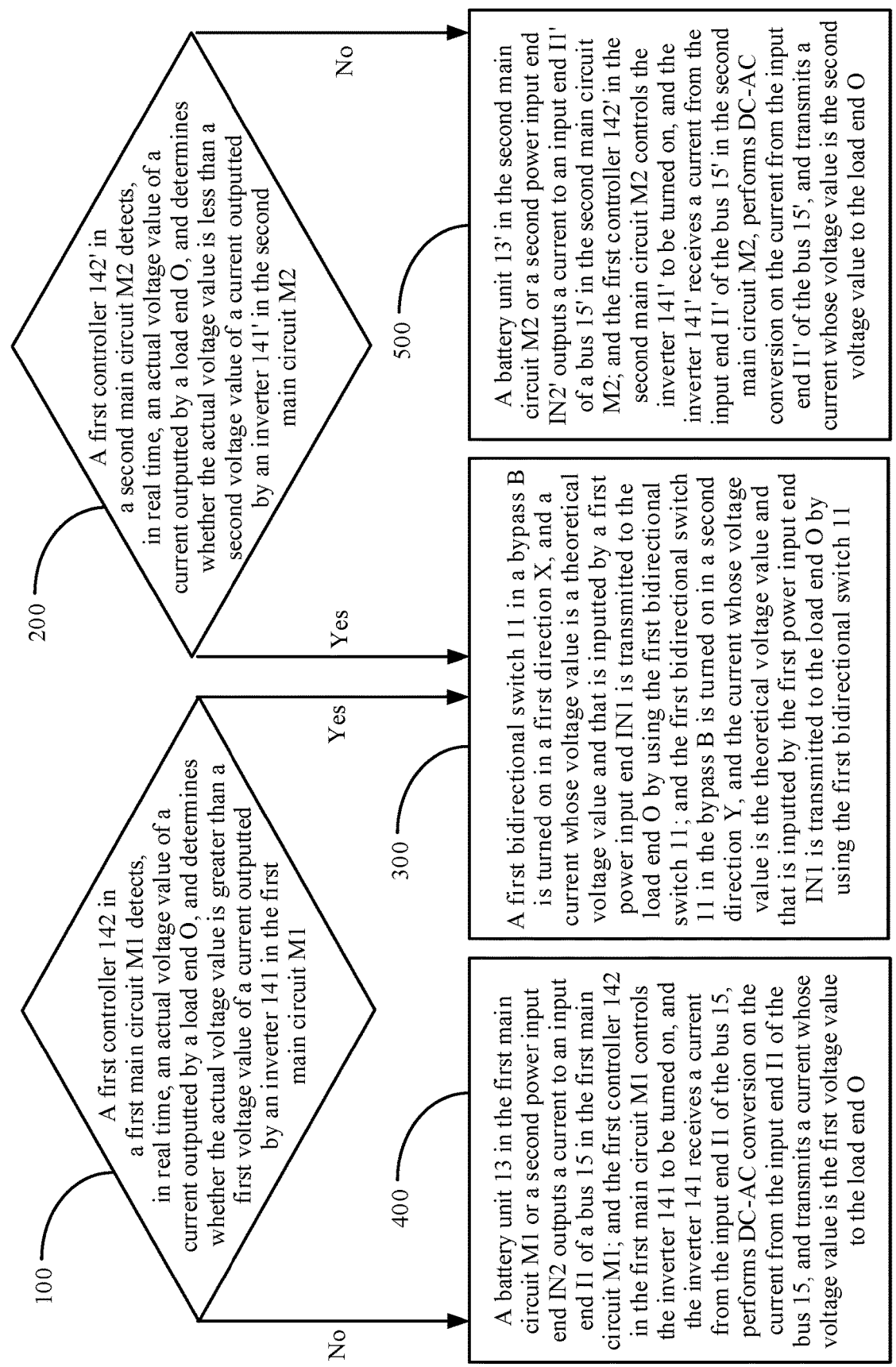
FIG. 8 is a diagram of a driving method for the uninterruptible power system shown in FIG. 7a according to an embodiment of this application.

Based on the UPS 10 shown in FIG. 7a, to enable the UPS 10 to perform both ultra-low voltage protection and ultra-high voltage protection, as shown in FIG. 8, a driving method for the UPS 10 includes the following steps:

S100. The first controller 142 in the first main circuit M1 detects, in real time, an actual voltage value of a current outputted by the load end O, and determines whether the actual voltage value is greater than the first voltage value of the current outputted by the inverter 141 in the first main circuit M1.

If the actual voltage value of the current outputted by the load end O is greater than the first voltage value of the current outputted by the inverter 141 in the first main circuit M1, a first state is entered.

If the actual voltage value of the current outputted by the load end O is less than the first voltage value of the current outputted by the inverter 141 in the first main circuit M1, a second state is entered.

S200. The first controller 142' in the second main circuit M2 detects, in real time, an actual voltage value of a current outputted by the load end O, and determines whether the actual voltage value is less than the second voltage value of the current outputted by the inverter 141' in the second main circuit M2.

If the actual voltage value of the current outputted by the load end O is less than the second voltage value of the current outputted by the inverter 141' in the second main circuit M2, the first state is entered.

If the actual voltage value of the current outputted by the load end O is greater than the second voltage value of the current outputted by the inverter 141' in the second main circuit M2, a third state is entered.

It should be noted that step S100 and step S200 may be simultaneously performed, or step S100 may be performed before step S200. Alternatively, step S200 may be performed before step S100.

Figure 9A:
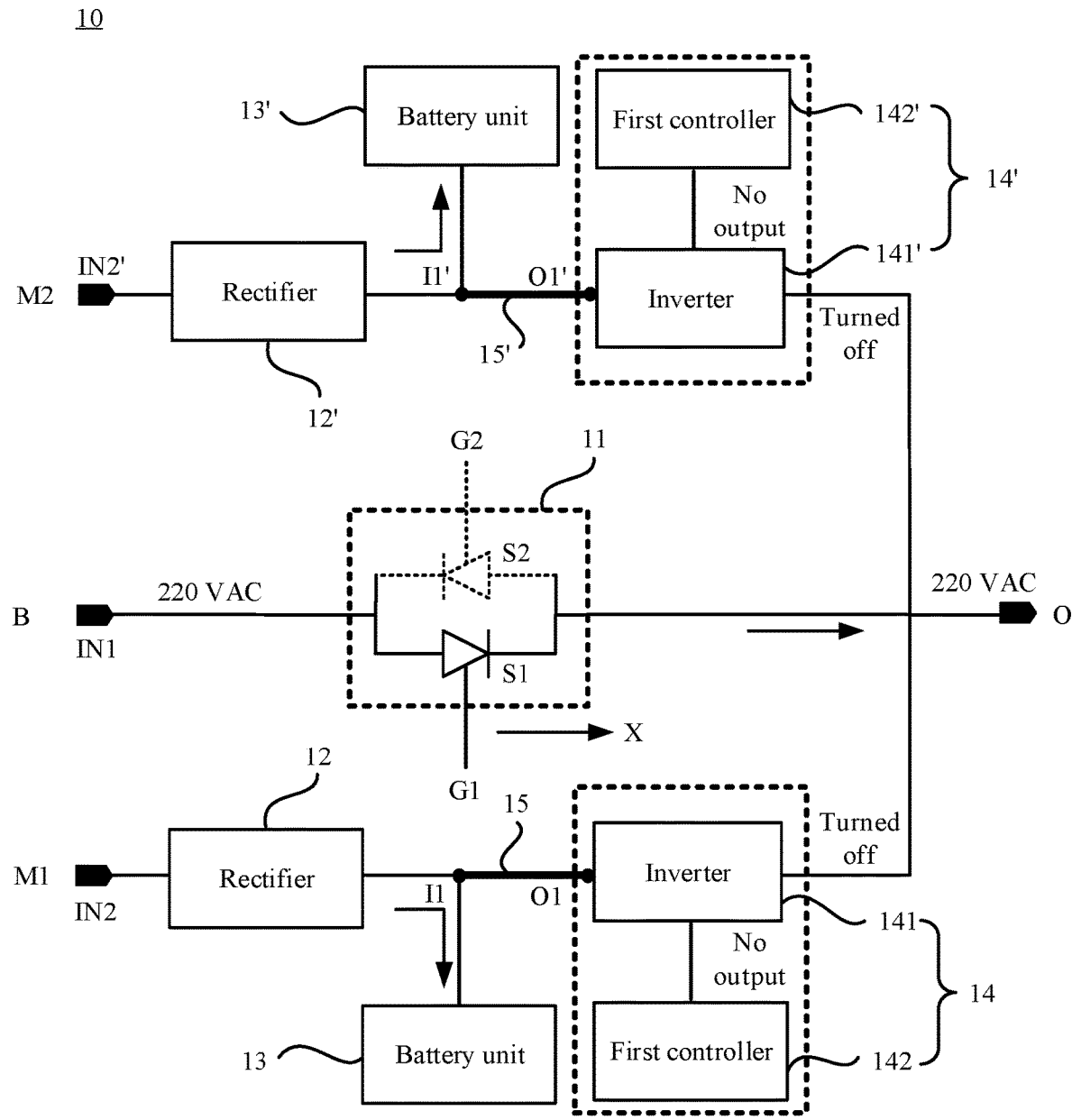

S300. In the first state:

As shown in FIG. 9a, the first bidirectional switch 11 in the bypass B is turned on in the first direction X, and a current whose voltage value is a theoretical voltage value and that is inputted by the first power input end IN1 is transmitted to the load end O by using the first bidirectional switch 11.

At the same time, the rectifier 12 in the first main circuit M1 performs AC-DC conversion on a current inputted from the second power input end IN2 in the first main circuit M1, and then transmits a current to the input end I1 of the bus 15 in the first main circuit M1. The battery unit 13 in the first main circuit M1 receives and stores a current from the input end I1 of the bus 15. The first controller 142 in the first main circuit M1 controls the inverter 141 in the first main circuit M1 to be turned off, and the current of the input end I1 of the bus 15 is not transmitted to the load end O.

At the same time, the rectifier 12' in the second main circuit M2 performs AC-DC conversion on a current inputted from the second power input end IN2' in the second main circuit M2, and then transmits a current to the input end I1' of the bus 15' in the second main circuit M2. The battery unit 13' in the second main circuit M2 receives and stores a current from the input end I1' of the bus 15'. The first controller 142' in the second main circuit M2 controls the inverter 141' in the second main circuit M2 to be turned off, and the current of the input end I1' of the bus 15' is not transmitted to the load end O.

In this case, a positive half-cycle equivalent logic diagram of the UPS 10 is shown in FIG. 9a.

Figure 9B:
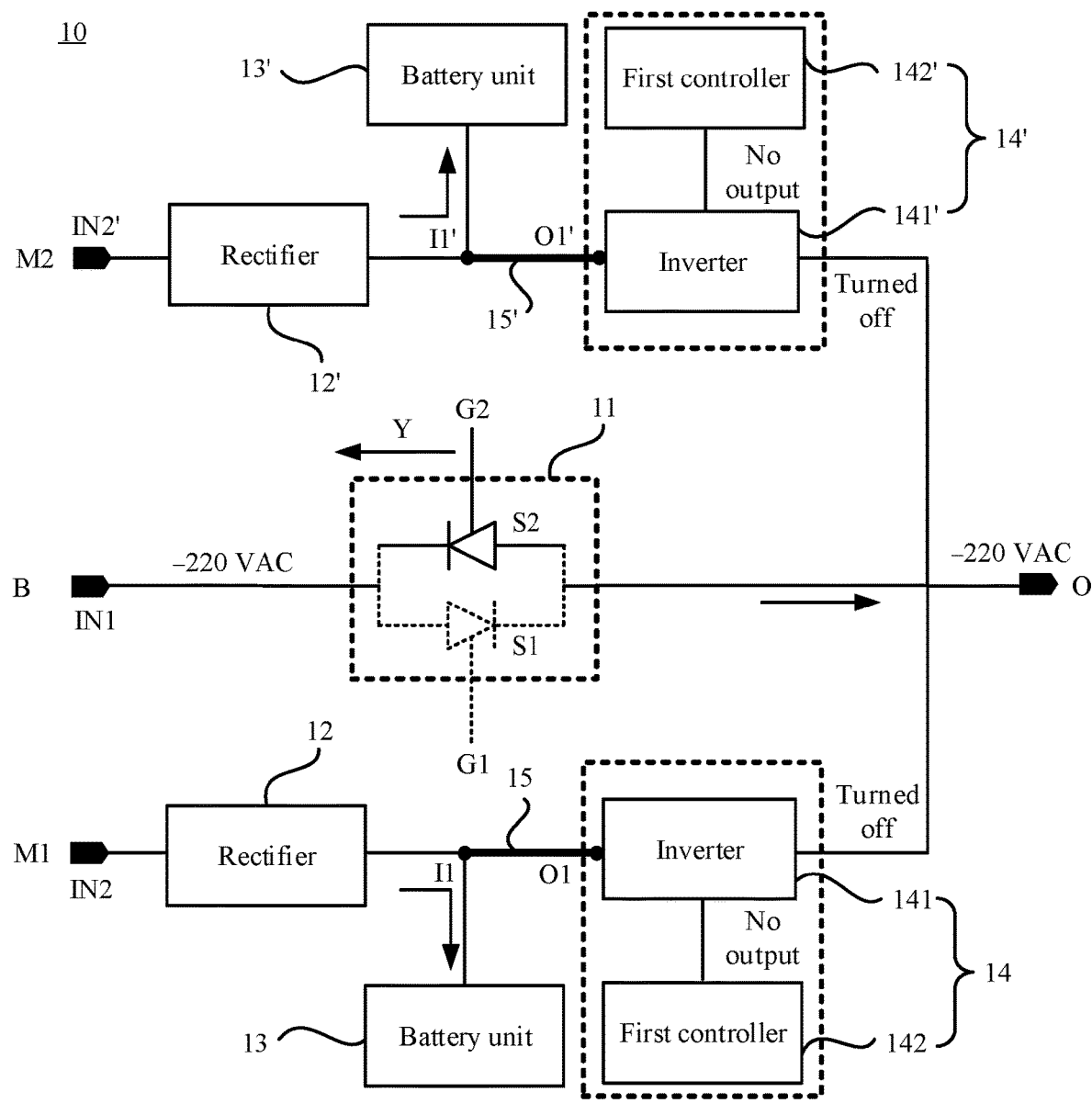

As shown in FIG. 9b, the first bidirectional switch 11 in the bypass B is turned on in the second direction Y, and the current whose voltage value is the theoretical voltage value and that is inputted by the first power input end IN1 is transmitted to the load end O by using the first bidirectional switch 11.

At the same time, the rectifier 12 in the first main circuit M1 performs AC-DC conversion on a current inputted from the second power input end IN2 in the first main circuit M1, and then transmits a current to the input end I1 of the bus 15 in the first main circuit M1. The battery unit 13 in the first main circuit M1 receives and stores a current from the input end I1 of the bus 15. The first controller 142 in the first main circuit M1 controls the inverter 141 in the first main circuit M1 to be turned off, and the current of the input end I1 of the bus 15 is not transmitted to the load end O.

At the same time, the rectifier 12' in the second main circuit M2 performs AC-DC conversion on a current inputted from the second power input end IN2' in the second main circuit M2, and then transmits a current to the input end I1' of the bus 15' in the second main circuit M2. The battery unit 13' in the second main circuit M2 receives and stores a current from the input end ' of the bus 15'. The first controller 142' in the second main circuit M2 controls the inverter 141' in the second main circuit M2 to be turned off, and the current of the input end I1' of the bus 15' is not transmitted to the load end O.

In this case, a negative half-cycle equivalent logic diagram of the UPS 10 is shown in FIG. 9b.

Figure 9C:
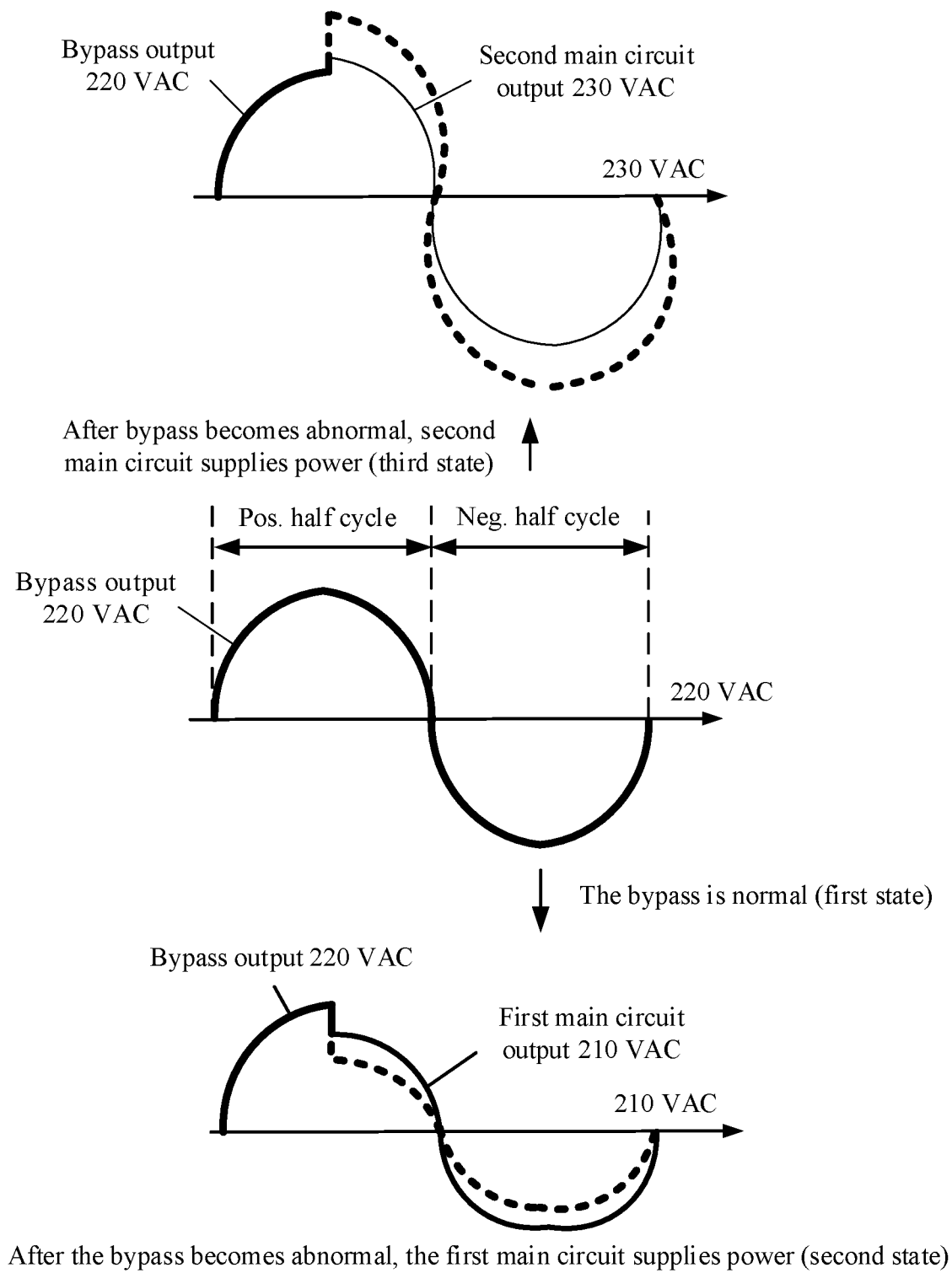
FIG. 9c is a diagram of an output signal of the uninterruptible power system shown in FIG. 7a according to an embodiment of this application.

Therefore, as shown in a middle figure in FIG. 9c, in the first state, the bypass B transmits a current to the load end O, the first main circuit M1 does not transmit a current to the load end O, and the second main circuit M2 does not transmit a current to the load end O either.

In FIG. 9c, a solid line represents a current received by the load end O, and a dashed line represents a current not received by the load end O.

Figure 9D:
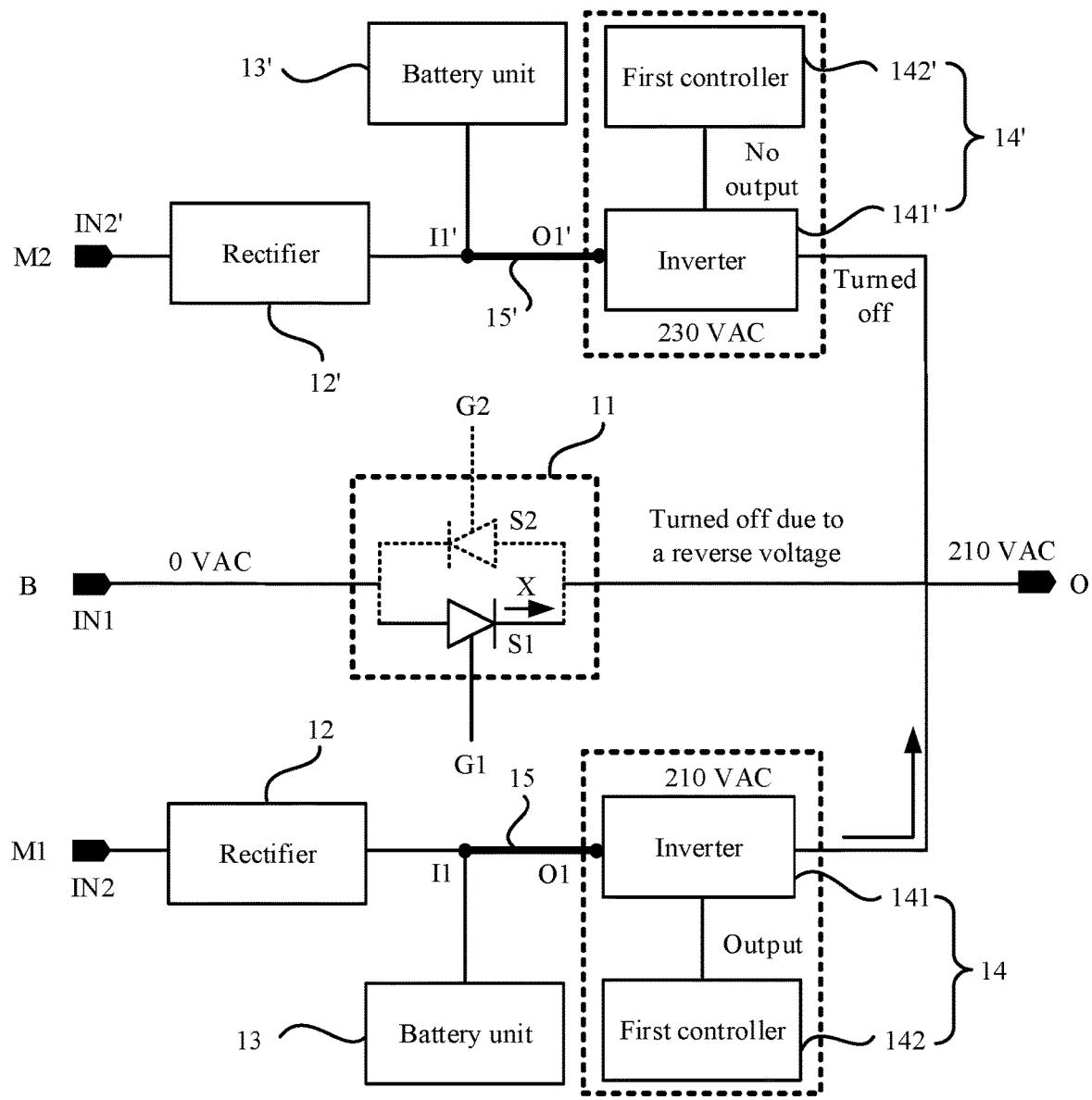

S400. In the second state:

As shown in FIG. 9d, the first bidirectional switch 11 in the bypass B controls the first power input end IN1 to be disconnected from the load end O.

In other words, the first bidirectional switch 11 in the bypass B is turned off due to a reverse voltage, and the current of the first power input end IN1 cannot be transmitted to the load end O.

As shown in FIG. 9d, the battery unit 13 in the first main circuit M1 or the second power input end IN2 outputs a current to the input end I1 of the bus 15 in the first main circuit M1. The first controller 142 in the first main circuit M1 controls the inverter 141 to be turned on, and the inverter 141 receives a current from the input end I1 of the bus 15, performs DC-AC conversion on the current from the input end I1 of the bus 15, and transmits a current whose voltage value is the first voltage value to the load end O.

At the same time, the first controller 142' in the second main circuit M2 controls the inverter 141' in the second main circuit M2 to be turned off, and the current of the input end I1' of the bus 15' in the second main circuit M2 is not transmitted to the load end O.

In this case, a positive half-cycle equivalent logic diagram of the UPS 10 is shown in FIG. 9d, and a difference between a negative half-cycle equivalent logic diagram and the positive half-cycle equivalent logic diagram lies in that the first silicon controlled rectifier S1 in the first bidirectional switch 11 is not driven, and the second silicon controlled rectifier S2 is driven.

The first voltage value of the current outputted by the inverter 141 in the first main circuit M1 is a fixed value, and the first voltage value is less than the theoretical voltage value of the current inputted by the first power input end IN1 in the first main circuit M1. Therefore, when power supply of the bypass B is normal, a detected actual voltage value of the current outputted by the load end O should be greater than the first voltage value. When it is detected that the actual voltage value of the current outputted by the load end O is less than the first voltage value, the power supply of the bypass B is determined to be abnormal, the second state is entered, and the first main circuit M1 starts to supply power.

Therefore, as shown in a figure at the bottom of FIG. 9c, after the first state ends and the second state is entered, the first main circuit M1 transmits a current to the load end O, the bypass B does not transmit a current to the load end O, and the second main circuit M2 does not transmit a current to the load end O either. For example, the first voltage value of the current outputted by the inverter 141 in the first main circuit M1 is 210 VAC. In this case, the voltage value of the current outputted by the load end O is also 210 VAC.

It should be noted that the first voltage value of the current outputted by the inverter 141 in the first main circuit M1 is a fixed value, and a value may be properly set as required, as long as the first voltage value of the current outputted by the inverter 141 in the first main circuit M1 is less than the theoretical voltage value of the current outputted by the first power input end IN1 in the first main circuit M1.

Figure 9E:
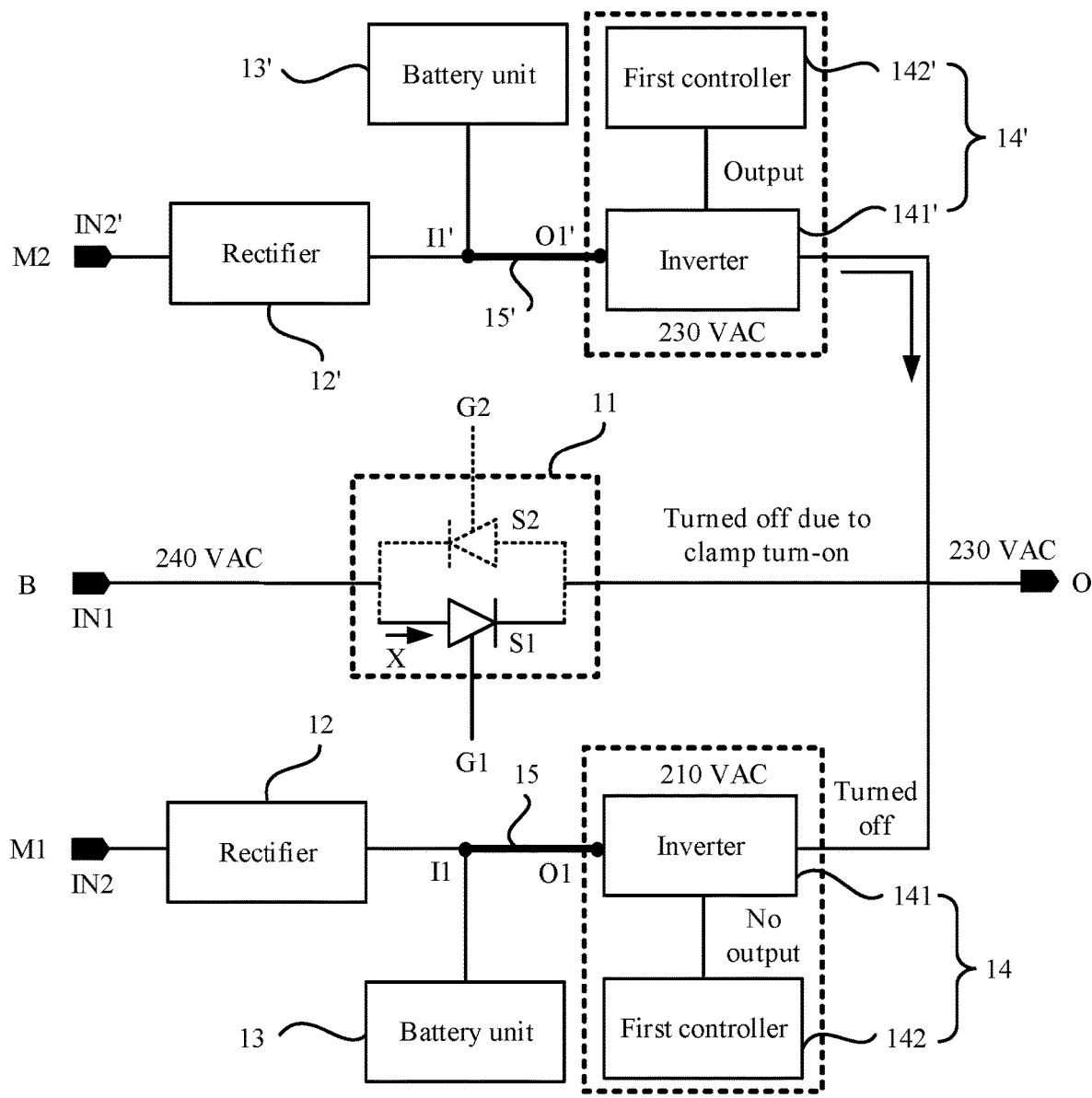

S500. In the third state:

As shown in FIG. 9e, the first bidirectional switch 11 in the bypass B controls the first power input end IN1 to be disconnected from the load end O.

In other words, the first bidirectional switch 11 in the bypass B is turned off due to clamp turn-on, and the current of the first power input end IN1 cannot be transmitted to the load end O.

As shown in FIG. 9e, the battery unit 13' in the second main circuit M2 or the second power input end IN2' outputs a current to the input end I1' of the bus 15' in the second main circuit M2. The first controller 142' in the second main circuit M2 controls the inverter 141' to be turned on, and the inverter 141' receives a current from the input end I1' of the bus 15' in the second main circuit M2, performs DC-AC conversion on the current from the input end I1' of the bus 15', and transmits a current whose voltage value is the second voltage value to the load end O.

At the same time, the first controller 142 in the first main circuit M1 controls the inverter 141 in the first main circuit M1 to be turned off, and the current of the input end I1 of the bus 15 is not transmitted to the load end O.

In this case, a positive half-cycle equivalent logic diagram of the UPS 10 is shown in FIG. 9e, and a difference between a negative half-cycle equivalent logic diagram and the positive half-cycle equivalent logic diagram lies in that the first silicon controlled rectifier S1 in the first bidirectional switch 11 is not driven, and the second silicon controlled rectifier S2 is driven.

The second voltage value of the current outputted by the inverter 141' in the second main circuit M2 is a fixed value, and the second voltage value is greater than the theoretical voltage value of the current inputted by the first power input end IN1. Therefore, when power supply of the bypass B is normal, a detected actual voltage value of the current outputted by the load end O should be less than the second voltage value. When it is detected that the actual voltage value of the current outputted by the load end O is greater than the second voltage value, the power supply of the bypass B is determined to be abnormal, the third state is entered, and the second main circuit M2 starts to supply power.

Therefore, as shown in a figure at the top of FIG. 9c, after the first state ends and the third state is entered, the second main circuit M2 transmits a current to the load end O, the bypass B does not transmit a current to the load end O, and the first main circuit M1 does not transmit a current to the load end O either. For example, the second voltage value of the current outputted by the inverter 141' in the second main circuit M2 is 230 VAC. In this case, the voltage value of the current outputted by the load end O is also 230 VAC.

The second voltage value of the current outputted by the inverter 141' in the second main circuit M2 is a fixed value, and a value may be properly set as required, as long as the second voltage value of the current outputted by the inverter 141' in the second main circuit M2 is greater than the theoretical voltage value of the current outputted by the first power input end IN1.

In the UPS 10 provided in this example, the first controller 142 in the first main circuit M1 and the first controller 142' in the second main circuit M2 separately collect, in real time, the actual voltage value of the current outputted by the load end O, and compares the collected actual voltage value (an instantaneous value) of the current outputted by the load end O with the first voltage value (a fixed value) of the current outputted by the inverter 141 in the first main circuit M1 and the second voltage value (a fixed value) of the current outputted by the inverter 141' in the second main circuit M2. When the actual voltage value is greater than the first voltage value and less than the second voltage value, output of the bypass B is determined to be normal, and the bypass B supplies power to the load end O. In this case, the first controller 142 in the first main circuit M1 controls the inverter 141 not to output a current, and the first controller 142' in the second main circuit M2 also controls the inverter 141' not to output a current. When the actual voltage value is less than the first voltage value, the output of the bypass B is determined to be abnormal, and the first main circuit M1 supplies power to the load end O. In this case, the first controller 142 in the first main circuit M1 controls the inverter 141 to output a current whose voltage value is the first voltage value. In this way, when the voltage value of the current supplied by the bypass B is very low, switching from the power supply of the bypass B to power supply of the first main circuit M1 is completed. When the actual voltage value is greater than the second voltage value, the output of the bypass B is determined to be abnormal, and the second main circuit M2 supplies power to the load end O. In this case, the first controller 142' in the second main circuit M2 controls the inverter 141' to output a current whose voltage value is the second voltage value. In this way, when the voltage value of the current supplied by the bypass B is very high, switching from the power supply of the bypass B to power supply of the second main circuit M2 is completed. Therefore, the UPS 10 provided in this example can implement both ultra-low voltage protection and ultra-high voltage protection for an output current, to reduce a possibility that a load 30 connected to the UPS 10 is damaged by a low voltage or a high voltage.

In addition, in this example, whether the power supply of the bypass B is normal is determined by collecting an instantaneous value of the actual voltage value of the current outputted by the load end O. A conclusion can be drawn instantaneously, and continuous switching to the first main circuit M1 or the second main circuit M2 that is to supply power to the load end O can be performed. Therefore, when a supply voltage of the bypass B is very low, instantaneous switching from the power supply of the bypass B to the power supply of the first main circuit M1 is performed; or when a supply voltage of the bypass B is very high, instantaneous switching from the power supply of the bypass B to power supply of the second main circuit M2 is performed. This can ensure uninterrupted output of the UPS 10, and shorten a time in which the UPS 10 outputs an abnormal current.

In addition, when the power supply of the bypass B is abnormal, the UPS 10 provided in this example instantaneously switches to the power supply of the first main circuit M1 or the second main circuit M2. When the bypass B supplies power, no signal flows in the first main circuit M1 and the second main circuit M2. Therefore, there is no case in which the first main circuit M1 or the second main circuit M2 and the bypass B are simultaneously conducted to form a cross current, thereby avoiding affecting system reliability of the UPS 10 due to the cross current formed by the two circuits that are simultaneously conducted.

Example 3

The same as example 1, in example 3, the UPS 10 includes a bypass B and a first main circuit M1.

Different from example 1, in example 3, a structure of an inverter output unit 14 in the first main circuit M1 is different, and a driving method is also different.

Figure 10:
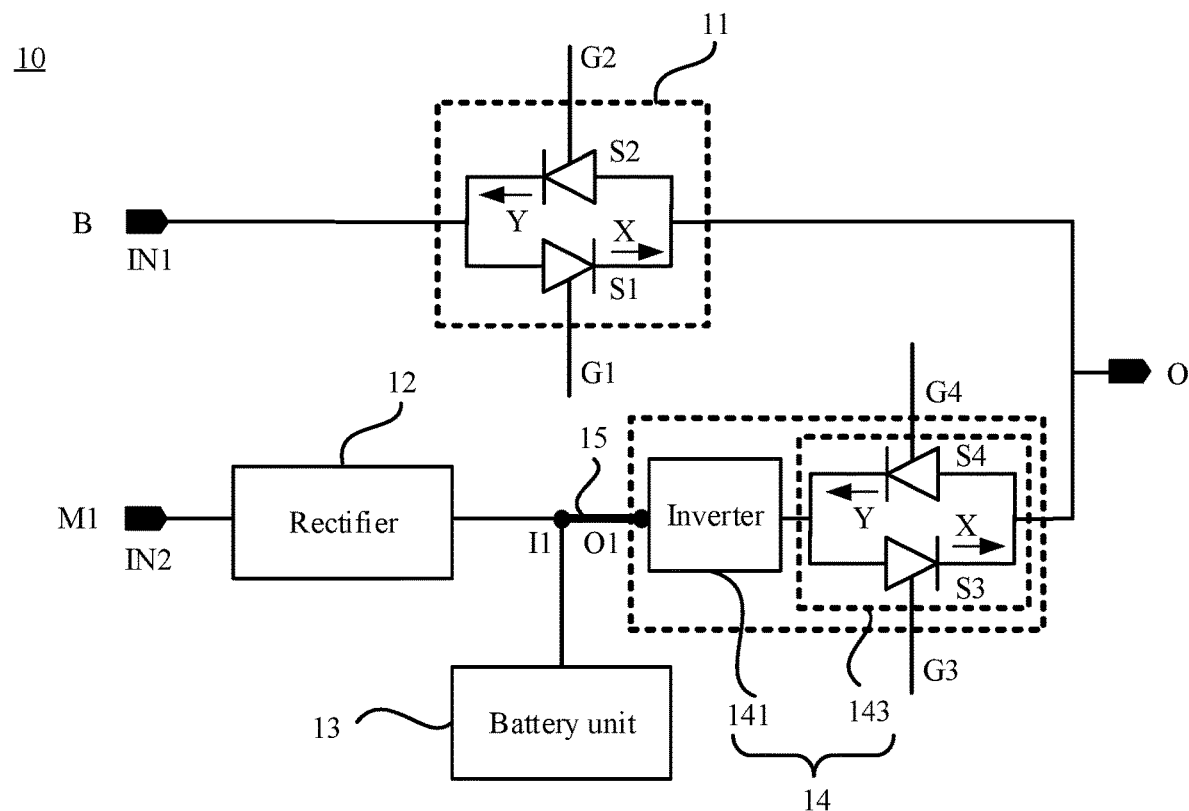
FIG. 10 is a diagram of another uninterruptible power system according to an embodiment of this application.

As shown in FIG. 10, the UPS 10 includes:
the bypass B, where the bypass B includes a first bidirectional switch 11.

The first bidirectional switch 11 is connected to a first power input end IN1 and a load end O of the UPS 10, and is configured to control connection or disconnection between the first power input end IN1 and the load end O.

In some embodiments, as shown in FIG. 10, the first bidirectional switch 11 includes a first silicon controlled rectifier (SCR) S1 and a second silicon controlled rectifier S2.

An anode of the first silicon controlled rectifier S1 is connected to the first power input end IN1, and a cathode of the first silicon controlled rectifier S1 is connected to the load end O. When a gate G1 of the first silicon controlled rectifier S1 receives a turn-on signal, the first silicon controlled rectifier S1 is driven, and the first bidirectional switch 11 is turned on in a first direction X, to transmit a positive half-cycle signal of an alternating current signal.

An anode of the second silicon controlled rectifier S2 is connected to the load end O, and a cathode of the second silicon controlled rectifier S2 is connected to the first power input end IN1. When a gate G2 of the second silicon controlled rectifier S2 receives a turn-on signal, the second silicon controlled rectifier S2 is driven, and the first bidirectional switch 11 is turned on in a second direction Y, to transmit a negative half-cycle signal of the alternating current signal.

The gate G1 of the first silicon controlled rectifier S1 and the gate G2 of the second silicon controlled rectifier S2 may be connected to, for example, a control unit of the UPS 10, and the control unit controls whether to drive the first silicon controlled rectifier S1 and the second silicon controlled rectifier S2. When the first silicon controlled rectifier S1 is driven, the second silicon controlled rectifier S2 is not driven, and the first bidirectional switch 11 is turned on in the first direction X, to transmit a current of the first power input end IN1 to the load end O. Similarly, when the second silicon controlled rectifier S2 is driven, the first silicon controlled rectifier S1 is not driven, and the first bidirectional switch 11 is turned on in the second direction Y, to transmit the current of the first power input end IN1 to the load end O. When power supply of the bypass B is abnormal, the first bidirectional switch 11 is turned off due to a reverse voltage, and the first power input end IN1 is disconnected from the load end O.

For the first main circuit M1, the first main circuit M1 includes a rectifier 12, a battery unit 13, the inverter output unit 14, and a bus 15.

The rectifier 12 is connected to a second power input end IN2 and an input end I1 of the bus 15, and is configured to perform AC-DC conversion on a current inputted from the second power input end IN2, and then transmit a current to the input end I1 of the bus 15.

The battery unit 13 is connected to the input end I1 of the bus 15, and is configured to receive and store a current from the input end I1 of the bus 15, and is further configured to output a current stored in the battery unit 13 to the input end I1 of the bus 15.

The inverter output unit 14 includes an inverter 141 and a second bidirectional switch 143.

The inverter 141 is connected to an output end O1 of the bus 15 and the second bidirectional switch 143, and is configured to perform DC-AC conversion on a current inputted from the output end O1 of the bus 15, and then transmit a current to the second bidirectional switch 143.

The second bidirectional switch 143 is further connected to the load end O, and is configured to control whether to transmit, to the load end O, the current outputted by the inverter 141.

In some embodiments, as shown in FIG. 10, the second bidirectional switch 143 includes a third silicon controlled rectifier S3 and a fourth silicon controlled rectifier S4.

An anode of the third silicon controlled rectifier S3 is connected to the inverter 141, and a cathode of the third silicon controlled rectifier S3 is connected to the load end O. When a gate G3 of the third silicon controlled rectifier S3 receives a turn-on signal, the third silicon controlled rectifier S3 is driven. In this case, the fourth silicon controlled rectifier S4 is not driven, and the second bidirectional switch 143 is turned on in the first direction X.

An anode of the fourth silicon controlled rectifier S4 is connected to the load end O, and a cathode of the fourth silicon controlled rectifier S4 is connected to the inverter 141. When a gate G4 of the fourth silicon controlled rectifier S4 receives a turn-on signal, the fourth silicon controlled rectifier S4 is driven. In this case, the third silicon controlled rectifier S3 is not driven, and the second bidirectional switch 143 is turned on in the second direction Y.

The gate G3 of the third silicon controlled rectifier S3 and the gate G4 of the fourth silicon controlled rectifier S4 may be connected to, for example, the control unit of the UPS 10, and the control unit controls whether to drive the third silicon controlled rectifier S3 and the fourth silicon controlled rectifier S4.

When the third silicon controlled rectifier S3 is driven, the fourth silicon controlled rectifier S4 is not driven, and the second bidirectional switch 143 is turned on in the first direction X, to transmit a current of the output end O1 of the bus 15 to the load end O. Similarly, when the fourth silicon controlled rectifier S4 is driven, the third silicon controlled rectifier S3 is not driven, and the second bidirectional switch 143 is turned on in the second direction Y, to transmit the current of the output end O1 of the bus 15 to the load end O. When the power supply of the bypass B is normal, the third silicon controlled rectifier S3 or the fourth silicon controlled rectifier S4 is driven, but the second bidirectional switch 143 is turned off due to a reverse voltage, and the current of the output end O1 of the bus 15 is not transmitted to the load end O.

Based on the UPS 10 shown in FIG. 10, in an embodiment, a voltage value of a current transmitted by the bypass B to the load end O abruptly drops and exceeds a lower threshold (a first voltage value of the current outputted by the inverter 141 in the first main circuit M1), the bypass B is cut off, and the first main circuit M1 supplies power.

Figure 11:
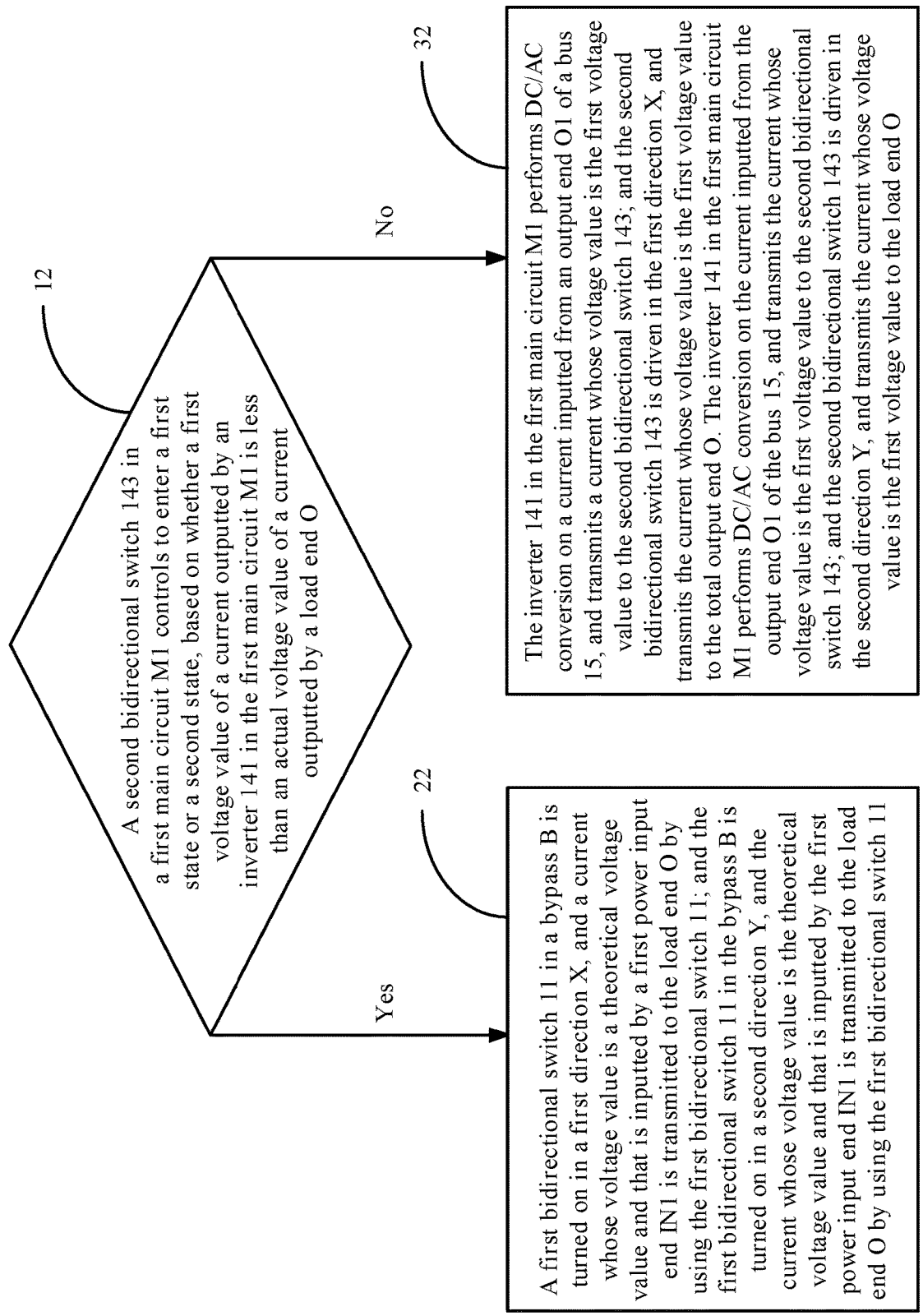
FIG. 11 is a diagram of a driving method for the uninterruptible power system shown in FIG. 10 according to an embodiment of this application.

As shown in FIG. 11, a driving method for the UPS 10 includes the following steps:

S12. The second bidirectional switch 143 in the first main circuit M1 controls to enter a first state or a second state, based on whether the first voltage value of the current outputted by the inverter 141 in the first main circuit M1 is less than an actual voltage value of a current outputted by the load end O.

If the first voltage value of the current outputted by the inverter 141 in the first main circuit M1 is less than the actual voltage value of the current outputted by the load end O, the first state is entered.

If the first voltage value of the current outputted by the inverter 141 in the first main circuit M1 is greater than the actual voltage value of the current outputted by the load end O, the second state is entered.

It should be noted that, based on the UPS 10 shown in FIG. 10, a process of step S12 does not need to be specially performed in an independent determining process, but is directly and naturally completed by the second bidirectional switch 143. When the actual voltage value of the current outputted by the load end O is greater than the first voltage value of the current outputted by the inverter 141 in the first main circuit M1, the second bidirectional switch 143 in the first main circuit M1 is directly turned off due to a reverse voltage and cannot be turned on, so that the first state is entered. Similarly, when the actual voltage value of the current outputted by the load end O is less than the first voltage value of the current outputted by the inverter 141 in the first main circuit M1, the second bidirectional switch 143 in the first main circuit M1 is naturally turned on (without additional control or determining), so that the second state is entered.

Figure 12A:
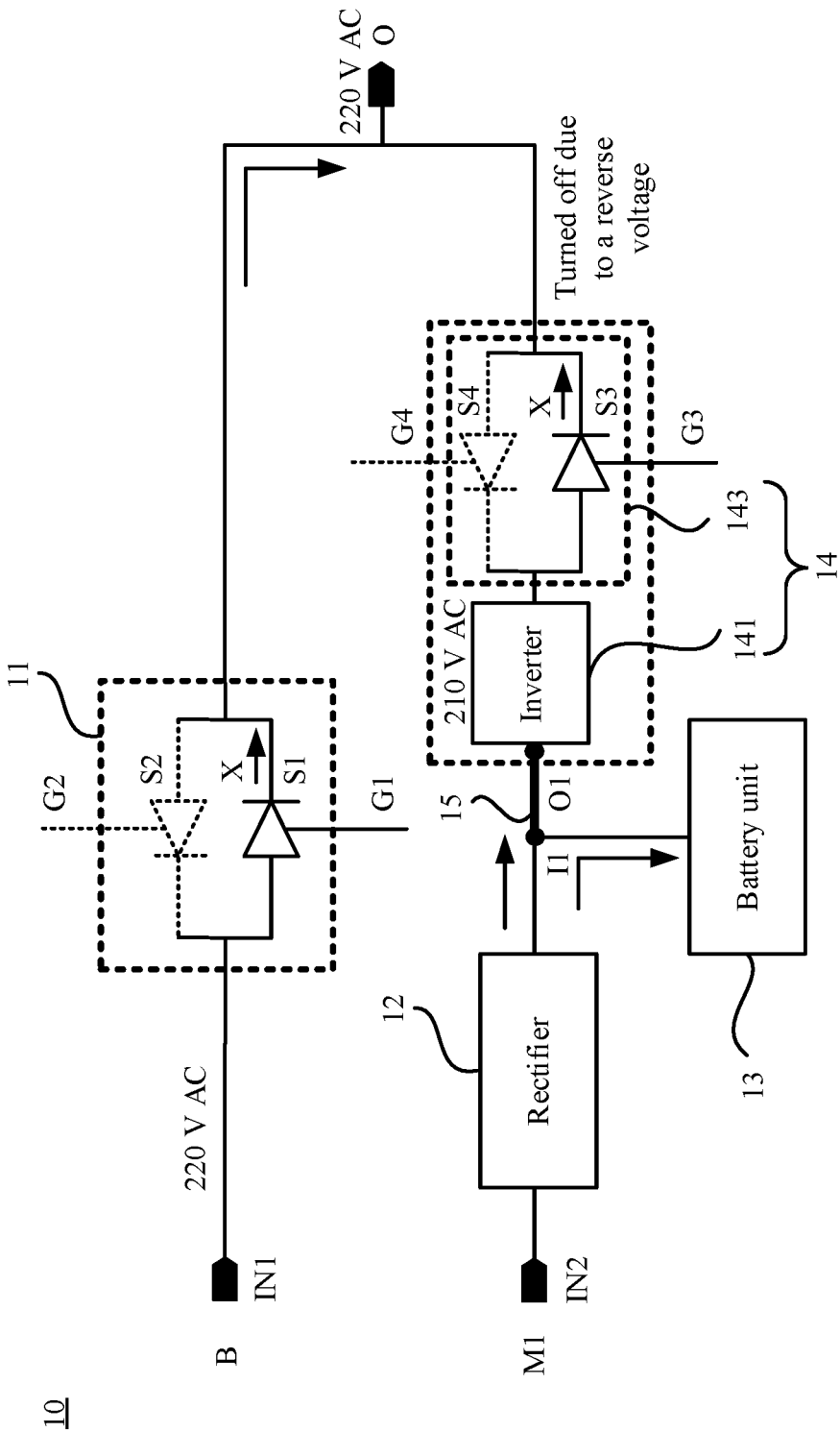
FIG. 12a and FIG. 12b are diagrams of driving processes of the uninterruptible power system shown in FIG. 10.

S22. In the first state:

As shown in FIG. 12a, the first bidirectional switch 11 in the bypass B is turned on in the first direction X, and a current whose voltage value is a theoretical voltage value and that is inputted by the first power input end IN1 is transmitted to the load end O by using the first bidirectional switch 11.

At the same time, the second bidirectional switch 143 in the first main circuit M1 is turned off due to a reverse voltage in the first direction X, and the inverter 141 in the first main circuit M1 performs DC-AC conversion on the current inputted from the output end O1 of the bus 15, and transmits the current whose voltage value is the first voltage value to the second bidirectional switch 143. However, because the second bidirectional switch 143 is turned off due to a reverse voltage, the current whose voltage value is the first voltage value and that is outputted by the inverter 141 is not transmitted to the load end O.

As shown in FIG. 12a, the second bidirectional switch 143 is turned off due to a reverse voltage in the first direction X. For example, the third silicon controlled rectifier S3 in the second bidirectional switch 143 may be driven, and the fourth silicon controlled rectifier S4 is not driven. A voltage (the first voltage value 210 VAC of the current outputted by the inverter 141) of the anode of the third silicon controlled rectifier S3 is less than a voltage (the actual voltage value 220 VAC of the current outputted by the load end O) of the cathode. Therefore, the third silicon controlled rectifier S3 is turned off due to a reverse voltage, so that the second bidirectional switch 143 is turned off due to a reverse voltage in the first direction X.

In this case, a positive half-cycle equivalent logic diagram of the UPS 10 is shown in FIG. 12*a*.

Figure 12B:
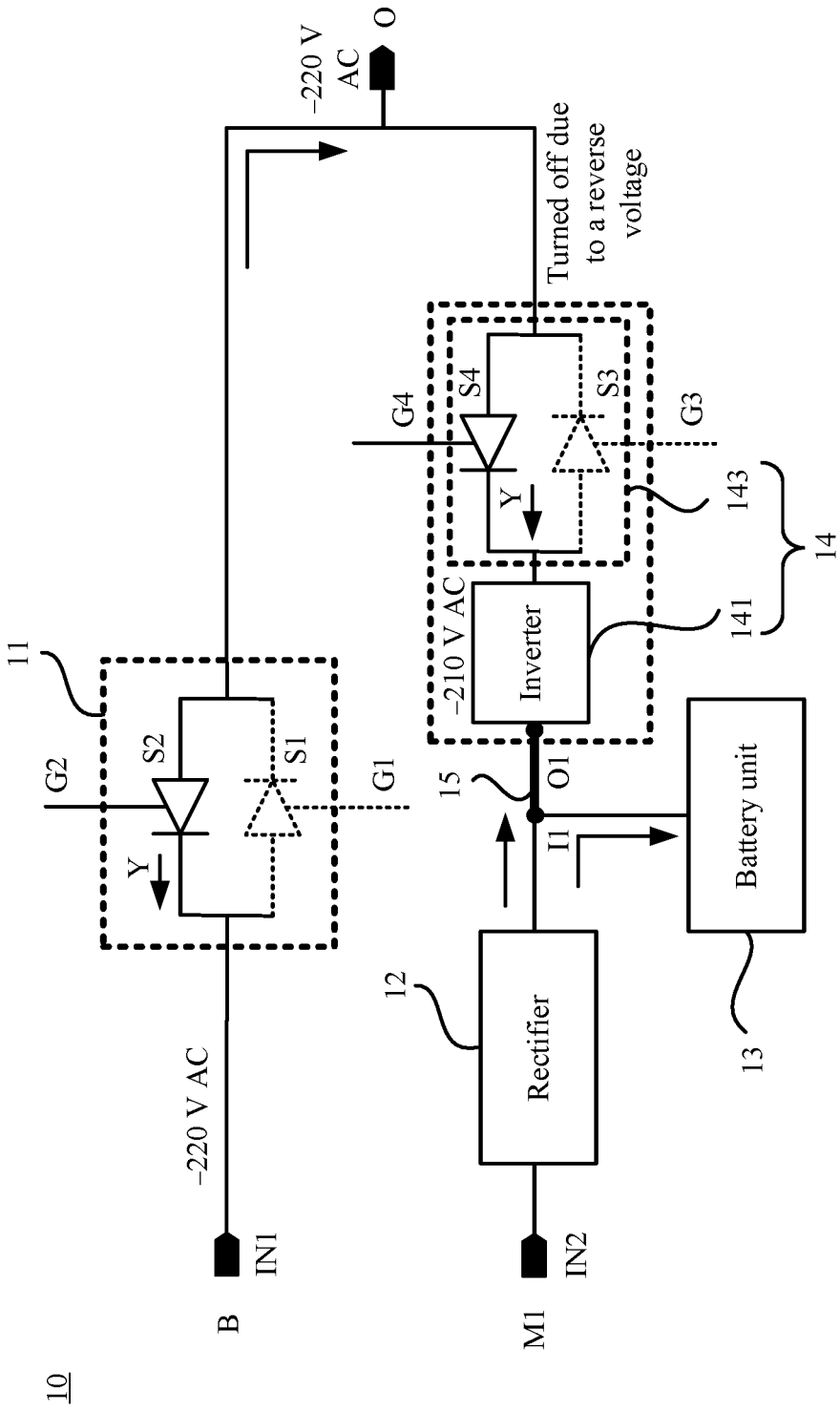

As shown in FIG. 12*b*, the first bidirectional switch 11 in the bypass B is turned on in the second direction Y, and the current whose voltage value is the theoretical voltage value and that is inputted by the first power input end IN1 is transmitted to the load end O by using the first bidirectional switch 11.

At the same time, the second bidirectional switch 143 in the first main circuit M1 is turned off due to a reverse voltage in the second direction Y, and the inverter 142 in the first main circuit M1 performs DC-AC conversion on the current inputted from the output end O1 of the bus 15, and transmits the current whose voltage value is the first voltage value to the second bidirectional switch 143. However, because the second bidirectional switch 143 is turned off due to a reverse voltage, the current whose voltage value is the first voltage value and that is outputted by the inverter 141 is not transmitted to the load end O.

As shown in FIG. 12*b*, the second bidirectional switch 143 is turned off due to a reverse voltage in the second direction Y. For example, the fourth silicon controlled rectifier S4 in the second bidirectional switch 143 may be driven, and the third silicon controlled rectifier S3 is not driven. A voltage (the actual voltage value −220 VAC of the current outputted by the load end O) of the anode of the fourth silicon controlled rectifier S4 is less than a voltage (the first voltage value −210 VAC of the current outputted by the inverter 141) of the cathode. Therefore, the fourth silicon controlled rectifier S4 is turned off due to a reverse voltage, so that the second bidirectional switch 143 is turned off due to a reverse voltage in the second direction Y.

In this case, a negative half-cycle equivalent logic diagram of the UPS 10 is shown in FIG. 12*b*.

Figure 12C:
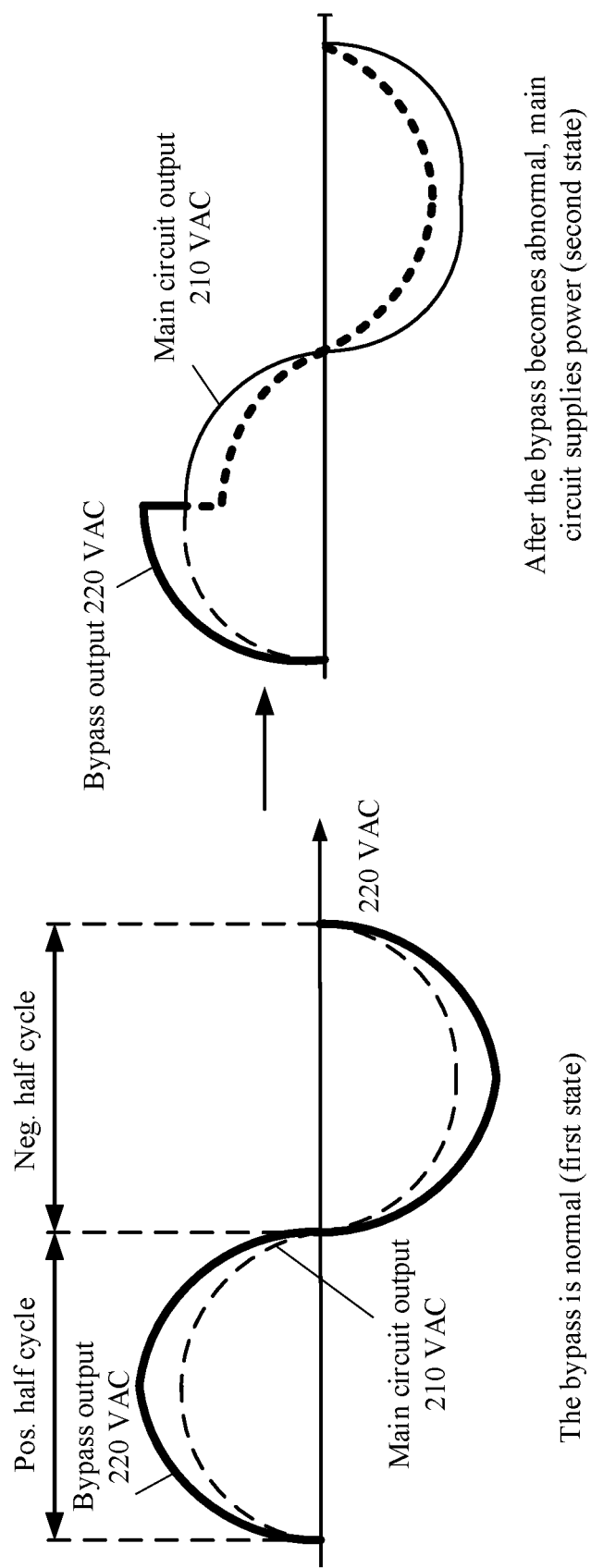
FIG. 12c is a diagram of an output signal of the uninterruptible power system shown in FIG. 10 according to an embodiment of this application.

Therefore, as shown in a left figure in FIG. 12*c*, in the first state, the bypass B transmits a current to the load end O. A current flows in the first main circuit M1, and the inverter 141 keeps outputting a current with the first voltage value, but the second bidirectional switch 143 is turned off due to a reverse voltage. Therefore, the first main circuit M1 does not transmit a current to the load end O. For example, the theoretical voltage value of the current inputted by the first power input end IN1 is 220 VAC, and the first voltage value of the current outputted by the inverter 141 in the first main circuit M1 is 210 VAC. In this case, the voltage value of the current outputted by the load end O is 220 VAC.

In FIG. 12*c*, a solid line represents a current transmitted to the load end O, and a dashed line represents a current not transmitted to the load end O.

Figure 12D:
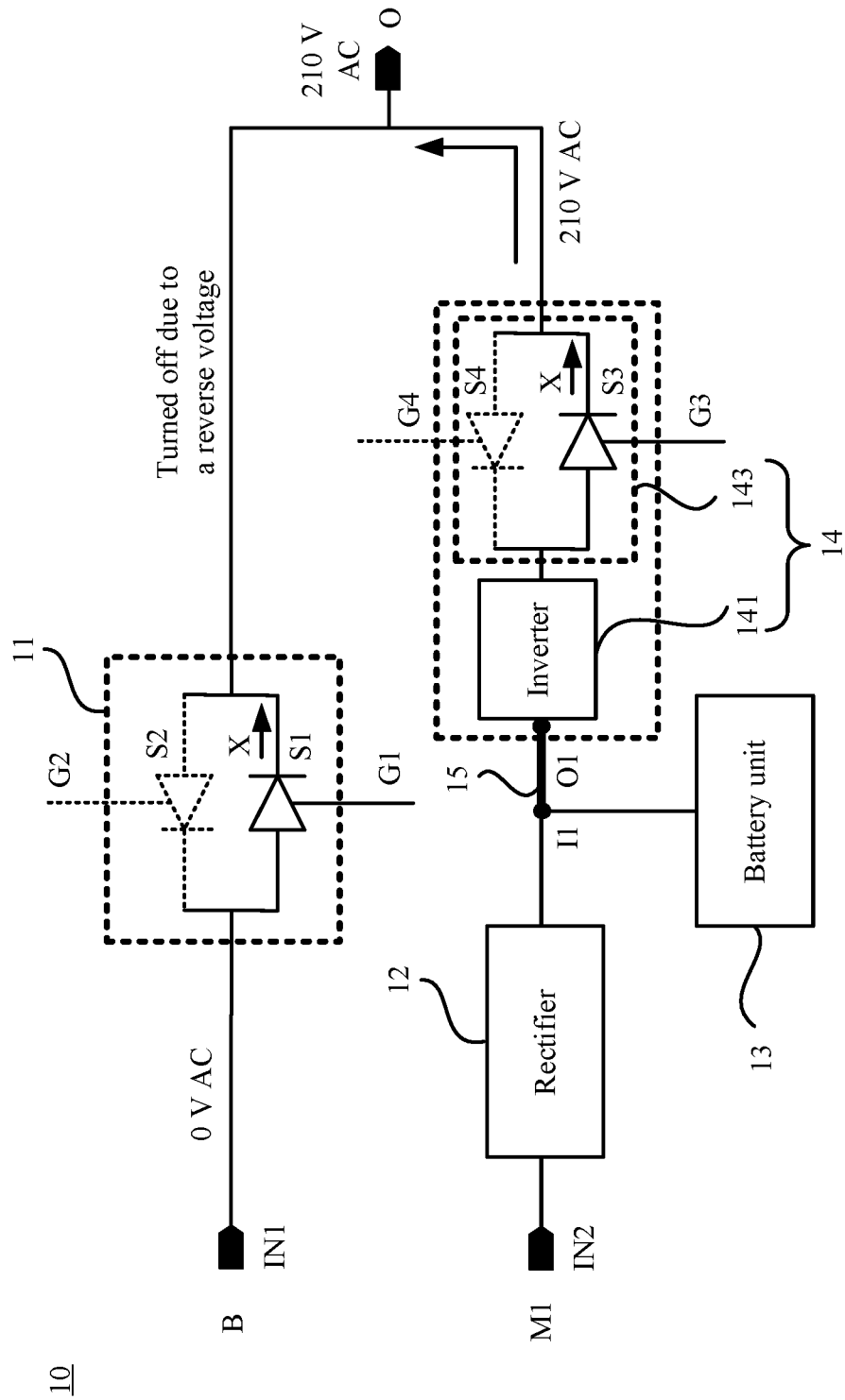
FIG. 12d and FIG. 12e are diagrams of driving processes of the uninterruptible power system shown in FIG. 10.

S32. In the second state:

As shown in FIG. 12*d*, the first bidirectional switch 11 in the bypass B controls the first power input end IN1 to be disconnected from the load end O.

For a manner in which the first bidirectional switch 11 is turned off, positive half-cycle driving is used as an example. As shown in FIG. 12*d*, the first silicon controlled rectifier S1 in the first bidirectional switch 11 is controlled to be driven, and the second silicon controlled rectifier S2 is not driven. However, a voltage value (the actual voltage value 0 VAC of the current outputted by the bypass B to the load end O) of the anode of the first silicon controlled rectifier S1 is less than a voltage value (the first voltage value 210 VAC of the current outputted by the inverter 141 in the first main circuit M1) of the cathode. Therefore, the first silicon controlled rectifier S1 is turned off due to a reverse voltage, and the bypass B is cut off due to a reverse voltage.

The inverter 141 in the first main circuit M1 performs DC-AC conversion on the current inputted from the output end O1 of the bus 15, and transmits the current whose voltage value is the first voltage value to the second bidirectional switch 143. The second bidirectional switch 143 is driven in the first direction X, and transmits the current whose voltage value is the first voltage value to the load end O.

A signal received by the output end O1 of the bus 15 in the first main circuit M1 is a signal inputted from the second power input end IN2 in the first main circuit M1 or a signal inputted from the battery unit 13 in the first main circuit M1.

In this case, a positive half-cycle equivalent logic diagram of the UPS 10 is shown in FIG. 12*d*.

Figure 12E:
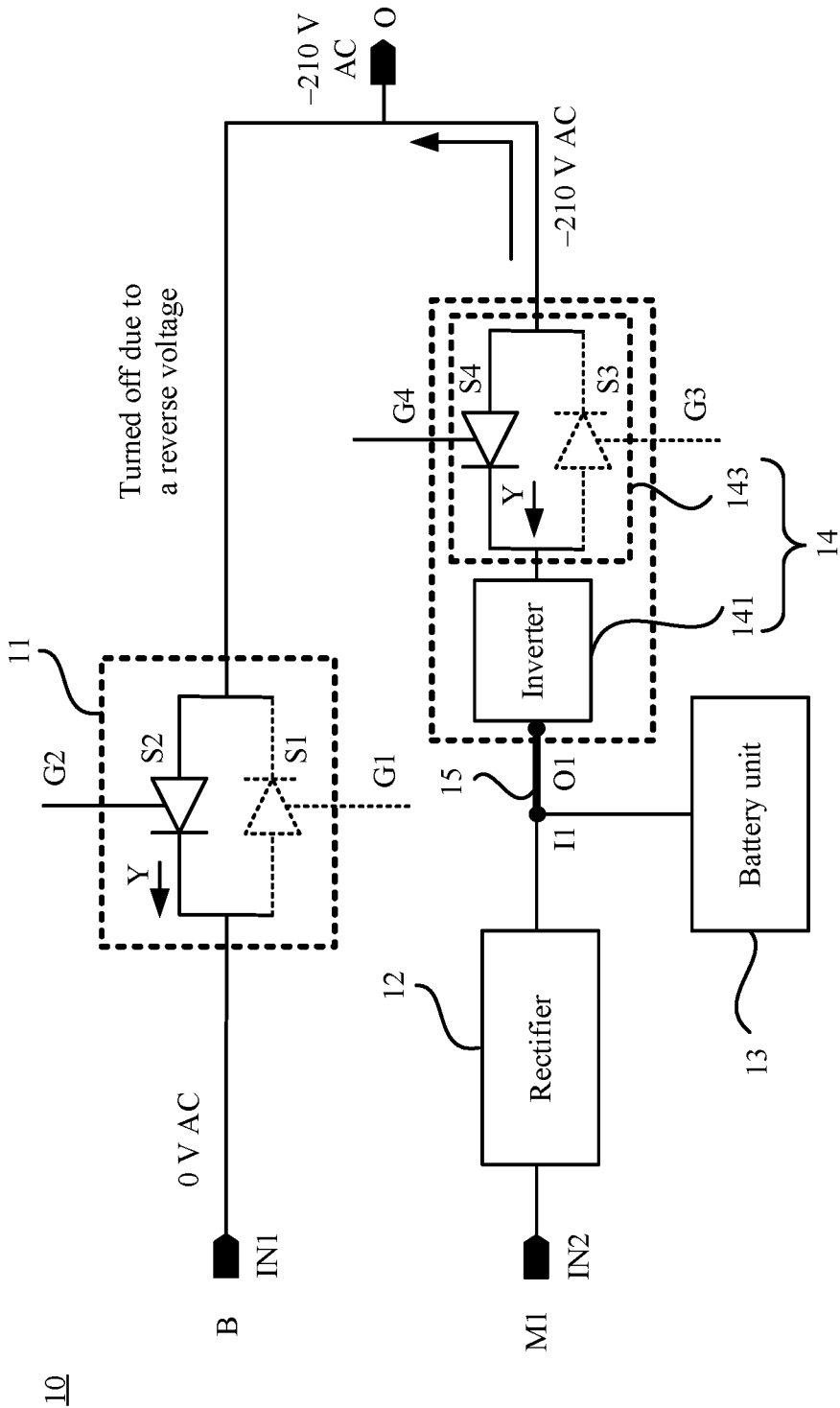

As shown in FIG. 12*e*, the first bidirectional switch 11 in the bypass B controls the first power input end IN1 to be disconnected from the load end O.

Similarly, for a manner in which the first bidirectional switch 11 controls the first power input end IN1 to be disconnected from the load end O, as shown in FIG. 12*e*, the second silicon controlled rectifier S2 is driven, and the first silicon controlled rectifier S1 is not driven. However, a voltage value (the first voltage value −210 VAC of the current outputted by the inverter 141 in the first main circuit M1) of the anode of the second silicon controlled rectifier S2 is less than a voltage value (the actual voltage value 0 VAC of the current outputted by the bypass B to the load end O) of the cathode. Therefore, the second silicon controlled rectifier S2 is turned off due to a reverse voltage, and the bypass B is cut off due to a reverse voltage.

The inverter 141 in the first main circuit M1 performs DC-AC conversion on the current inputted from the output end O1 of the bus 15, and transmits the current whose voltage value is the first voltage value to the second bidirectional switch 143. The second bidirectional switch 143 is driven in the second direction Y, and transmits the current whose voltage value is the first voltage value to the load end O.

A signal received by the output end O1 of the bus 15 in the first main circuit M1 is a signal inputted from the second power input end IN2 in the first main circuit M1 or a signal inputted from the battery unit 13 in the first main circuit M1.

In this case, a negative half-cycle equivalent logic diagram of the UPS 10 is shown in FIG. 12*e*.

Therefore, as shown in a right figure in FIG. 12*c*, after the first state ends and the second state is entered, the first main circuit M1 transmits a current to the load end O, and the bypass B does not transmit a current to the load end O. For example, the first voltage value of the current outputted by the inverter 141 is 210 VAC. In this case, the voltage value of the current outputted by the load end O is also 210 VAC.

It should be noted that the first voltage value of the current outputted by the inverter 141 in the first main circuit M1 is a fixed value, and the first voltage value is less than the theoretical voltage value of the current inputted by the first power input end IN1. Therefore, when power supply of the bypass B is normal, the second bidirectional switch 143 in the first main circuit M1 is automatically turned off due to a reverse voltage. When the power supply of the bypass B is abnormal, after the actual voltage value of the current outputted by the bypass B to the load end O is less than the first voltage value, the first main circuit M1 is naturally conducted, the bypass B is cut off, the second state is entered, and the first main circuit M1 starts to supply power.

The first voltage value of the current outputted by the inverter 141 is a fixed value, and a value may be properly set as required, as long as the first voltage value of the current outputted by the inverter 141 is less than the theoretical voltage value of the current outputted by the first power input end IN1. For example, a value of the first voltage value of the current outputted by the inverter 141 may be controlled by using the control unit in the UPS 10.

In the UPS 10 provided in this example, the bypass B and the first main circuit M1 simultaneously transmit currents to the load end O, and the theoretical voltage value of the current transmitted by the bypass B to the load end O is greater than the first voltage value of the current transmitted by the first main circuit M1 to the load end O. In this way, when the voltage value of the current transmitted by the bypass B to the load end O is greater than the voltage value of the current transmitted by the first main circuit M1 to the load end O, the first main circuit M1 is cut off due to a reverse voltage, and the bypass B transmits the current to the load end O. When the voltage value of the current transmitted by the bypass B to the load end O is less than the voltage value of the current transmitted by the first main circuit M1 to the load end O, the bypass B is cut off due to a reverse voltage, and the first main circuit M1 is naturally conducted. In this way, when the voltage value of the current supplied by the bypass B is very low to be the same as the first voltage value, seamless switching from the bypass B transmitting the current to the load end O to the first main circuit M1 transmitting the current to the load end O is completed. Therefore, when a supply voltage of the bypass B is very low, no power supply interruption occurs during switching from the power supply of the bypass B to the power supply of the first main circuit M1, thereby ensuring uninterrupted output of the UPS 10.

In addition, although the bypass B and the first main circuit M1 simultaneously transmit the currents to the load end O, there is a voltage difference between the currents transmitted by the bypass B and the first main circuit M1. Therefore, a circuit with a low transmission voltage is automatically cut off due to a reverse voltage. There is no case in which the bypass B and the first main circuit M1 are simultaneously conducted to form a cross current, thereby avoiding affecting system reliability of the UPS 10 due to the cross current formed by the two circuits that are simultaneously conducted.

Based on the UPS 10 shown in FIG. 10, in another embodiment, the voltage value of the current transmitted by the bypass B to the load end O abruptly increases and exceeds an upper threshold (the first voltage value of the current outputted by the inverter 141 in the first main circuit M1), the bypass B is cut off, and the first main circuit M1 supplies power.

Figure 13:
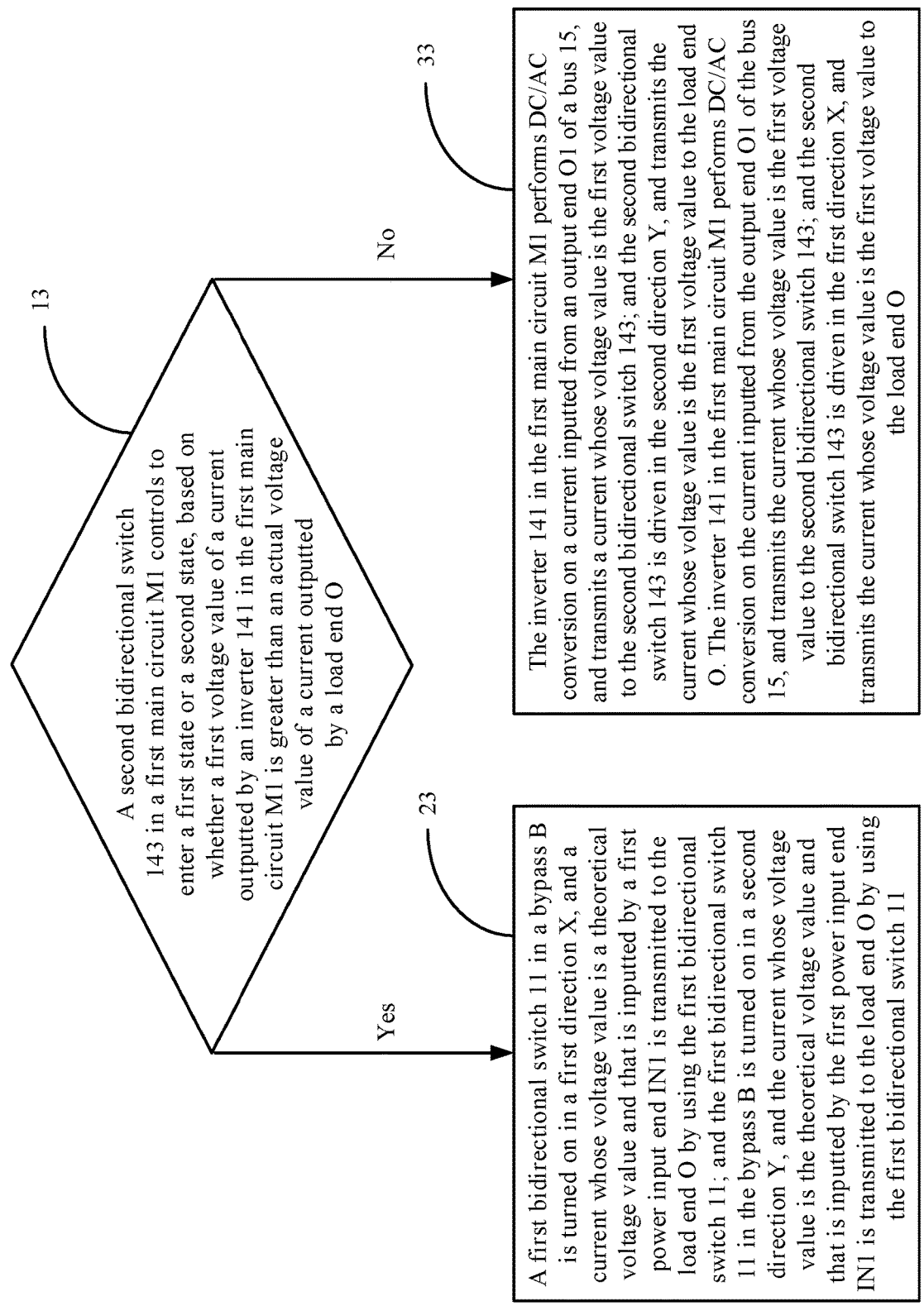
FIG. 13 is a diagram of another driving method for the uninterruptible power system shown in FIG. 10 according to an embodiment of this application.

As shown in FIG. 13, a driving method for the UPS 10 includes the following steps:

S13. The second bidirectional switch 143 in the first main circuit M1 controls to enter a first state or a second state, based on whether the first voltage value of the current outputted by the inverter 141 in the first main circuit M1 is greater than an actual voltage value of a current outputted by the load end O.

If the first voltage value of the current outputted by the inverter 141 in the first main circuit M1 is greater than the actual voltage value of the current outputted by the load end O, the first state is entered.

If the first voltage value of the current outputted by the inverter 141 in the first main circuit M1 is less than the actual voltage value of the current outputted by the load end O, the second state is entered.

It should be noted that, based on the UPS 10 shown in FIG. 10, a process of step S13 does not need to be specially performed in an independent determining process, but is directly and naturally completed by the second bidirectional switch 143. When the actual voltage value of the current outputted by the load end O is less than the first voltage value of the current outputted by the inverter 141 in the first main circuit M1, the second bidirectional switch 143 in the first main circuit M1 is directly turned off due to a reverse voltage and cannot be turned on, so that the first state is entered. Similarly, when the actual voltage value of the current outputted by the load end O is greater than the first voltage value of the current outputted by the inverter 141 in the first main circuit M1, the second bidirectional switch 143 in the first main circuit M1 is naturally turned on, so that the second state is entered.

Figure 14A:
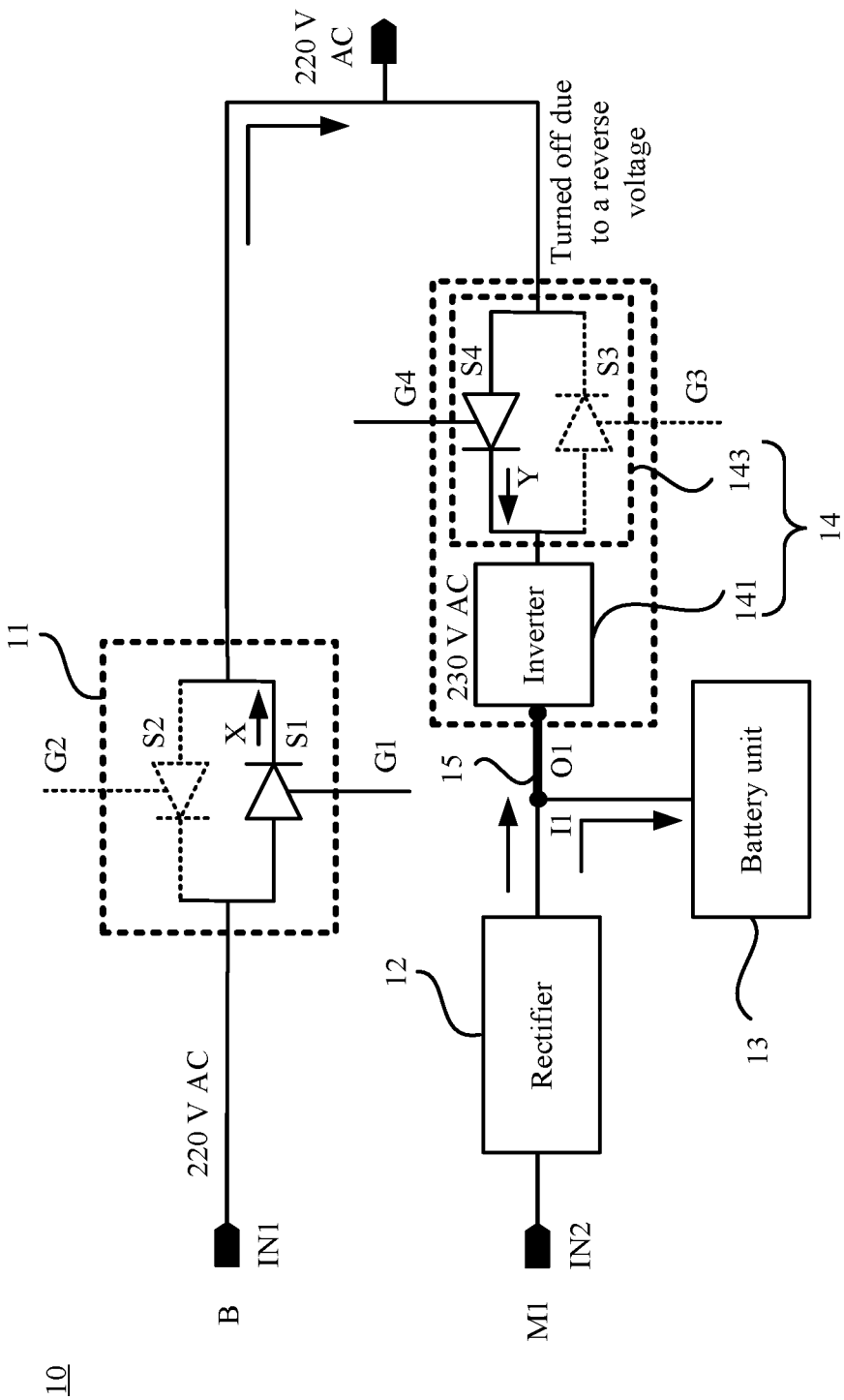
FIG. 14a and FIG. 14b are diagrams of driving processes of the uninterruptible power system shown in FIG. 10.

S23. In the first state:

As shown in FIG. 14a, the first bidirectional switch 11 in the bypass B is turned on in the first direction X, and a current whose voltage value is a theoretical voltage value and that is inputted by the first power input end IN1 is transmitted to the load end O by using the first bidirectional switch 11.

At the same time, the second bidirectional switch 143 in the first main circuit M1 is turned off due to a reverse voltage in the second direction Y, and the inverter 141 in the first main circuit M1 performs DC-AC conversion on the current inputted from the output end O1 of the bus 15, and transmits the current whose voltage value is the first voltage value to the second bidirectional switch 143. However, because the second bidirectional switch 143 is turned off due to a reverse voltage, the current that is with the first voltage value and that is outputted by the inverter 141 is not transmitted to the load end O.

As shown in FIG. 14a, the second bidirectional switch 143 is turned off due to a reverse voltage in the second direction Y. For example, the fourth silicon controlled rectifier S4 in the second bidirectional switch 143 may be driven, and the third silicon controlled rectifier S3 is not driven. A voltage (the actual voltage value 220 VAC of the current outputted by the load end O) of the anode of the fourth silicon controlled rectifier S4 is less than a voltage (the first voltage value 230 VAC of the current outputted by the inverter 141) of the cathode. Therefore, the fourth silicon controlled rectifier S4 is turned off due to a reverse voltage, so that the second bidirectional switch 143 is turned off due to a reverse voltage in the second direction Y.

In this case, a positive half-cycle equivalent logic diagram of the UPS 10 is shown in FIG. 14a.

Figure 14B:
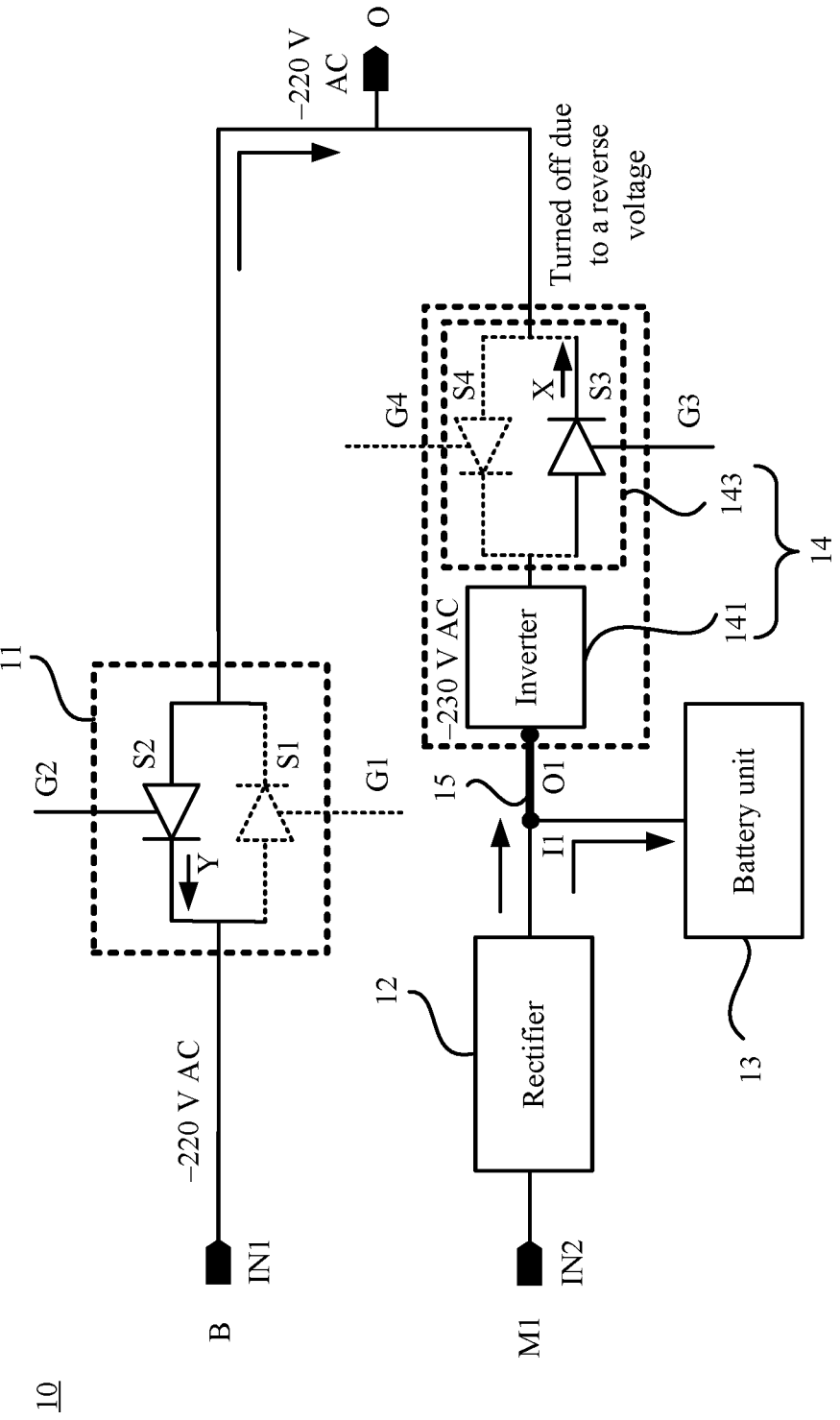

As shown in FIG. 14b, the first bidirectional switch 11 in the bypass B is turned on in the second direction Y, and the current whose voltage value is the theoretical voltage value and that is inputted by the first power input end IN1 is transmitted to the load end O by using the first bidirectional switch 11.

At the same time, the second bidirectional switch 143 in the first main circuit M1 is turned off due to a reverse voltage in the first direction X, and the inverter 142 in the first main circuit M1 performs DC-AC conversion on the current inputted from the output end O1 of the bus 15, and transmits the current whose voltage value is the first voltage value to the second bidirectional switch 143. However, because the second bidirectional switch 143 is turned off due to a reverse voltage, the current that is with the first voltage value and that is outputted by the inverter 141 is not transmitted to the load end O.

As shown in FIG. 14b, the second bidirectional switch 143 is turned off due to a reverse voltage in the first direction X. For example, the third silicon controlled rectifier S3 in the second bidirectional switch 143 may be driven, and the fourth silicon controlled rectifier S4 is not driven. A voltage (the first voltage value −230 VAC of the current outputted by the inverter 141) of the anode of the third silicon controlled rectifier S3 is less than a voltage (the actual voltage value −220 VAC of the current outputted by the load end O) of the cathode. Therefore, the third silicon controlled rectifier S3 is turned off due to a reverse voltage, so that the second bidirectional switch 143 is turned off due to a reverse voltage in the first direction X.

In this case, a negative half-cycle equivalent logic diagram of the UPS 10 is shown in FIG. 14b.

Figure 14C:
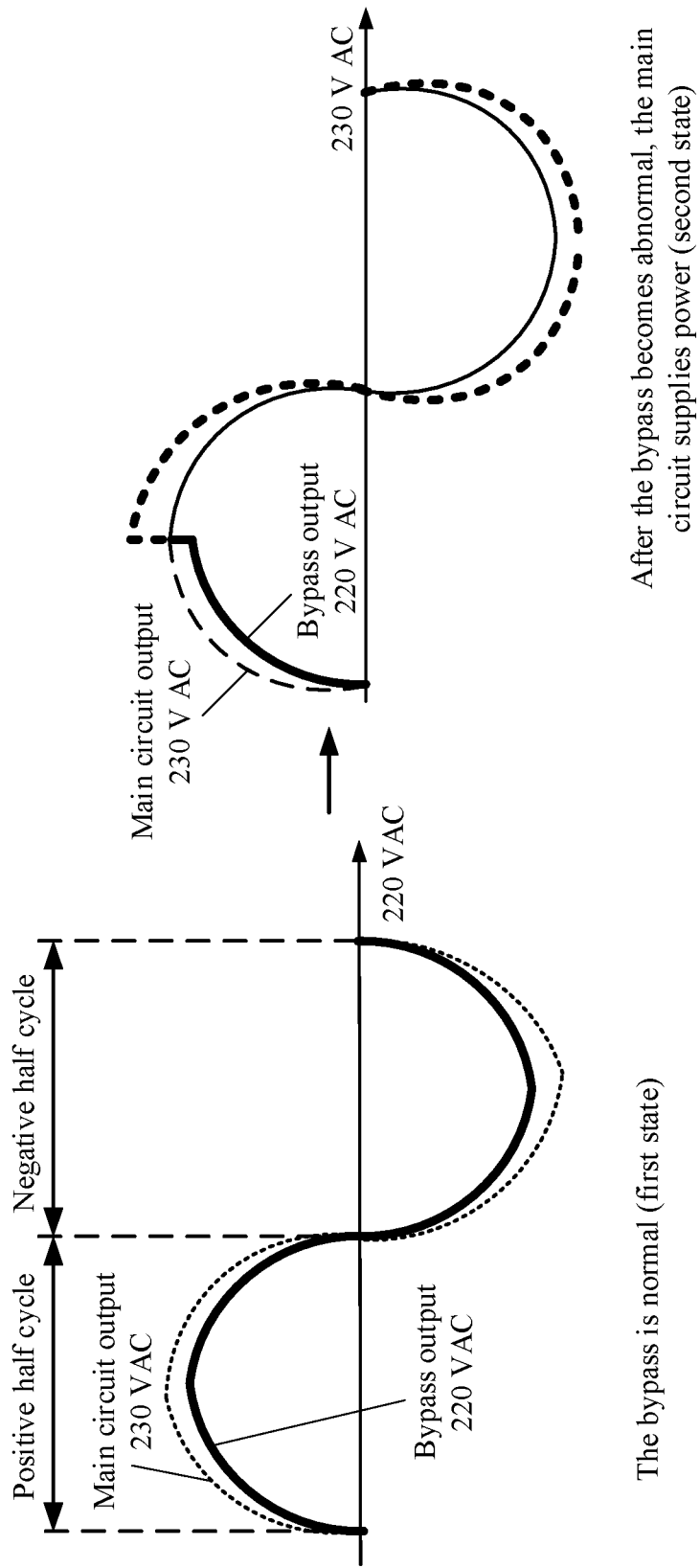
FIG. 14c is a diagram of another output signal of the uninterruptible power system shown in FIG. 10 according to an embodiment of this application.

Therefore, as shown in a left figure in FIG. 14c, in the first state, the bypass B transmits a current to the load end O. A current flows in the first main circuit M1, and the inverter 141 keeps outputting a current with the first voltage value, but the second bidirectional switch 143 is turned off due to a reverse voltage. Therefore, the first main circuit M1 does not transmit a current to the load end O. For example, the theoretical voltage value of the current inputted by the first power input end IN1 is 220 VAC, and the first voltage value of the current outputted by the inverter 141 in the first main circuit M1 is 230 VAC. In this case, the voltage value of the current outputted by the load end O is 220 VAC.

In FIG. 14c, a solid line represents a current transmitted to the load end O, and a dashed line represents a current not transmitted to the load end O.

Figure 14D:
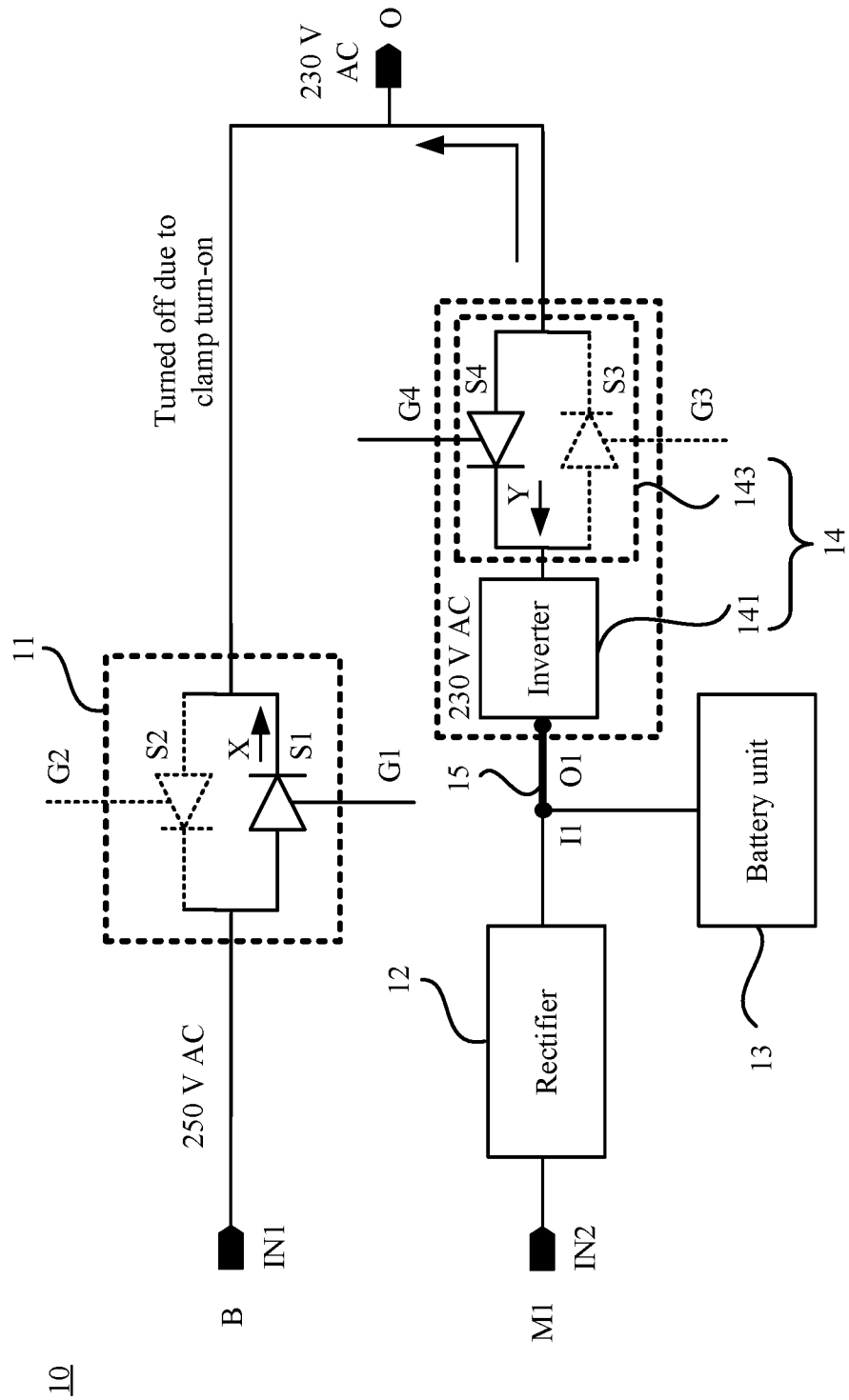
FIG. 14d and FIG. 14e are diagrams of driving processes of the uninterruptible power system shown in FIG. 10.

S33. In the second state:

As shown in FIG. 14d, the first bidirectional switch 11 in the bypass B controls the first power input end IN1 to be disconnected from the load end O.

For a manner in which the first bidirectional switch 11 controls the first power input end IN1 to be disconnected from the load end O, as shown in FIG. 14d, the first silicon controlled rectifier S1 is driven, and the second silicon controlled rectifier S2 is not driven. However, a clamp of the first silicon controlled rectifier S1 may be turned on by enabling power of the inverter 141 to be greater than power of the first power input end IN1, so that the first bidirectional switch 11 is turned off due to clamp turn-on, to control the first power input end IN1 to be disconnected from the load end O.

The inverter 141 in the first main circuit M1 performs DC-AC conversion on the current inputted from the output end O1 of the bus 15, and transmits the current whose voltage value is the first voltage value to the second bidirectional switch 143. The second bidirectional switch 143 is driven in the second direction Y, and transmits the current whose voltage value is the first voltage value to the load end O.

In this case, a positive half-cycle equivalent logic diagram of the UPS 10 is shown in FIG. 14d.

Figure 14E:
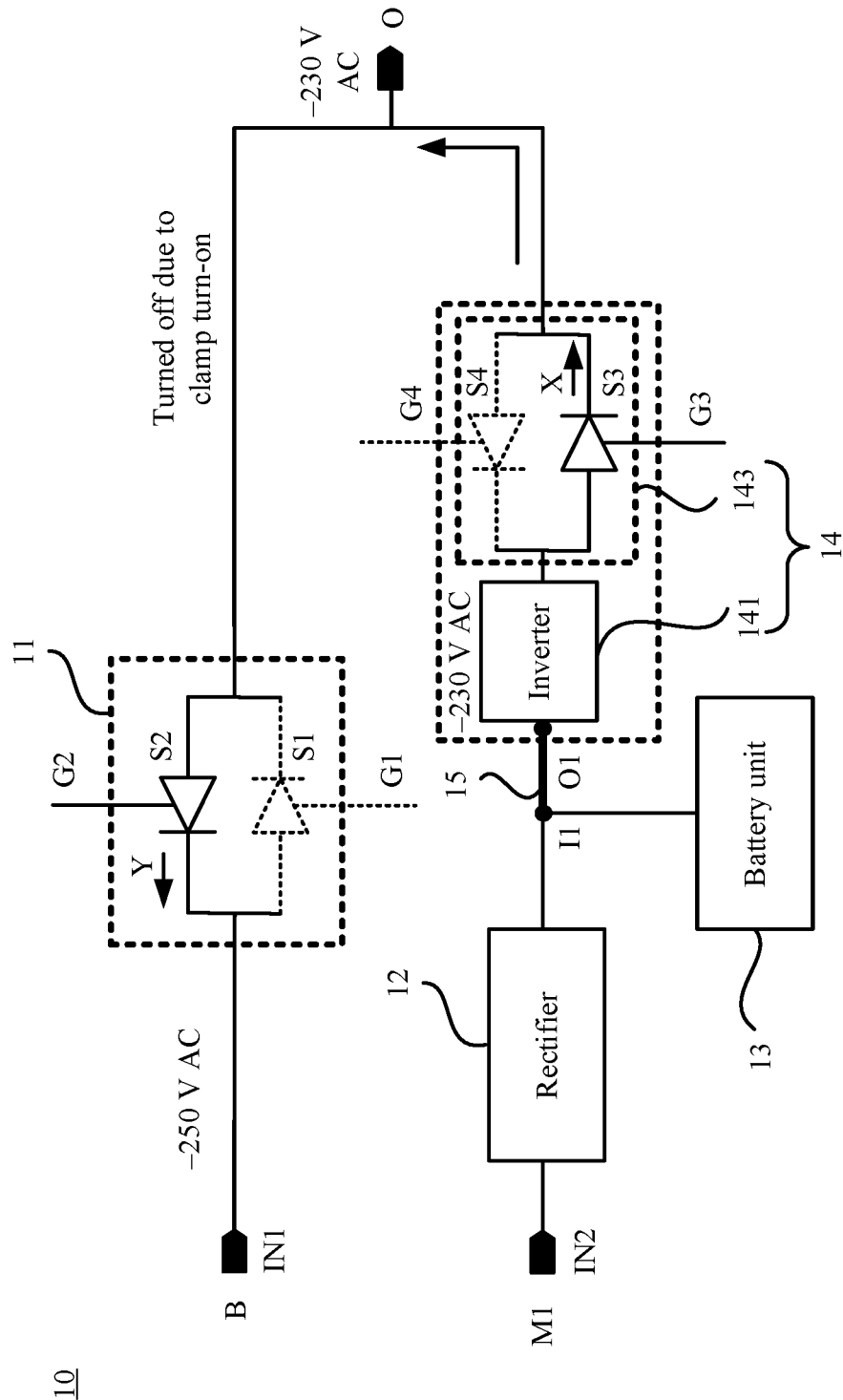

As shown in FIG. 14e, the first bidirectional switch 11 in the bypass B controls the first power input end IN1 to be disconnected from the load end O.

Similarly, for a manner in which the first bidirectional switch 11 controls the first power input end IN1 to be disconnected from the load end O, as shown in FIG. 14e, the second silicon controlled rectifier S2 is driven, and the first silicon controlled rectifier S1 is not driven. However, a clamp of the second silicon controlled rectifier S2 may be turned on by enabling power of the inverter 141 to be greater than power of the first power input end IN1, so that the first bidirectional switch 11 is turned off due to clamp turn-on, to control the first power input end IN1 to be disconnected from the load end O.

The inverter 141 in the first main circuit M1 performs DC-AC conversion on the current inputted from the output end O1 of the bus 15, and transmits the current whose voltage value is the first voltage value to the second bidirectional switch 143. The second bidirectional switch 143 is driven in the first direction X, and transmits the current whose voltage value is the first voltage value to the load end O.

In this case, a negative half-cycle equivalent logic diagram of the UPS 10 is shown in FIG. 14e.

Therefore, as shown in a right figure in FIG. 14c, after the first state ends and the second state is entered, the first main circuit M1 transmits a current to the load end O, and the bypass B does not transmit a current to the load end O. For example, the first voltage value of the current outputted by the inverter 141 is 230 VAC. In this case, the voltage value of the current outputted by the load end O is also 230 VAC.

It should be noted that the first voltage value of the current outputted by the inverter 141 in the first main circuit M1 is a fixed value, and the first voltage value is greater than the theoretical voltage value of the current inputted by the first power input end IN1. In addition, when the first bidirectional switch 11 is turned on in the first direction X, the second bidirectional switch 143 is turned on in the second direction Y, and a direction in which the first bidirectional switch 11 is turned on is always opposite to a direction in which the second bidirectional switch 143 is turned on.

Therefore, when power supply of the bypass B is normal, the second bidirectional switch 143 in the first main circuit M1 is automatically turned off due to a reverse voltage. When the power supply of the bypass B is abnormal, after the actual voltage value of the current outputted by the bypass B to the load end O is greater than the first voltage value, the first main circuit M1 is naturally conducted, the bypass B is cut off, the second state is entered, and the first main circuit M1 starts to supply power.

The first voltage value of the current outputted by the inverter 141 is a fixed value, and a value may be properly set as required, as long as the first voltage value of the current outputted by the inverter 141 is greater than the theoretical voltage value of the current outputted by the first power input end IN1. For example, a value of the first voltage value of the current outputted by the inverter 141 may be controlled by using the control unit in the UPS 10.

In the UPS 10 provided in this example, the bypass B and the first main circuit M1 simultaneously transmit currents to the load end O, and the theoretical voltage value of the current transmitted by the bypass B to the load end O is less than the first voltage value of the current transmitted by the first main circuit M1 to the load end O. In this way, when the voltage value of the current transmitted by the bypass B to the load end O is less than the voltage value of the current transmitted by the first main circuit M1 to the load end O, the first main circuit M1 is cut off due to a reverse voltage, and the bypass B transmits the current to the load end O. When the voltage value of the current transmitted by the bypass B to the load end O is greater than the voltage value of the current transmitted by the first main circuit M1 to the load end O, the bypass B is cut off due to a reverse voltage, and the first main circuit M1 is naturally conducted. In this way, when the voltage value of the current supplied by the bypass B is very high to be the same as the first voltage value, seamless switching from the bypass B transmitting the current to the load end O to the first main circuit M1 transmitting the current to the load end O is completed. Therefore, in this example, when the power supply of the bypass B exceeds an upper threshold, instantaneous switching from the power supply of the bypass B to the power supply of the first main circuit M1 can be performed, without continuously outputting a high-voltage signal for a period of time before switching to the power supply of the first main circuit M1, thereby shortening a time in which the UPS 10 continuously outputs an abnormal current. This improves stability of a current outputted by the UPS 10.

In addition, although the bypass B and the first main circuit M1 simultaneously transmit the currents to the load end O, there is a voltage difference between the currents transmitted by the bypass B and the first main circuit M1. Therefore, a circuit with a low transmission voltage is automatically cut off due to a reverse voltage. There is no case in which the bypass B and the first main circuit M1 are simultaneously conducted to form a cross current, thereby avoiding affecting system reliability of the UPS 10 due to the cross current formed by the two circuits that are simultaneously conducted.

Embodiment 4

The same as embodiment 3, in embodiment 4, the UPS 10 includes a bypass B and a first main circuit M1.

Different from embodiment 3, in embodiment 4, the UPS 10 further includes a second main circuit M2. A voltage value of a current supplied by the bypass B to a load end O is different from a voltage value of a current supplied by the second main circuit M2 to the load end O.

Figure 15:
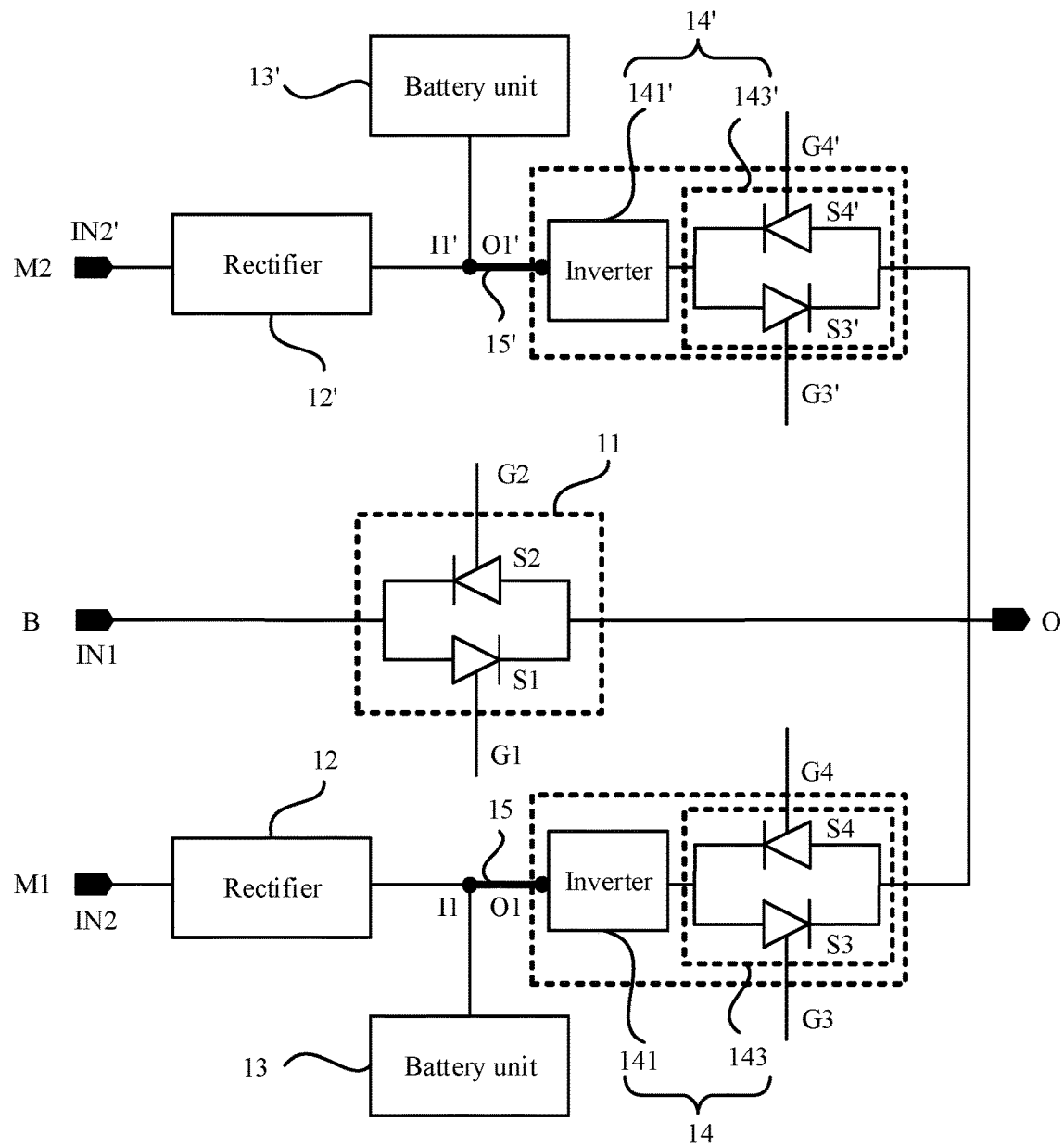
FIG. 15 is a diagram of another uninterruptible power system according to an embodiment of this application.

As shown in FIG. 15, the UPS 10 includes:
the bypass B, where the bypass B includes a first bidirectional switch 11.

The first bidirectional switch 11 is connected to a first power input end IN1 and the load end O of the UPS 10, and is configured to control connection or disconnection between the first power input end IN1 and the load end O.

In some embodiments, as shown in FIG. 15, the first bidirectional switch 11 includes a first silicon controlled rectifier S1 and a second silicon controlled rectifier S2.

An anode of the first silicon controlled rectifier S1 is connected to the first power input end IN1, and a cathode of the first silicon controlled rectifier S1 is connected to the load end O. When a gate G1 of the first silicon controlled rectifier S1 receives a turn-on signal, the first silicon controlled rectifier S1 is driven, and the first bidirectional switch 11 is turned on in a first direction X, to transmit a positive half-cycle signal of an alternating current signal.

An anode of the second silicon controlled rectifier S2 is connected to the load end O, and a cathode of the second silicon controlled rectifier S2 is connected to the first power input end IN1. When a gate G2 of the second silicon controlled rectifier S2 receives a turn-on signal, the second silicon controlled rectifier S2 is driven, and the first bidirectional switch 11 is turned on in a second direction Y, to transmit a negative half-cycle signal of the alternating current signal.

For the first main circuit M1, the first main circuit M1 includes a rectifier 12, a battery unit 13, an inverter output unit 14, and a bus 15.

The rectifier 12 in the first main circuit M1 is connected to a second power input end IN2 and an input end I1 of the bus 15, and is configured to perform AC-DC conversion on a current inputted from the second power input end IN2, and then transmit a current to the input end I1 of the bus 15.

The battery unit 13 in the first main circuit M1 is connected to the input end I1 of the bus 15, and is configured to receive and store a current from the input end I1 of the bus 15, and is further configured to output a current stored in the battery unit 13 to the input end I1 of the bus 15.

The inverter output unit 14 in the first main circuit M1 includes an inverter 141 and a second bidirectional switch 143.

The inverter 141 in the first main circuit M1 is connected to an output end O1 of the bus 15 and the second bidirectional switch 143 in the first main circuit M1, and is configured to perform DC-AC conversion on a current inputted from the output end O1 of the bus 15, and then transmit a current to the second bidirectional switch 143 in the first main circuit M1.

The second bidirectional switch 143 in the first main circuit M1 is further connected to the load end O, and is configured to control whether to transmit, to the load end O, the current outputted by the inverter 141 in the first main circuit M1.

In some embodiments, as shown in FIG. 15, the second bidirectional switch 143 in the first main circuit M1 includes a third silicon controlled rectifier S3 and a fourth silicon controlled rectifier S4.

An anode of the third silicon controlled rectifier S3 is connected to the inverter 141 in the first main circuit M1, and a cathode of the third silicon controlled rectifier S3 is connected to the load end O. When a gate G3 of the third silicon controlled rectifier S3 receives a turn-on signal, the third silicon controlled rectifier S3 is driven. In this case, the fourth silicon controlled rectifier S4 is not driven, and the second bidirectional switch 143 is turned on in the first direction X.

An anode of the fourth silicon controlled rectifier S4 is connected to the load end O, and a cathode of the fourth silicon controlled rectifier S4 is connected to the inverter 141 in the first main circuit M1. When a gate G4 of the fourth silicon controlled rectifier S4 receives a turn-on signal, the fourth silicon controlled rectifier S4 is driven. In this case, the third silicon controlled rectifier S3 is not driven, and the second bidirectional switch 143 is turned on in the second direction Y.

The gate G3 of the third silicon controlled rectifier S3 and the gate G4 of the fourth silicon controlled rectifier S4 may be connected to, for example, the control unit of the UPS 10, and the control unit controls whether to drive the third silicon controlled rectifier S3 and the fourth silicon controlled rectifier S4.

When the third silicon controlled rectifier S3 is driven, the fourth silicon controlled rectifier S4 is not driven, and the second bidirectional switch 143 is turned on in the first direction X, to transmit a current of the output end O1 of the bus 15 to the load end O. Similarly, when the fourth silicon controlled rectifier S4 is driven, the third silicon controlled rectifier S3 is not driven, and the second bidirectional switch 143 is turned on in the second direction Y, to transmit the current of the output end O1 of the bus 15 to the load end O. When the power supply of the bypass B is normal, the third silicon controlled rectifier S3 or the fourth silicon controlled rectifier S4 is driven, but the second bidirectional switch 143 in the first main circuit M1 is turned off due to a reverse voltage, and the current of the output end O1 of the bus 15 is not transmitted to the load end O.

A structure of the second main circuit M2 is the same as a structure of the first main circuit M1. As shown in FIG. 15, the second main circuit M2 includes a rectifier 12', a battery unit 13', an inverter output unit 14', and a bus 15'.

The rectifier 12' in the second main circuit M2 is connected to a second power input end IN2' and an input end I1' of the bus 15' in the second main circuit M2, and is configured to perform AC-DC conversion on a current inputted from the second power input end IN2', and then transmit a current to the input end I1' of the bus 15'.

The battery unit 13' in the second main circuit M2 is connected to the input end I1' of the bus 15' in the second main circuit M2, and is configured to receive and store a current from the input end I1' of the bus 15', and is further configured to output a current stored in the battery unit 13' to the input end I1' of the bus 15'.

The inverter output unit 14' in the second main circuit M2 includes an inverter 141' and a second bidirectional switch 143'.

The inverter 141' in the second main circuit M2 is connected to an output end O1' of the bus 15' in the second main circuit M2 and the second bidirectional switch 143' in the second main circuit M2, and is configured to perform DC-AC conversion on a current inputted from the output end O1' of the bus 15', and then transmit a current to the second bidirectional switch 143'.

The second bidirectional switch 143' in the second main circuit M2 is further connected to the load end O, and is configured to control whether to transmit, to the load end O, the current outputted by the inverter 141' in the second main circuit M2.

In some embodiments, as shown in FIG. 15, the second bidirectional switch 143' in the second main circuit M2 includes a third silicon controlled rectifier S3' and a fourth silicon controlled rectifier S4'.

An anode of the third silicon controlled rectifier S3' is connected to the inverter 141' in the second main circuit M2, and a cathode of the third silicon controlled rectifier S3' is connected to the load end O. When a gate G3' of the third silicon controlled rectifier S3' receives a turn-on signal, the third silicon controlled rectifier S3' is driven. In this case, the fourth silicon controlled rectifier S4' is not driven, and the second bidirectional switch 143' in the second main circuit M2 is turned on in the first direction X.

An anode of the fourth silicon controlled rectifier S4' is connected to the load end O, and a cathode of the fourth silicon controlled rectifier S4' is connected to the inverter 141' in the second main circuit M2. When a gate G4' of the fourth silicon controlled rectifier S4' receives a turn-on signal, the fourth silicon controlled rectifier S4' is driven. In this case, the third silicon controlled rectifier S3' is not driven, and the second bidirectional switch 143' in the second main circuit M2 is turned on in the second direction Y.

In this example, the first power input end IN1, the second power input end IN2 in the first main circuit M1, and the second power input end IN2' in the second main circuit M2 may be connected to a same power system 20. For example, the first power input end IN1, the second power input end IN2 in the first main circuit M1, and the second power input end IN2' in the second main circuit M2 are all connected to the mains. The first power input end IN1, the second power input end IN2 in the first main circuit M1, and the second power input end IN2' in the second main circuit M2 may alternatively be connected to different power systems 20.

A difference between the first main circuit M1 and the second main circuit M2 lies in that a first voltage value of a current outputted by the inverter 141 in the first main circuit M1 is different from a second voltage value of a current outputted by the inverter 141' in the second main circuit M2.

In an embodiment, the first voltage value (for example, 210 VAC) of the current outputted by the inverter 141 in the first main circuit M1 and the second voltage value (for example, 200 VAC) of the current outputted by the inverter 141' in the second main circuit M2 are different and are both less than a theoretical voltage value (for example, 220 VAC) of a current transmitted by the first power input end IN1.

In this way, when a supply voltage of the first main circuit M1 abruptly drops and exceeds a lower threshold, switching to power supply of the second main circuit M2 can be performed, to better ensure voltage stabilization.

In another embodiment, the first voltage value (for example, 230 VAC) of the current outputted by the inverter 141 in the first main circuit M1 and the second voltage value (for example, 240 VAC) of the current outputted by the inverter 141' in the second main circuit M2 are different and are both greater than the theoretical voltage value (for example, 220 VAC) of the current transmitted by the first power input end IN1.

In this way, when the supply voltage of the first main circuit M1 abruptly increases and exceeds an upper threshold, switching to the power supply of the second main circuit M2 can be performed, to better ensure voltage stabilization.

In another embodiment, the first voltage value (for example, 210 VAC) of the current outputted by the inverter 141 in the first main circuit M1 is less than the theoretical voltage value (for example, 220 VAC) of the current transmitted by the first power input end IN1. The second voltage value (for example, 230 VAC) of the current outputted by the inverter 141' in the second main circuit M2 is greater than the theoretical voltage value (for example, 220 VAC) of the current transmitted by the first power input end IN1.

In this way, when a supply voltage of the bypass B abruptly drops and exceeds a lower threshold (the first voltage value of the current outputted by the inverter 141 in the first main circuit M1), switching to power supply of the first main circuit M1 can be performed. When the supply voltage of the bypass B abruptly increases and exceeds an upper threshold (the second voltage value of the current outputted by the inverter 141' in the second main circuit M2), switching to the power supply of the second main circuit M2 can be performed. Therefore, both ultra-low voltage protection and ultra-high voltage protection can be performed, to prevent a very low or very high voltage value of a current outputted by the UPS 10 from damaging a load 30 connected to the UPS 10.

Figure 16:
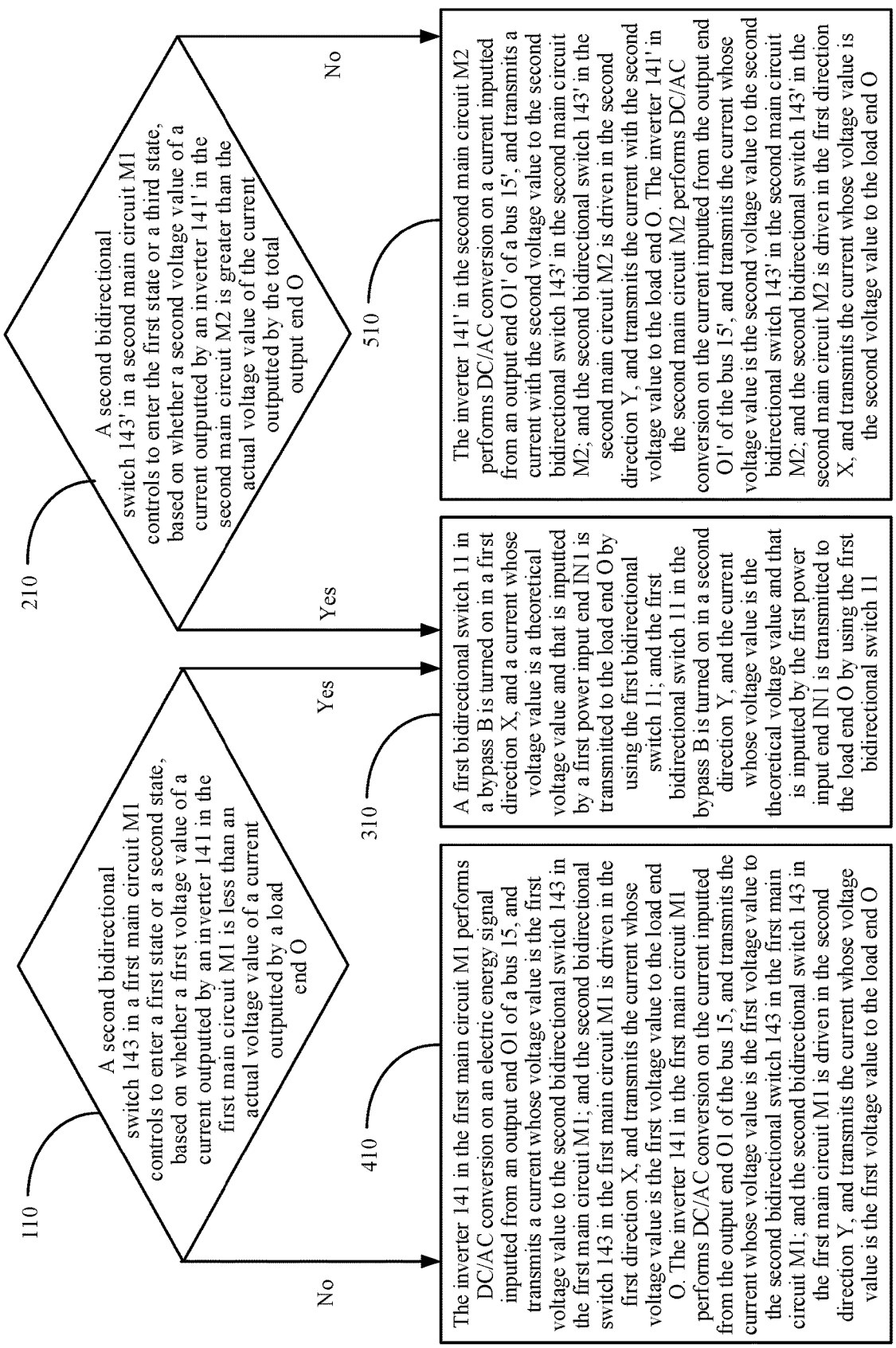
FIG. 16 is a diagram of a driving method for the uninterruptible power system shown in FIG. 15 according to an embodiment of this application.

Based on the UPS 10 shown in FIG. 15, to enable the UPS 10 to perform both ultra-low voltage protection and ultra-high voltage protection, as shown in FIG. 16, a driving method for the UPS 10 includes the following steps:

S110. The second bidirectional switch 143 in the first main circuit M1 controls to enter a first state or a second state, based on whether the first voltage value of the current outputted by the inverter 141 in the first main circuit M1 is less than an actual voltage value of a current outputted by the load end O.

If the first voltage value of the current outputted by the inverter 141 in the first main circuit M1 is less than the actual voltage value of the current outputted by the load end O, the first state is entered.

If the first voltage value of the current outputted by the inverter 141 in the first main circuit M1 is greater than the actual voltage value of the current outputted by the load end O, the second state is entered.

S210. The second bidirectional switch 143' in the second main circuit M1 controls to enter the first state or a third state, based on whether the second voltage value of the current outputted by the inverter 141' in the second main circuit M2 is greater than the actual voltage value of the current outputted by the load end O.

If the second voltage value of the current outputted by the inverter 141' in the second main circuit M2 is greater than the actual voltage value of the current outputted by the load end O, the first state is entered.

If the second voltage value of the current outputted by the inverter 141' in the second main circuit M2 is less than the actual voltage value of the current outputted by the load end O, the third state is entered.

It should be noted that, based on the UPS 10 shown in FIG. 15, processes of step S110 and step S210 do not need to be specially performed in an independent determining process, but are directly and naturally completed by the second bidirectional switch 143 in the first main circuit M1 and the second bidirectional switch 143' in the second main circuit M2, respectively.

When the actual voltage value of the current outputted by the load end O is greater than the first voltage value of the current outputted by the inverter 141 in the first main circuit M1 and less than the second voltage value of the current outputted by the inverter 141' in the second main circuit M2, the second bidirectional switch 143 in the first main circuit M1 and the second bidirectional switch 143' in the second main circuit M2 are directly turned off due to a reverse voltage and cannot be turned on, so that the first state is entered.

When the actual voltage value of the current outputted by the load end O is less than the first voltage value of the current outputted by the inverter 141 in the first main circuit M1, the second bidirectional switch 143 in the first main circuit M1 is naturally turned on (without additional control or determining), and the second bidirectional switch 143' in the second main circuit M2 is still turned off and cannot be turned on, so that the second state is entered.

When the actual voltage value of the current outputted by the load end O is greater than the second voltage value of the current outputted by the inverter 141' in the second main circuit M2, the second bidirectional switch 143' in the second main circuit M2 is naturally turned on (without additional control or determining), and the second bidirectional switch 143 in the first main circuit M1 is still turned off and cannot be turned on, so that the third state is entered.

Figure 17A:
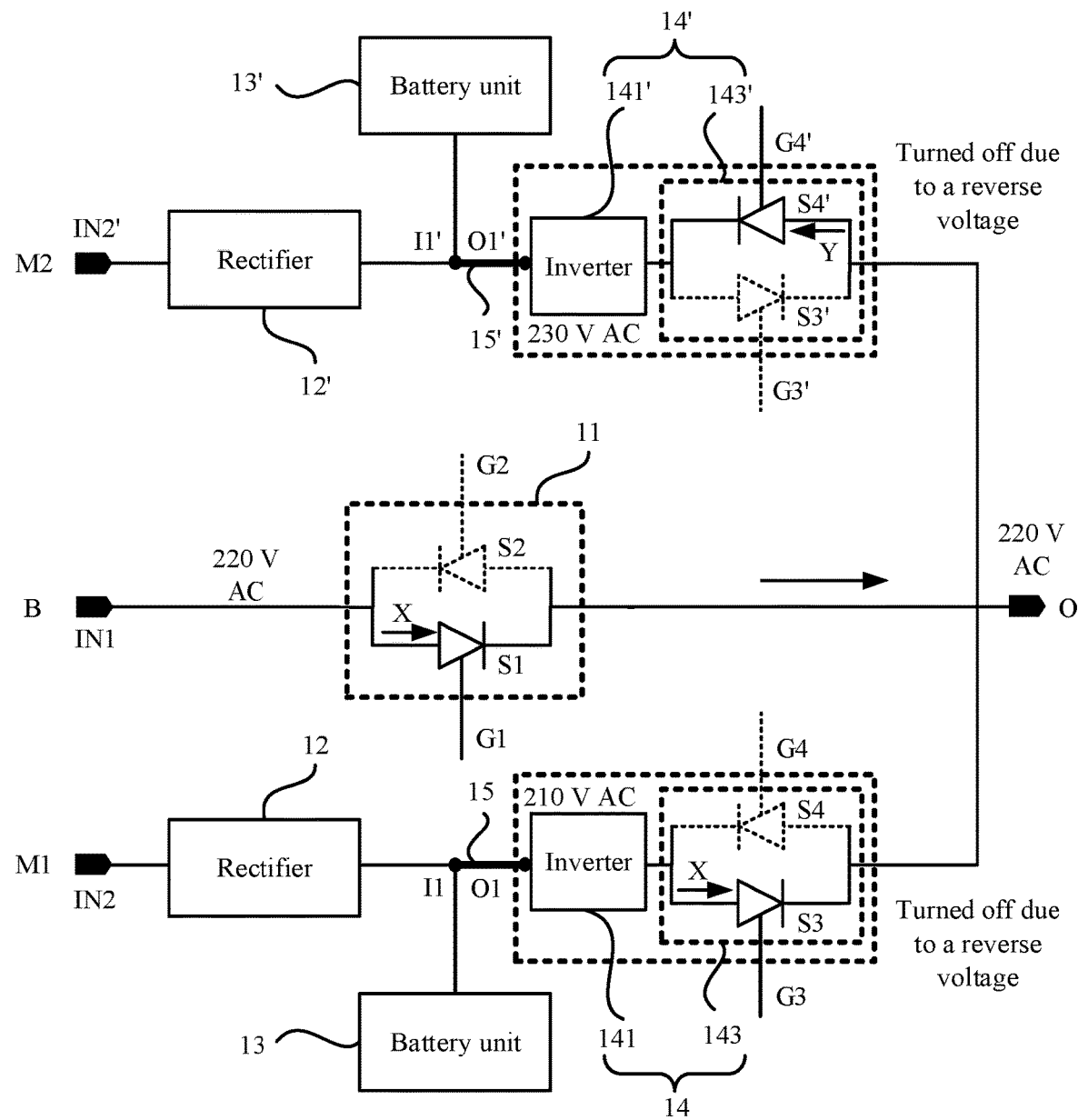
FIG. 17a and FIG. 17b are diagrams of driving processes of the uninterruptible power system shown in FIG. 15.

S310. In the first state:

As shown in FIG. 17a, the first bidirectional switch 11 in the bypass B is turned on in the first direction X, and a current whose voltage value is a theoretical voltage value and that is inputted by the first power input end IN1 is transmitted to the load end O by using the first bidirectional switch 11.

At the same time, the second bidirectional switch 143 in the first main circuit M1 is turned off due to a reverse voltage in the first direction X, and the inverter 141 in the first main circuit M1 performs DC-AC conversion on the current inputted from the output end O1 of the bus 15, and transmits the current whose voltage value is the first voltage value to the second bidirectional switch 143 in the first main circuit M1. However, because the second bidirectional switch 143 in the first main circuit M1 is turned off due to a reverse voltage, the current whose voltage value is the first voltage value and that is outputted by the inverter 141 is not transmitted to the load end O.

As shown in FIG. 17a, the second bidirectional switch 143 in the first main circuit M1 is turned off due to a reverse voltage in the first direction X. For example, the third silicon controlled rectifier S3 in the second bidirectional switch 143 in the first main circuit M1 may be driven, and the fourth silicon controlled rectifier S4 is not driven. A voltage (the first voltage value 210 VAC of the current outputted by the inverter 141 in the first main circuit M1) of the anode of the third silicon controlled rectifier S3 is less than a voltage (the actual voltage value 220 VAC of the current outputted by the load end O) of the cathode. Therefore, the third silicon controlled rectifier S3 is turned off due to a reverse voltage, so that the second bidirectional switch 143 in the first main circuit M1 is turned off due to a reverse voltage in the first direction X.

At the same time, the second bidirectional switch 143' in the second main circuit M2 is turned off due to a reverse voltage in the second direction Y, and the inverter 141' in the second main circuit M2 performs DC-AC conversion on the current inputted from the output end O1' of the bus 15', and transmits the current whose voltage value is the second voltage value to the second bidirectional switch 143' in the second main circuit M2. However, because the second bidirectional switch 143' is turned off due to a reverse voltage, the current whose voltage value is the second voltage value and that is outputted by the inverter 141' is not transmitted to the load end O.

As shown in FIG. 17a, the second bidirectional switch 143' in the second main circuit M2 is turned off due to a reverse voltage in the second direction Y. For example, the fourth silicon controlled rectifier S4' in the second bidirectional switch 143' in the second main circuit M2 may be driven, and the third silicon controlled rectifier S3' is not driven. A voltage (the actual voltage value 220 VAC of the current outputted by the load end O) of the anode of the fourth silicon controlled rectifier S4' is less than a voltage (the second voltage value 230 VAC of the current outputted by the inverter 141' in the second main circuit M2) of the cathode. Therefore, the fourth silicon controlled rectifier S4' is turned off due to a reverse voltage, so that the second bidirectional switch 143' is turned off due to a reverse voltage in the second direction Y.

In this case, a positive half-cycle equivalent logic diagram of the UPS 10 is shown in FIG. 17a.

Figure 17B:
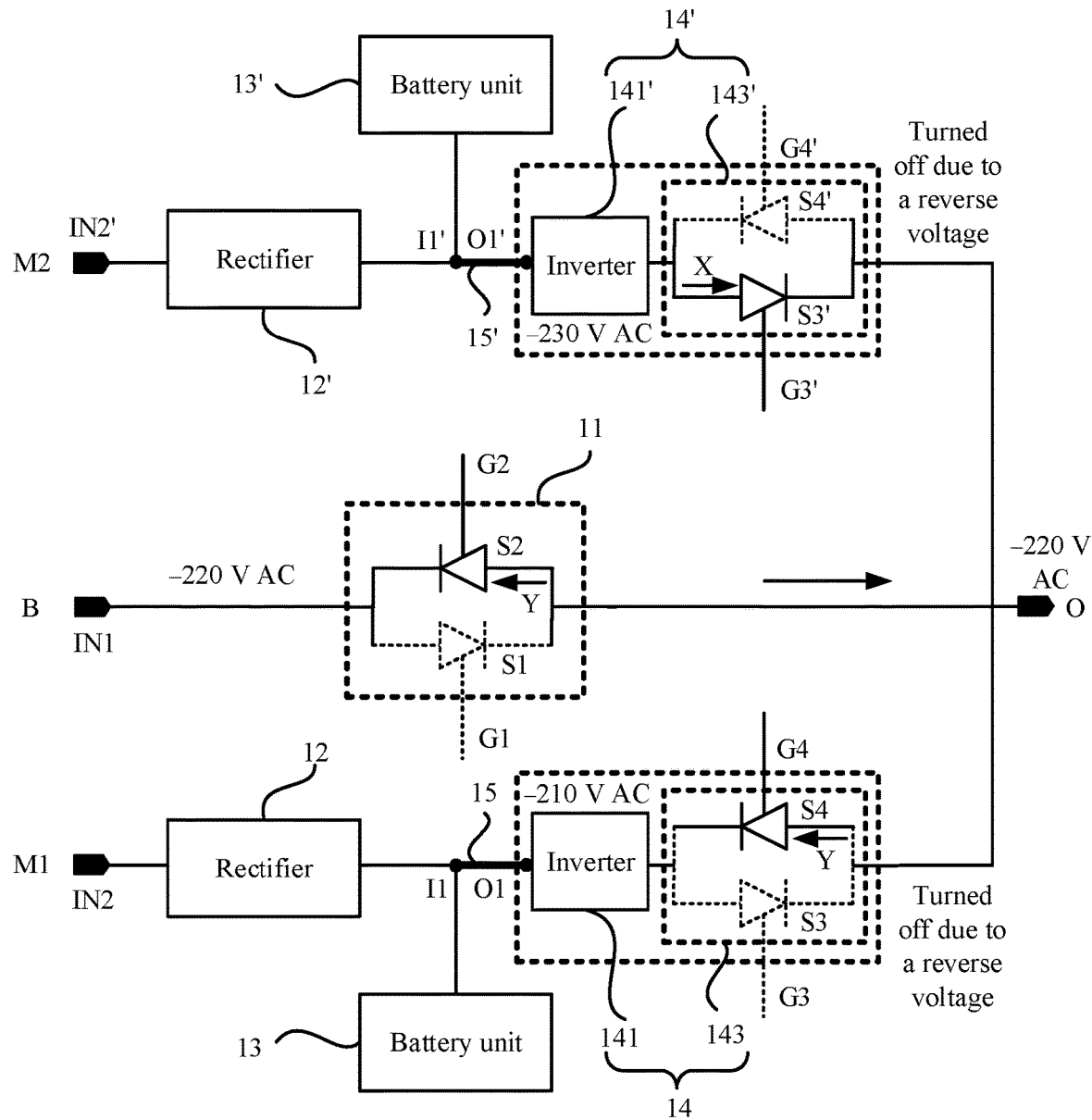

As shown in FIG. 17b, the first bidirectional switch 11 in the bypass B is turned on in the second direction Y, and the current whose voltage value is the theoretical voltage value and that is inputted by the first power input end IN1 is transmitted to the load end O by using the first bidirectional switch 11.

At the same time, the second bidirectional switch 143 in the first main circuit M1 is turned off due to a reverse voltage in the second direction Y, and the inverter 142 in the first main circuit M1 performs DC-AC conversion on the current inputted from the output end O1 of the bus 15, and transmits the current whose voltage value is the first voltage value to the second bidirectional switch 143. However, because the second bidirectional switch 143 in the first main circuit M1 is turned off due to a reverse voltage, the current whose voltage value is the first voltage value and that is outputted by the inverter 141 is not transmitted to the load end O.

As shown in FIG. 17b, the second bidirectional switch 143 is turned off due to a reverse voltage in the second direction Y. For example, the fourth silicon controlled rectifier S4 in the second bidirectional switch 143 may be driven, and the third silicon controlled rectifier S3 is not driven. A voltage (the actual voltage value −220 VAC of the current outputted by the load end O) of the anode of the fourth silicon controlled rectifier S4 is less than a voltage (the first voltage value −210 VAC of the current outputted by the inverter 141) of the cathode. Therefore, the fourth silicon controlled rectifier S4 is turned off due to a reverse voltage, so that the second bidirectional switch 143 is turned off due to a reverse voltage in the second direction Y.

At the same time, the second bidirectional switch 143' in the second main circuit M2 is turned off due to a reverse voltage in the first direction X, and the inverter 142' in the second main circuit M2 performs DC-AC conversion on the current inputted from the output end O1' of the bus 15', and transmits the current whose voltage value is the second voltage value to the second bidirectional switch 143'. However, because the second bidirectional switch 143' in the second main circuit M2 is turned off due to a reverse voltage, the current whose voltage value is the second voltage value and that is outputted by the inverter 141' is not transmitted to the load end O.

As shown in FIG. 14b, the second bidirectional switch 143' in the second main circuit M2 is turned off due to a reverse voltage in the first direction X. For example, the third silicon controlled rectifier S3' in the second bidirectional switch 143' may be driven, and the fourth silicon controlled rectifier S4' is not driven. A voltage (the second voltage value −230 VAC of the current outputted by the inverter 141' in the second main circuit M2) of the anode of the third silicon controlled rectifier S3' is less than a voltage (the actual voltage value −220 VAC of the current outputted by the load end O) of the cathode. Therefore, the third silicon controlled rectifier S3' is turned off due to a reverse voltage, so that the second bidirectional switch 143' is turned off due to a reverse voltage in the first direction X.

In this case, a negative half-cycle equivalent logic diagram of the UPS 10 is shown in FIG. 17b.

Figure 17C:
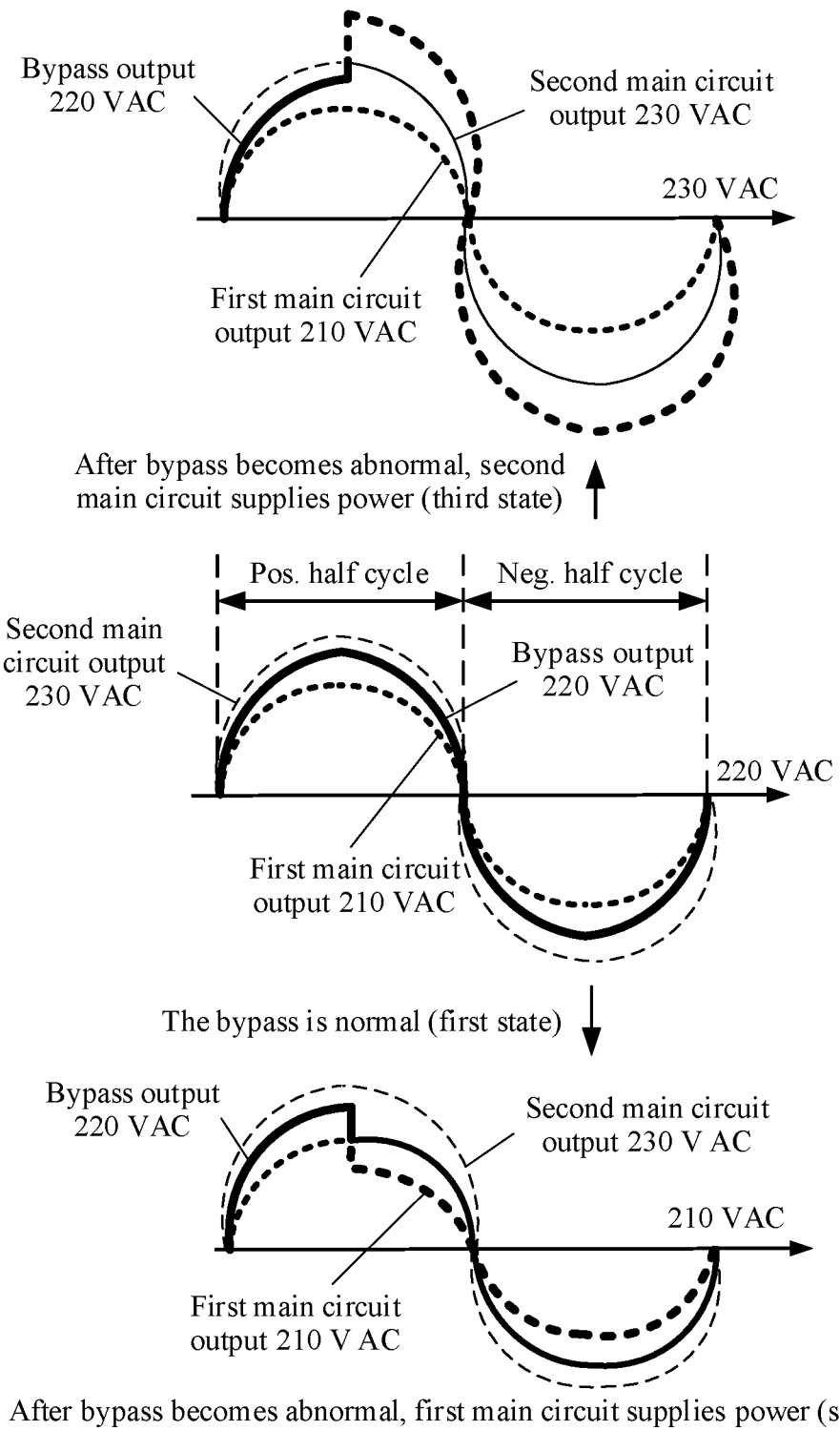
FIG. 17c is a diagram of an output signal of the uninterruptible power system shown in FIG. 15 according to an embodiment of this application.

Therefore, as shown in a middle figure in FIG. 17c, in the first state, the bypass B transmits a current to the load end O. A current flows in the first main circuit M1, and the inverter 141 in the first main circuit M1 keeps outputting a current with the first voltage value, but the second bidirectional switch 143 in the first main circuit M1 is turned off due to a reverse voltage. Therefore, the first main circuit M1 does not transmit a current to the load end O.

Similarly, a current flows in the second main circuit M2, but is not transmitted to the load end O. For example, the theoretical voltage value of the current inputted by the first power input end IN1 is 220 VAC, the first voltage value of the current outputted by the inverter 141 in the first main circuit M1 is 210 VAC, and the second voltage value of the current outputted by the inverter 141' in the second main circuit M2 is 230 VAC. In this case, the voltage value of the current outputted by the load end O is 220 VAC.

In FIG. 17c, a solid line represents a current transmitted to the load end O, and a dashed line represents a current not transmitted to the load end O.

Figure 17D:
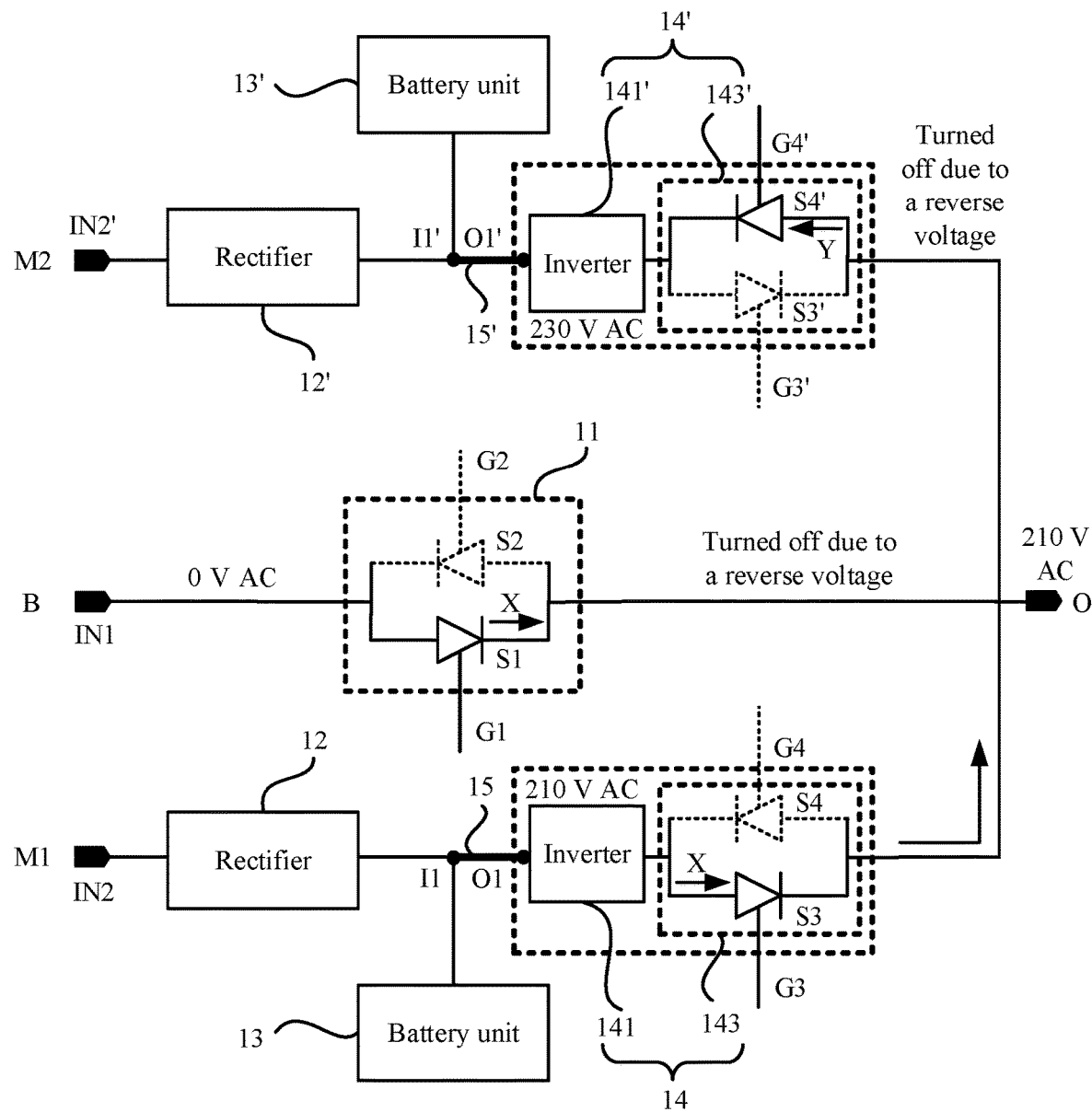
FIG. 17d to FIG. 17g are diagrams of driving processes of the uninterruptible power system shown in FIG. 15.

S410. In the second state:

As shown in FIG. 17d, the inverter 141 in the first main circuit M1 performs DC-AC conversion on the current inputted from the output end O1 of the bus 15, and transmits the current whose voltage value is the first voltage value to the second bidirectional switch 143 in the first main circuit M1. The second bidirectional switch 143 in the first main circuit M1 is driven in the first direction X, and transmits the current whose voltage value is the first voltage value to the load end O.

At the same time, the first bidirectional switch 11 in the bypass B is turned off due to a reverse voltage in the first direction X, and the first bidirectional switch 11 in the bypass B controls the first power input end IN1 to be disconnected from the load end O.

At the same time, the second bidirectional switch 143' in the second main circuit M2 is turned off due to a reverse voltage in the second direction Y, and the inverter 141' in the second main circuit M2 performs DC-AC conversion on the current inputted from the output end O1' of the bus 15', and transmits the current whose voltage value is the second voltage value to the second bidirectional switch 143'. However, because the second bidirectional switch 143' in the second main circuit M2 is turned off due to a reverse voltage, the current whose voltage value is the second voltage value and that is outputted by the inverter 141' is not transmitted to the load end O.

In this case, a positive half-cycle equivalent logic diagram of the UPS 10 is shown in FIG. 17d.

Figure 17E:
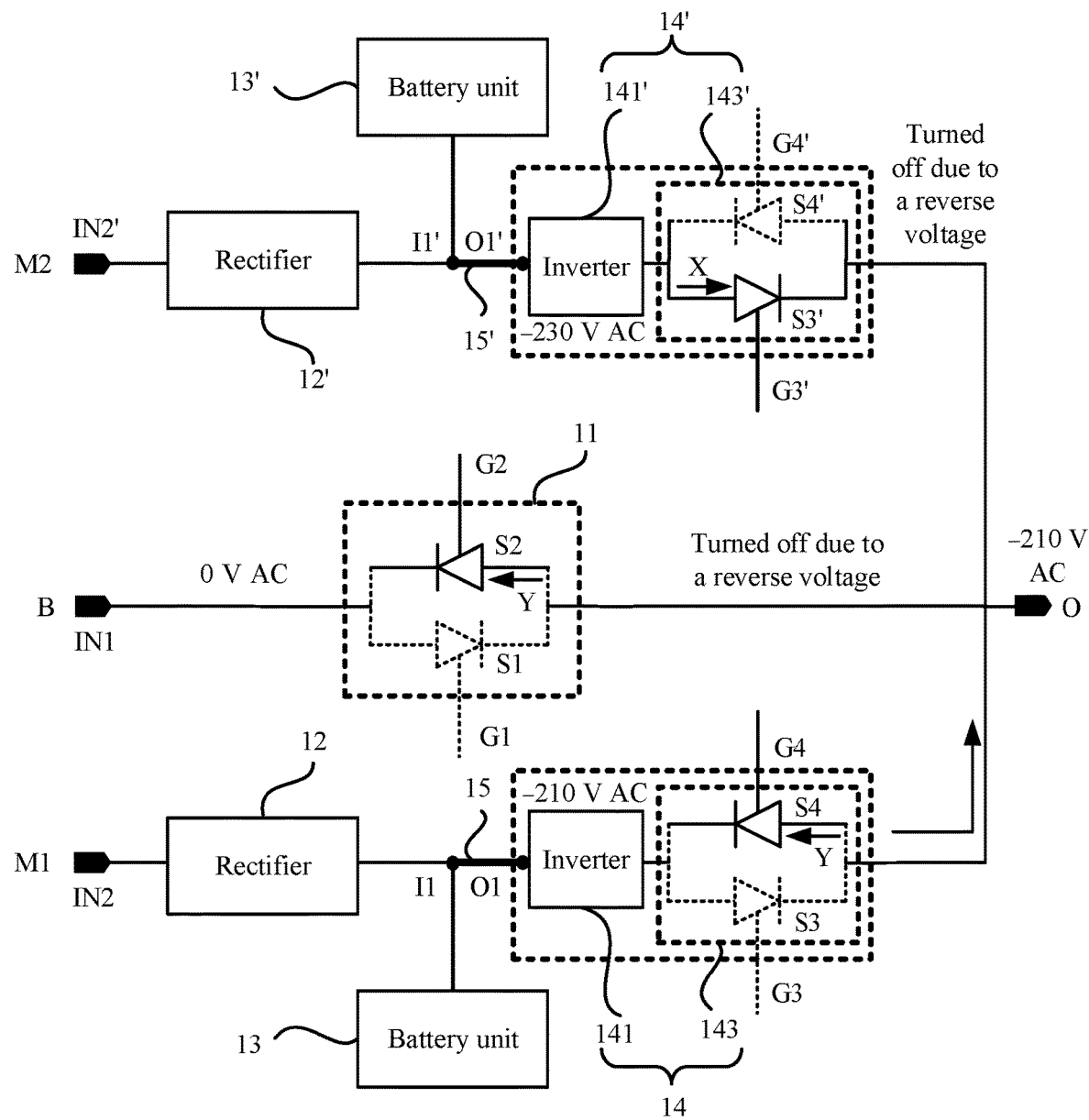

As shown in FIG. 17e, the inverter 141 in the first main circuit M1 performs DC-AC conversion on the current inputted from the output end O1 of the bus 15, and transmits the current whose voltage value is the first voltage value to the second bidirectional switch 143 in the first main circuit M1. The second bidirectional switch 143 in the first main circuit M1 is driven in the second direction Y, and transmits the current whose voltage value is the first voltage value to the load end O.

At the same time, the first bidirectional switch 11 in the bypass B is turned off due to a reverse voltage in the second direction Y, and the first bidirectional switch 11 in the bypass B controls the first power input end IN1 to be disconnected from the load end O.

At the same time, the second bidirectional switch 143' in the second main circuit M2 is turned off due to a reverse voltage in the first direction X, and the inverter 142' in the second main circuit M2 performs DC-AC conversion on the current inputted from the output end O1' of the bus 15', and transmits the current whose voltage value is the second voltage value to the second bidirectional switch 143'. However, because the second bidirectional switch 143' in the second main circuit M2 is turned off due to a reverse voltage, the current whose voltage value is the second voltage value and that is outputted by the inverter 141' is not transmitted to the load end O.

In this case, a negative half-cycle equivalent logic diagram of the UPS 10 is shown in FIG. 17e.

Therefore, as shown in a figure at the bottom of FIG. 17c, after the first state ends and the second state is entered, the first main circuit M1 transmits a current to the load end O, the bypass B does not transmit a current to the load end O, and the second main circuit M2 does not transmit a current to the load end O either. For example, the first voltage value of the current outputted by the inverter 141 in the first main circuit M1 is 210 VAC. In this case, the voltage value of the current outputted by the load end O is also 210 VAC.

Figure 17F:
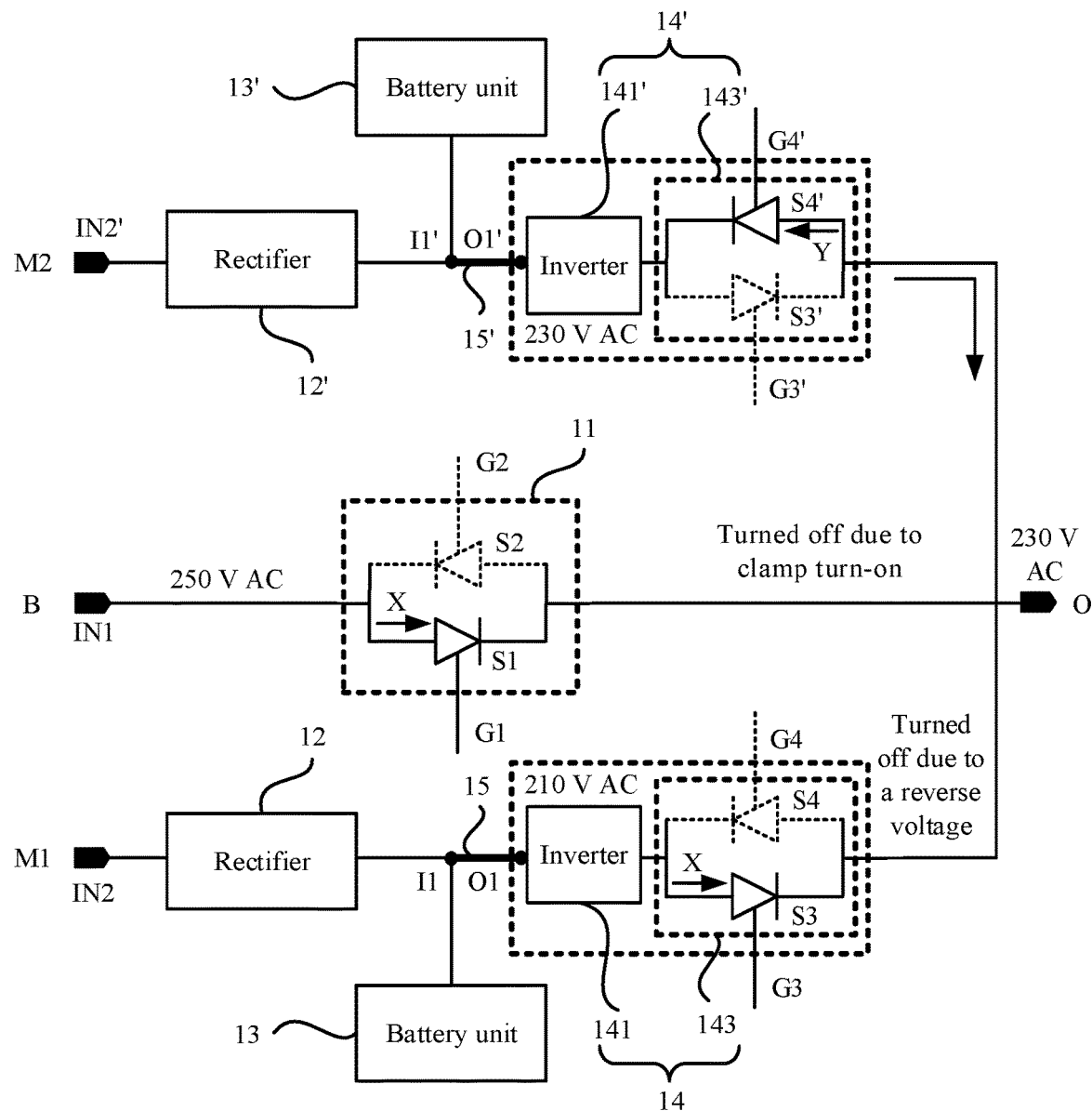

S510. In the third state:

As shown in FIG. 17f, the inverter 141' in the second main circuit M2 performs DC-AC conversion on the current inputted from the output end O1' of the bus 15', and transmits the current with the second voltage value to the second bidirectional switch 143' in the second main circuit M2. The second bidirectional switch 143' in the second main circuit M2 is driven in the second direction Y, and transmits the current with the second voltage value to the load end O.

At the same time, the first bidirectional switch 11 in the bypass B is turned off due to clamp turn-on, and the first bidirectional switch 11 in the bypass B controls the first power input end IN1 to be disconnected from the load end O.

At the same time, the second bidirectional switch 143 in the first main circuit M1 is turned off due to a reverse voltage in the first direction X, and the inverter 141 in the first main circuit M1 performs DC-AC conversion on the current inputted from the output end O1 of the bus 15, and transmits the current whose voltage value is the first voltage value to the second bidirectional switch 143. However, because the second bidirectional switch 143 in the first main circuit M1 is turned off due to a reverse voltage, the current whose voltage value is the first voltage value and that is outputted by the inverter 141 is not transmitted to the load end O.

In this case, a positive half-cycle equivalent logic diagram of the UPS 10 is shown in FIG. 17f.

Figure 17G:
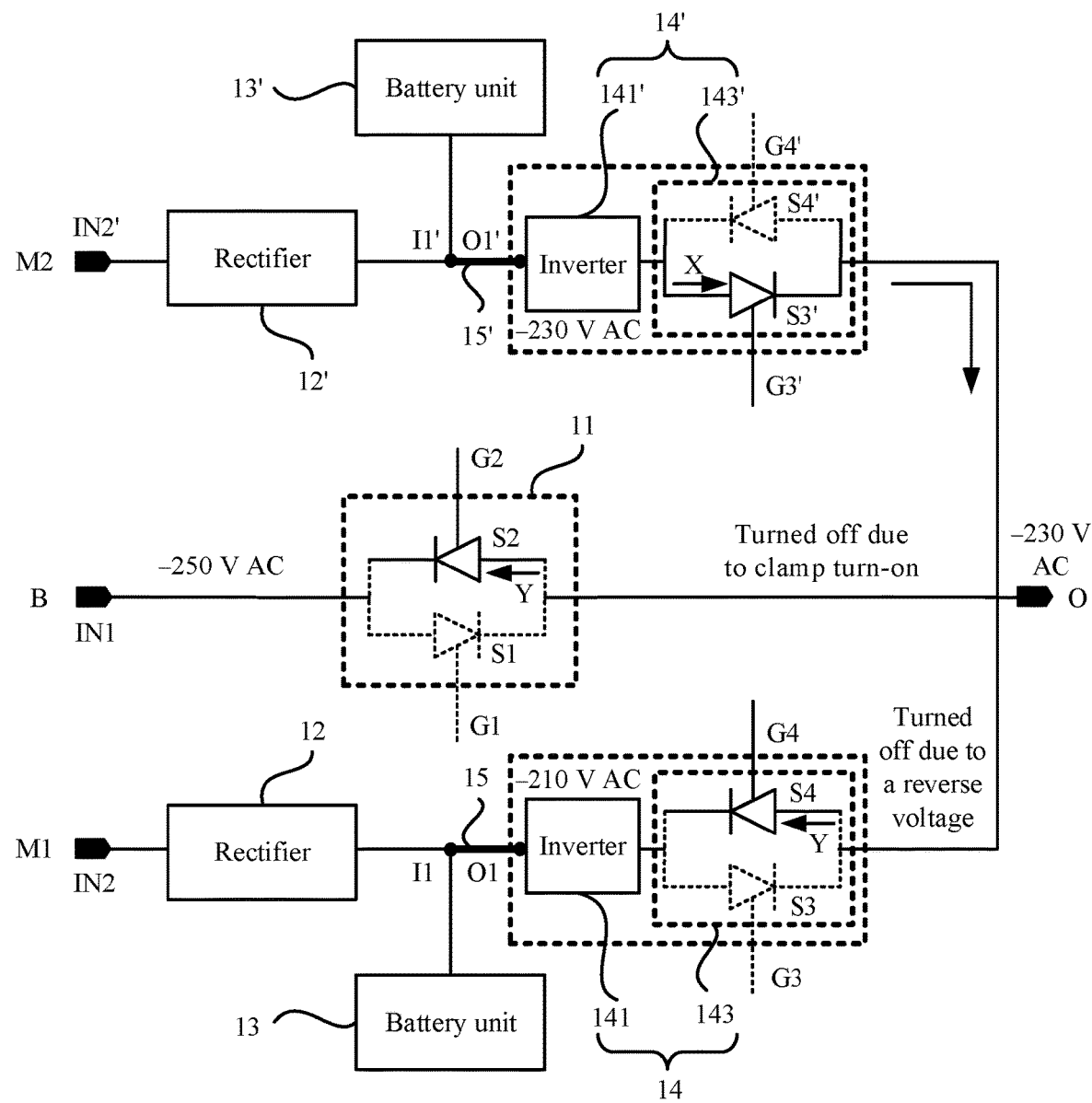

As shown in FIG. 17g, the inverter 141' in the second main circuit M2 performs DC-AC conversion on the current inputted from the output end O1' of the bus 15', and transmits the current whose voltage value is the second voltage value to the second bidirectional switch 143' in the second main circuit M2. The second bidirectional switch 143' in the second main circuit M2 is driven in the first direction X, and transmits the current whose voltage value is the second voltage value to the load end O.

At the same time, the first bidirectional switch 11 in the bypass B is turned off due to clamp turn-on, and the first bidirectional switch 11 in the bypass B controls the first power input end IN1 to be disconnected from the load end O.

At the same time, the second bidirectional switch 143 in the first main circuit M1 is turned off due to a reverse voltage in the second direction Y, and the inverter 142 in the first main circuit M1 performs DC-AC conversion on the current inputted from the output end O1 of the bus 15, and transmits the current whose voltage value is the first voltage value to the second bidirectional switch 143. However, because the second bidirectional switch 143 is turned off due to a reverse voltage, the current whose voltage value is the first voltage value and that is outputted by the inverter 141 is not transmitted to the load end O.

In this case, a positive half-cycle equivalent logic diagram of the UPS 10 is shown in FIG. 17g.

Therefore, as shown in a figure at the top of FIG. 17c, after the first state ends and the third state is entered, the second main circuit M2 transmits a current to the load end O, the bypass B does not transmit a current to the load end O, and the first main circuit M1 does not transmit a current to the load end O either. For example, the second voltage value of the current outputted by the inverter 141' in the second main circuit M2 is 230 VAC. In this case, the voltage value of the current outputted by the load end O is also 230 VAC.

It should be noted that the first voltage value of the current outputted by the inverter 141 in the first main circuit M1 is a fixed value, and the first voltage value is less than the theoretical voltage value of the current inputted by the first power input end IN1. The second voltage value of the current outputted by the inverter 141' in the second main circuit M2 is also a fixed value, and the second voltage value is greater than the theoretical voltage value of the current inputted by the first power input end IN1.

In addition, when the second bidirectional switch 143 in the first main circuit M1 is turned on in the first direction X, the second bidirectional switch 143' in the second main circuit M2 is turned on in the second direction Y, and a direction in which the second bidirectional switch 143 in the first main circuit M1 is turned on is always opposite to a direction in which the second bidirectional switch 143' in the second main circuit M2 is turned on.

In the UPS 10 provided in this example, the bypass B, the first main circuit M1, and the second main circuit M2 simultaneously transmit currents with different voltage values to the load end O. When the voltage value of the current transmitted by the bypass B to the load end O is greater than the voltage value of the current transmitted by the first main circuit M1 to the load end O and is less than the voltage value of the current transmitted by the second main circuit M2 to the load end O, the first main circuit M1 is cut off due to a reverse voltage, the second main circuit M2 is cut off due to a reverse voltage, and the bypass B transmits the current to the load end O. When the voltage value of the current transmitted by the bypass B to the load end O is less than the voltage value of the current transmitted by the first main circuit M1 to the load end O, the first main circuit M1 is naturally conducted. In this case, the bypass B may be cut off due to a reverse voltage, and the second main circuit M2 is cut off due to a reverse voltage. When the voltage value of the current transmitted by the bypass B to the load end O is greater than the voltage value of the current transmitted by the second main circuit M2 to the load end O, the second main circuit M2 is naturally conducted. In this case, the bypass B is cut off due to a reverse voltage, and the first main circuit M1 is cut off due to a reverse voltage. In this way, when the voltage value of the current supplied by the bypass B is very low, seamless switching from the bypass B transmitting the current to the load end O to the first main circuit M1 transmitting the current to the load end O is completed. When the voltage value of the current supplied by the bypass B is very high, seamless switching from the bypass B transmitting the current to the load end O to the second main circuit M2 transmitting the current to the load end O is completed. Therefore, when a supply voltage of the bypass B is very low, instantaneous switching from the power supply of the bypass B to the power supply of the first main circuit M1 is performed. When the supply voltage of the bypass B is very high, instantaneous switching from the power supply of the bypass B to the power supply of the second main circuit M2 is performed. This can ensure uninterrupted output of the UPS 10, and shorten a time in which the UPS 10 outputs an abnormal current.

In addition, although the bypass B, the first main circuit M1, and the second main circuit M2 simultaneously transmit the currents to the load end O, there is a voltage difference between the currents transmitted by the bypass B, the first main circuit M1, and the second main circuit M2. Therefore, a circuit with a low transmission voltage is automatically cut off due to a reverse voltage. There is no case in which the bypass B, the first main circuit M1, and the second main circuit M2 are simultaneously conducted to form a cross current, thereby avoiding affecting system reliability of the UPS 10 due to a cross current formed by two circuits that are simultaneously conducted.

For the foregoing, it should be noted that the voltage values of the currents in the embodiments of this application are merely examples for description. Voltage values of currents supplied by power grids in different countries, regions, and industries are different. Voltage values of currents outputted by components in the embodiments of this application may be correspondingly adjusted.

In addition, an embodiment of this application further provides a power management chip, including the driving method for an uninterruptible power system.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uninterruptible power system, comprising:
   a first power input end receiving a first current;
   a second power input end receiving a second current;
   a load end;
   a bypass, the bypass comprising a first bidirectional switch, and the first bidirectional switch is connected to the first power input end and the load end, the first bidirectional switch is configured to control connection or disconnection between the first power input end and the load end; and
   at least one main circuit, each main circuit of the at least one main circuit comprising a bus and an inverter output unit, the inverter output unit comprises an inverter and a second bidirectional switch;
   an input end of the bus being connected to the second power input end and an output end of the bus being connected to the inverter output unit, the inverter output unit is further connected to the load end,
   the inverter is connected to the output end of the bus and the second bidirectional switch, the inverter is configured to perform the DC-AC conversion on the second current inputted from the output end of the bus, and transmit the inverter current to the second bidirectional switch; and
   the second bidirectional switch is further connected to the load end and is configured to control whether to transmit, to the load end, the inverter current outputted by the inverter;
   an inverter voltage value corresponding to the inverter current outputted by the inverter output unit is different from a theoretical voltage value corresponding to the first current outputted by the first power input end.

2. The uninterruptible power system according to claim 1, wherein the inverter output unit comprises the inverter and a first controller; and
   the inverter is connected to the output end of the bus, the load end, and the first controller, and the inverter is turned on under control of the first controller, and is configured to perform the DC-AC conversion on the second current inputted from the output end of the bus, and transmit the inverter current to the load end.

3. The uninterruptible power system according to claim 2, wherein there are two or more main circuits; and
   a plurality of first controllers in the two or more main circuits are integrated in a same control unit.

4. The uninterruptible power system according to claim 1, wherein there are two or more main circuits; and
   in the two or more main circuits, a first inverter voltage value corresponding to a first inverter current outputted by a first inverter output unit in a first main circuit of the at least one main circuit is greater than the theoretical voltage value corresponding to the first current outputted by the first power input end; and a second inverter voltage value corresponding to a second inverter current outputted by a second inverter output unit in a second main circuit of the at least one main circuit is less than the theoretical voltage value corresponding to the first current outputted by the first power input end.

5. The uninterruptible power system according to claim 1, wherein the first bidirectional switch comprises a first silicon controlled rectifier and a second silicon controlled rectifier;
   an anode of the first silicon controlled rectifier is connected to the first power input end, and a cathode of the first silicon controlled rectifier is connected to the load end; and
   an anode of the second silicon controlled rectifier is connected to the load end, and a cathode of the second silicon controlled rectifier is connected to the first power input end.

6. The uninterruptible power system according to claim 1, wherein the second bidirectional switch comprises a third silicon controlled rectifier and a fourth silicon controlled rectifier;
   an anode of the third silicon controlled rectifier is connected to the inverter, and a cathode of the third silicon controlled rectifier is connected to the load end; and
   an anode of the fourth silicon controlled rectifier is connected to the load end, and a cathode of the fourth silicon controlled rectifier is connected to the inverter.

7. The uninterruptible power system according to claim 1, wherein the at least one main circuit further comprises a rectifier and a battery unit;
   the rectifier is connected to the second power input end and the input end of the bus, and is configured to perform the AC-DC conversion on the second current inputted from the second power input end, and transmit a rectified current to the input end of the bus; and
   the battery unit is connected to the input end of the bus and is configured to receive and store the rectified current from the input end of the bus, and the battery unit is further configured to output the rectified current stored in the battery unit to the input end of the bus.

8. A driving method for an uninterruptible power system, the driving method comprising:

in a first state, turning on a first bidirectional switch in a bypass to transmit a first current from a first power input end to a load end; and in a second state:
controlling the first bidirectional switch to disconnect the first power input end from the load end;
performing, by an inverter of an inverter output unit in a first main circuit, a DC-AC conversion on a second current received from a second power input end and outputting an inverter current;
transmitting the inverter current to a second bidirectional switch in the first main circuit; and
turning on the second bidirectional switch to transmit the inverter current to the load end;
an inverter voltage value corresponding to the inverter current outputted by the inverter output unit being different from a theoretical voltage value corresponding to the first current received at the first power input end.

9. The driving method for an uninterruptible power system according to claim 8, wherein the inverter output unit in the first main circuit comprises the inverter and a first controller, and the inverter is connected to the output end of the bus, the load end, and the first controller; and the driving method for an uninterruptible power system further comprises:
the inverter voltage value corresponding to the inverter current outputted by the inverter in the first main circuit is less than the theoretical voltage value corresponding to the first current outputted by the first power input end to the load end;
detecting, by the first controller in the first main circuit in real time, an actual voltage value corresponding to a load current outputted by the load end, and determining whether the actual voltage value is greater than the first voltage value;
if the actual voltage value is greater than the first voltage value, entering the first state, wherein the first controller in the first main circuit controls the inverter to be turned off; and
if the actual voltage value is less than the first voltage value, entering the second state, wherein:
the performing, by the inverter output unit in the first main circuit, the DC-AC conversion on the second current inputted from the output end of the bus, and transmitting the inverter current whose voltage value is a first voltage value to the load end comprises:
controlling, by the first controller in the first main circuit, the inverter to be turned on, and performing, by the inverter, the DC-AC conversion on the second current inputted from the output end of the bus in the first main circuit, and transmitting the inverter current whose voltage value is the first voltage value to the load end.

10. The driving method for an uninterruptible power system according to claim 8, wherein the inverter output unit in the first main circuit comprises the inverter and a first controller, and the inverter is connected to the output end of the bus, the load end, and the first controller; and the driving method for an uninterruptible power system further comprises:
the inverter voltage value corresponding to the inverter current outputted by the inverter in the first main circuit is greater than the theoretical voltage value corresponding to the first current outputted by the first power input end to the load end;
detecting, by the first controller in the first main circuit in real time, an actual voltage value corresponding to a load current outputted by the load end, and determining whether the actual voltage value is less than the first voltage value;
if the actual voltage value is less than the first voltage value, entering the first state, wherein the first controller in the first main circuit controls the inverter to be turned off; and
if the actual voltage value is greater than the first voltage value, entering the second state, wherein:
the performing, by the inverter output unit in the first main circuit, the DC-AC conversion on the second current inputted from the output end of the bus, and transmitting the inverter current whose voltage value is a first voltage value to the load end comprises:
controlling, by the first controller in the first main circuit, the inverter to be turned on, and performing, by the inverter, the DC-AC conversion on the second current inputted from the output end of the bus in the first main circuit, and transmitting the inverter current whose voltage value is the first voltage value to the load end.

11. The driving method for an uninterruptible power system according to claim 9, wherein the uninterruptible power system further comprises a second main circuit, the second main circuit comprises an inverter output unit and a bus, the inverter output unit comprises an inverter and a first controller, and the inverter is connected to an output end of the bus, the load end, and the first controller; and the driving method for an uninterruptible power system further comprises:
an inverter voltage value corresponding to the inverter current outputted by the inverter in the second main circuit is greater than the theoretical voltage value corresponding to the first current outputted by the first power input end to the load end;
detecting, by the first controller in the second main circuit in real time, an actual voltage value corresponding to a load current outputted by the load end, and determining whether the actual voltage value is less than the second voltage value;
if the actual voltage value is less than the second voltage value, entering the first state, wherein the first controller in the second main circuit controls the inverter to be turned off; and
if the actual voltage value is greater than the second voltage value, entering a third state, wherein in the third state:
the first bidirectional switch controls the first power input end to be disconnected from the load end;
the first controller in the first main circuit controls the inverter to be turned off, to control the output end of the bus to be disconnected from the load end; and
the first controller in the second main circuit controls the inverter to be turned on, and the inverter performs the DC-AC conversion on the second current inputted from the output end of the bus in the second main circuit, and transmits the inverter current whose voltage value is the second voltage value to the load end.

12. The driving method for an uninterruptible power system according to claim 8, wherein the inverter is connected to the output end of the bus and the second bidirectional switch, and the second bidirectional switch is further connected to the load end; and the driving method for an uninterruptible power system further comprises:
controlling, by the second bidirectional switch in the first main circuit, to enter the first state or the second state, based on whether a first voltage value corresponding to the inverter current outputted by the inverter in the first main circuit is less than an actual voltage value corresponding to a load current outputted by the load end;

the turning on the first bidirectional switch in the bypass to transmit the first current of the first power input end to the load end by using the first bidirectional switch comprises:

turning on the first bidirectional switch in a first direction to transmit the first current of the first power input end to the load end by using the first bidirectional switch; and performing, by the inverter in the first main circuit, the DC-AC conversion on the second current inputted from the output end of the bus, and transmitting the inverter current whose voltage value is the first voltage value to the second bidirectional switch, wherein the second bidirectional switch in the first main circuit is turned off due to a reverse voltage in the first direction; and turning on the first bidirectional switch in a second direction to transmit the first current of the first power input end to the load end by using the first bidirectional switch; and performing, by the inverter in the first main circuit, the DC-AC conversion on the second current inputted from the output end of the bus, and transmitting the inverter current whose voltage value is the first voltage value to the second bidirectional switch, wherein the second bidirectional switch in the first main circuit is turned off due to a reverse voltage in the second direction; and wherein the first direction and the second direction are a direction flowing to the load end and a direction departing from the load end, respectively.

13. The driving method for an uninterruptible power system according to claim 8, wherein the inverter output unit in the first main circuit comprises the inverter and the second bidirectional switch, the inverter is connected to the output end of the bus and the second bidirectional switch, and the second bidirectional switch is further connected to the load end; and the driving method for an uninterruptible power system further comprises:

controlling, by the second bidirectional switch in the first main circuit, to enter the first state or the second state, based on whether the inverter voltage value corresponding to the inverter current outputted by the inverter in the first main circuit is greater than an actual voltage value corresponding to a load current outputted by the load end;

the turning on the first bidirectional switch in the bypass to transmit the first current of the first power input end to the load end by using the first bidirectional switch comprises:

turning on the first bidirectional switch in a first direction to transmit the first current of the first power input end to the load end by using the first bidirectional switch; and performing, by the inverter in the first main circuit, the DC-AC conversion on the second current inputted from the output end of the bus, and transmitting the inverter current whose voltage value is the first voltage value to the second bidirectional switch, wherein the second bidirectional switch in the first main circuit is turned off due to a reverse voltage in a second direction; and turning on the first bidirectional switch in the second direction to transmit the first current of the first power input end to the load end by using the first bidirectional switch; and performing, by the inverter in the first main circuit, the DC-AC conversion on the second current inputted from the output end of the bus, and transmitting the inverter current whose voltage value is the first voltage value to the second bidirectional switch, wherein the second bidirectional switch in the first main circuit is turned off due to a reverse voltage in the first direction; and the performing, by the inverter output unit in the first main circuit, the DC-AC conversion on the second current inputted from the output end of the bus, and transmitting the inverter current whose voltage value is a first voltage value to the load end comprises:

performing, by the inverter in the first main circuit, the DC-AC conversion on the second current inputted from the output end of the bus, and transmitting the inverter current whose voltage value is the first voltage value to the second bidirectional switch in the first main circuit; and turning on the second bidirectional switch to transmit the inverter current whose voltage value is the first voltage value to the load end;

wherein the first voltage value is greater than the theoretical voltage value, and the first direction and the second direction are a direction flowing to the load end and a direction departing from the load end, respectively.

14. The driving method for an uninterruptible power system according to claim 12, wherein the uninterruptible power system further comprises a second main circuit, the second main circuit comprises an inverter output unit and a bus, the inverter output unit comprises an inverter and a second bidirectional switch, the inverter is connected to an output end of the bus and the second bidirectional switch, and the second bidirectional switch is further connected to the load end; and the driving method for an uninterruptible power system further comprises:

controlling, by the second bidirectional switch in the second main circuit, to enter the first state or a third state, based on whether an inverter voltage value corresponding to the inverter current outputted by the inverter in the second main circuit is greater than the actual voltage value corresponding to the load current outputted by the load end, wherein in the third state:

the first bidirectional switch controls the first power input end to be disconnected from the load end;

the inverter in the first main circuit performs the DC-AC conversion on the second current inputted from the output end of the bus, and transmits the inverter current whose voltage value is the first voltage value to the second bidirectional switch in the first main circuit, the second bidirectional switch in the first main circuit is turned off due to a reverse voltage; and the second bidirectional switch in the second main circuit is turned on, and the inverter in the second main circuit performs the DC-AC conversion on the second current inputted from the output end of the bus, and transmits the inverter current whose voltage value is the second voltage value to the load end by using the second bidirectional switch in the second main circuit; and the driving method for an uninterruptible power system further comprises:

in the first state, when the first bidirectional switch is turned on in the first direction, performing, by the inverter in the second main circuit, the DC-AC conversion on the second current inputted from the output end of the bus, and transmitting the inverter current whose voltage value is the second voltage value to the second bidirectional switch, wherein the second bidirectional switch in the second main circuit is turned off due to a reverse voltage in the second direction; and when the first bidirectional switch is driven in the second direction, performing, by the inverter in the second main circuit, the DC-AC conversion on the second current inputted from the output end of the bus, and transmitting the inverter current whose voltage value is the second voltage value to the second bidirectional switch, wherein the second bidirectional switch in the second main circuit is turned off due to a reverse voltage in the first direction;

wherein the second voltage value is greater than the theoretical voltage value.

15. A power management chip for an uninterruptible power chip, the power management system comprising:
a first power input end;
a second power input end;
a load end;
a bypass, the bypass comprising a first bidirectional switch, and the first bidirectional switch is connected to the first power input end and the load end;
a first main circuit, the first main circuit comprising a bus and an inverter output unit, the inverter output unit comprises an inverter and a second bidirectional switch, wherein an input end of the bus is connected to the second power input end, an output end of the bus is connected to the inverter output unit, and the inverter output unit is further connected to the load end;
the power management chip is configured to perform, in a first state:
turning on the first bidirectional switch in the bypass to transmit a first current of the first power input end to the load end by using the first bidirectional switch;
the power management chip is configured to perform, in a second state:
controlling, by the first bidirectional switch, the first power input end to be disconnected from the load end; +
performing, by the inverter in the first main circuit, a DC-AC conversion on a second current inputted from the output end of the bus, and outputting an inverter current whose voltage value is a first voltage value;
transmitting the inverter current to a second bidirectional switch in the first main circuit; and
turning on the second bidirectional switch to transmit the inverter current to the load end;
wherein the inverter voltage value corresponding to the inverter current outputted by the inverter output unit in the first main circuit is different from a theoretical voltage value corresponding to the first current outputted by the first power input end.

16. The power management chip according to claim 15, wherein the inverter output unit in the first main circuit comprises an inverter and a first controller, and the inverter is connected to the output end of the bus, the load end, and the first controller; and the power management chip is further configured to perform:
the inverter voltage value corresponding to the inverter current outputted by the inverter in the first main circuit is less than the theoretical voltage value corresponding to the first current outputted by the first power input end to the load end;
detecting, by the first controller in the first main circuit in real time, an actual voltage value corresponding to a load current outputted by the load end, and determining whether the actual voltage value is greater than the first voltage value;
if the actual voltage value is greater than the first voltage value, entering the first state, wherein the first controller in the first main circuit controls the inverter to be turned off; and
if the actual voltage value is less than the first voltage value, entering the second state, wherein
the performing, by the inverter output unit in the first main circuit, the DC-AC conversion on the second current inputted from the output end of the bus, and transmitting the inverter current whose voltage value is a first voltage value to the load end comprises:
controlling, by the first controller in the first main circuit, the inverter to be turned on, and performing, by the inverter, the DC-AC conversion on the second current inputted from the output end of the bus in the first main circuit, and transmitting the inverter current whose voltage value is the first voltage value to the load end.

* * * * *